(12) United States Patent
Javidi et al.

(10) Patent No.: US 11,566,993 B2
(45) Date of Patent: Jan. 31, 2023

(54) AUTOMATED CELL IDENTIFICATION USING SHEARING INTERFEROMETRY

(71) Applicant: University of Connecticut, Farmington, CT (US)

(72) Inventors: Bahram Javidi, Storrs, CT (US); Adam Markman, Orange, CT (US); Siddharth Rawat, Storrs, CT (US); Arun Anand, Gujarat (IN)

(73) Assignee: University of Connecticut, Farmington, CT (US)

( * ) Notice: Subject to any disclaimer, the term of this patent is extended or adjusted under 35 U.S.C. 154(b) by 1026 days.

(21) Appl. No.: 16/272,781

(22) Filed: Feb. 11, 2019

(65) Prior Publication Data
US 2019/0226972 A1 Jul. 25, 2019

Related U.S. Application Data

(60) Provisional application No. 62/631,140, filed on Feb. 15, 2018, provisional application No. 62/621,268, filed on Jan. 24, 2018.

(51) Int. Cl.
*G01N 15/10* (2006.01)
*G01B 9/02* (2022.01)
(Continued)

(52) U.S. Cl.
CPC ............... *G01N 15/10* (2013.01); *G01B 9/02* (2013.01); *G01N 15/1468* (2013.01);
(Continued)

(58) Field of Classification Search
CPC ............... G01N 15/10; G01N 15/1468; G01N 2015/1006; G01N 2015/1075;
(Continued)

(56) References Cited

U.S. PATENT DOCUMENTS 4,555,179 A 11/1985 Langerholc et al.
5,299,035 A 3/1994 Leith et al.
(Continued)

FOREIGN PATENT DOCUMENTS

CN 101894276 A 11/2010
CN 101894276 B 9/2012
(Continued)

OTHER PUBLICATIONS

Ma, Lateral Shearing Common-Path Digital Holographic Microscopy, Jun. 12, 2017, Optics Express, vol. 25, pp. 13659-13667 (Year: 2017).*
(Continued)

*Primary Examiner* — Tarifur R Chowdhury
*Assistant Examiner* — Omar H Nixon
(74) *Attorney, Agent, or Firm* — Michael Best & Friedrich LLP

(57) ABSTRACT

The present disclosure provides improved systems and methods for automated cell identification/classification. More particularly, the present disclosure provides advantageous systems and methods for automated cell identification/classification using shearing interferometry with a digital holographic microscope. The present disclosure provides for a compact, low-cost, and field-portable 3D printed system for automatic cell identification/classification using a common path shearing interferometry with digital holographic microscopy. This system has demonstrated good results for sickle cell disease identification with human blood cells. The present disclosure provides that a robust, low cost cell identification/classification system based on shearing interferometry can be used for accurate cell identification. For example, by combining both the static features of the cell along with information on the cell motility, classification can be performed to determine the type of cell (Continued)

present in addition to the state of the cell (e.g., diseased vs. healthy).

9 Claims, 60 Drawing Sheets

(51) Int. Cl.
    G06T 7/00     (2017.01)
    G03H 1/04     (2006.01)
    G02B 21/14     (2006.01)
    G06T 7/62     (2017.01)
    G01N 15/14     (2006.01)
    G06V 20/69     (2022.01)

(52) U.S. Cl.
    CPC ........... *G02B 21/14* (2013.01); *G03H 1/0443* (2013.01); *G06T 7/0012* (2013.01); *G06T 7/62* (2017.01); *G06V 20/698* (2022.01); *G01N 2015/1006* (2013.01); *G01N 2015/1075* (2013.01); *G01N 2015/1087* (2013.01); *G01N 2015/1093* (2013.01); *G01N 2015/1486* (2013.01); *G06T 2207/10016* (2013.01); *G06T 2207/10056* (2013.01); *G06T 2207/10152* (2013.01); *G06T 2207/20081* (2013.01); *G06T 2207/30024* (2013.01)

(58) Field of Classification Search
    CPC ... G01N 2015/1087; G01N 2015/1486; G01N 2015/1093; G06T 7/62; G06T 7/0012; G06T 2207/10016; G06T 2207/10056; G06T 2207/10152; G06T 2207/20081; G06T 2207/30024; G06V 20/698; G02B 21/14; G03H 1/0443
    USPC .......................................................... 359/15
    See application file for complete search history.

(56) References Cited

U.S. PATENT DOCUMENTS

| | | | |
|---|---|---|---|
| 5,371,368 | A | 12/1994 | Alfano et al. |
| 6,072,494 | A | 6/2000 | Nguyen |
| 6,128,003 | A | 10/2000 | Smith et al. |
| 6,215,587 | B1 | 4/2001 | Alfano et al. |
| 7,009,700 | B2 | 3/2006 | Dubois et al. |
| 7,242,449 | B1 | 7/2007 | Yamazaki et al. |
| 3,044,999 | A1 | 10/2011 | Mullen et al. |
| 8,836,793 | B1 | 9/2014 | Kriesel et al. |
| 9,185,391 | B1 | 11/2015 | Prechtl |
| 10,419,688 | B2 | 9/2019 | Gurgov |
| 2002/0179717 | A1 | 12/2002 | Cummings et al. |
| 2003/0182013 | A1 | 9/2003 | Moreas et al. |
| 2005/0126505 | A1 | 6/2005 | Gallager et al. |
| 2006/0114553 | A1 | 6/2006 | Laudo |
| 2007/0083535 | A1 | 4/2007 | Zilliacus et al. |
| 2007/0171432 | A1* | 7/2007 | Neuhauser .......... G03F 7/70633 356/614 |
| 2008/0018966 | A1 | 1/2008 | Dubois et al. |
| 2008/0170218 | A1* | 7/2008 | Dantus .................. G01N 21/65 372/3 |
| 2008/0317200 | A1 | 12/2008 | Lecomte et al. |
| 2009/0160985 | A1 | 6/2009 | Javidi et al. |
| 2010/0060897 | A1 | 3/2010 | Gustafsson |
| 2011/0053693 | A1 | 3/2011 | Wright |
| 2011/0222745 | A1 | 9/2011 | Osterhout et al. |
| 2012/0194649 | A1 | 8/2012 | Javidi et al. |
| 2013/0015236 | A1 | 1/2013 | Porter et al. |
| 2013/0088568 | A1 | 4/2013 | Nolte |
| 2013/0221084 | A1 | 8/2013 | Doss et al. |
| 2014/0133702 | A1 | 5/2014 | Zheng et al. |
| 2014/0317713 | A1 | 10/2014 | Gadotti |
| 2015/0049343 | A1 | 2/2015 | Shaked et al. |
| 2015/0192769 | A1* | 7/2015 | Dresel ................ G01B 9/02085 356/450 |
| 2015/0269427 | A1 | 9/2015 | Kim et al. |
| 2015/0295711 | A1 | 10/2015 | Javidi et al. |
| 2015/0304638 | A1 | 10/2015 | Cho et al. |
| 2015/0347889 | A1 | 12/2015 | Nosaka et al. |
| 2015/0356306 | A1 | 12/2015 | Carter |
| 2016/0153766 | A1 | 6/2016 | Jones et al. |
| 2016/0305883 | A1 | 10/2016 | Betzig et al. |
| 2016/0360186 | A1 | 12/2016 | Javidi et al. |
| 2017/0023472 | A1 | 1/2017 | Pavilion et al. |
| 2017/0227754 | A1 | 8/2017 | Huang |
| 2017/0270388 | A1* | 9/2017 | Vercruysse .......... G06K 9/6267 |
| 2017/0322410 | A1 | 11/2017 | Watson et al. |
| 2017/0342500 | A1* | 11/2017 | Marquard ............ C12Q 1/6886 |
| 2018/0000441 | A1 | 1/2018 | Wang et al. |
| 2018/0024341 | A1 | 1/2018 | Romanowski et al. |
| 2018/0146180 | A1 | 5/2018 | Keesling et al. |
| 2019/0138786 | A1 | 5/2019 | Trenholm et al. |
| 2019/0180143 | A1 | 6/2019 | Lyu |
| 2019/0226972 | A1 | 7/2019 | Javidi et al. |
| 2021/0278398 | A1* | 9/2021 | Luo ...................... C07K 16/241 |

FOREIGN PATENT DOCUMENTS

| | | | | |
|---|---|---|---|---|
| CN | 108985344 A | | 12/2018 | |
| DE | 102005036326 A1 | * | 2/2007 | ......... G01N 1/2813 |
| WO | WO-2014190303 A1 | * | 11/2014 | ............ G01B 11/06 |
| WO | WO2020036782 A2 | | 2/2020 | |

OTHER PUBLICATIONS

Javidi et al., "Sickle cell disease diagnosis based on spatio-temporal cell dynamics analysis using 3D printed shearing digital holographic microscopy", Optics Express, vol. 26, No. 10, May 2018, 14 pages.

Moon et al., "Identification of Malaria-Infected Red Blood Cells Via Digital Shearing Interferometry and Statistical Inference", IEEE Photonics Journal, vol. 5, No. 5, Oct. 2013, 8 pages.

O'Connor et al., "Automatic cell identification and visualization using digital holographic microscopy with head mounted augmented reality devices", Applied Optics, vol. 57, No. 7, Mar. 2018, pp. B197-B204.

Rawat et al., "Compact and field-portable 3D printed shearing digital holographic microscope for automated cell identification", Applied Optics, vol. 56, No. 9, Mar. 2017, pp. D127- D133.

Akram et al. , "Camera Based Visible Light Communication System for Underwater Applications", Published in IEEE International Conference on Industrial and Information Systems, ICIIS 2017, 6 Pages.

Alfalou, A. et al., Optical image compression and encryption methods, Adv. Opt. Photon. 1, pp. 589-636 (2009).

Amer et al., "Enhancing underwater optical imaging by using a low-pass polarization filter", Optic Express vol. 27 No. 2 Jan. 21, 2019, 23 Pages.

Ando, et al., "Speckle-Learning-Based Object Recognition Through Scattering Media," Opt. Express 23, 33902-3391 (2015) (9 Pages).

Barrera, J. et al., Optical encryption and QR codes: Secure and noise-free information retrieval, Opt. Express 21(5):5373-5378 (2013).

Boening, T. W. Groemer, and J. Klingauf, "Applicability of an EM-CCD for spatially resolved TIR-ICS," Opt. Express 18(13), 13516-13528 (2010).

Bonin et al., "Imaging Systems for Advanced Underwater Vehicles", Journal of Maritime Research, vol. VIII. No. 1, 2011, pp. 65-86.

Burguera et al., "Trajectory-Based Visual Localization in Underwater Surveying Missions", Sensors, 15, 2015, pp. 1708-1735.

Carnicer, A. et al., Vulnerability to chosen-cyphertext attacks of optical encryption schemes based on double random phase keys, Opt. Lett. 30, DD. 1644-1646 (2005).

Chan, R. Khoshabeh, K. B. Gibson, P. E. Gill, and T. Q. Nguyen, "An augmented Lagrangian method for total variation video restoration," IEEE Trans. Image Process. 20(11), 3097-3111 (2011).

(56) References Cited

OTHER PUBLICATIONS

Chen, H. Wei, and J. Ferryman, "A Survey of Human Motion Analysis Using Depth Imagery" Pattern Recognition Letters, 34, 1995-2006 (2013).
Chen, W. et al., Phase-modulated optical system with sparse representation for information encoding and authentication, IEEE Photon. J. 5, 6900113 (2013).
Chen, Wen, Bahram Javidi, and Xudong Chen. "Advances in optical security systems." Advances in Optics and Photonics 6.2 (2014): 1-37.
Cho et al. "Three-Dimensional Optical Sensing and Visualization Using Integral Imaging," in Proceedings of the IEEE, vol. 99, No. 4, pp. 556-575, Apr. 2011. doi: 10.1109/JPROC.2010.2090114 (Year: 2011).
Cho et al., "Peplography—a passive 30 photon counting imaging through scattering media" Optics Letters vol. 41 No. 22, Nov. 15, 2016 pp. 5401-5404.
Cho et al., "Three-dimensional tracking of occluded objects using integral imaging," Opt. Lett. 33, 2737-2739 (2008).
Cho et al., "Three-Dimensional Visualization of Objects in Turbid Water Using Integral Imaging", Journal of Display Technology, vol. 6, No. 10, Oct. 2010, pp. 544-547.
Cho et al.,3D passive Integral Imaging Using Compressive Sensing, Nov. 2012, Optical Society of America, vol. 20. No. 24, pp. 26624-26635.
Cho, Myungjin, and Bahram Javidi. "Three-dimensional photon counting double-random-phase encryption." Optics letters 38.17 (2013): 3198-3201.
Dainty, J. C., "The Statistics of Speckle Patterns," Progress in Optics XIV, North-Holland (1976).
Doster et al., "Laguerre-Gauss and Bessel-Gauss beams propagation through turbulence: analysis of channel efficiency", applied optics vol. 55 No. 36, Dec. 20, 2016 pp. 10239-10246.
Dubois, F., Automatic spatial frequency selection algorithm for pattern recognition by correlation, Appl. Opt. 32, 4365-4371 (1993).
Dubreuil et al., "Exploring underwater target detection by imaging polarimetry and correlation techniques", Applied Optics vol. 52 No. 5, 2013, pp. 997-1005.
Frauel, Y. et al., Resistance of the double random phase encryption against various attacks, Opt. Express 15, pp. 10253-10265 (2007).
Goodman, "Statistical Optics", Book Published in 2000, 16 pages.
Goudail et al., "Bhattacharyya distance as a contrast parameter for statistical processing of noisy optical images", Optical Society of America, © 2004, pp. 1231-1240.
Goudail, F. et al., Influence of a perturbation in a double phase-encoding system, J. Opt. Soc. Am. A 15, pp. 2629-2638 (1998).
Hamamatsu, "Photon is Our Business", Book © 2007, 14 Pages.
Han, L. Shao, D. Xu, J. Shotton, "Enhanced Computer Vision with Microsoft Kinect Sensor: A Review", IEEE Trans. on Cybernetics, 43, 5, 1318-1334 (2013).
Hoshino, F. Okano, H. Isono, and I. Yuyama, "Analysis of resolution limitation of integral photography," J. Opt. Soc. Am. A 15(8), 2059-2065 (1998).
Huffman, David A., A Method for the Construction of Minimum-Redundancy Codes, Proceedings of the IRE (IEEE, 1952), Sep. 1952, pp. 1098-1101.
International Preliminary Report on Patentability for Application No. PCT/US2019/045477 dated Feb. 25, 2021 (7 pages).
International Search Report and Written Opinion for Application No. PCT/US2019/045477 dated Mar. 5, 2020 (13 pages).
Jang and B. Javidi, "Three-dimensional synthetic aperture integral imaging," Opt. Lett. 27(13), 1144-1146 (2002).
Javidi et al., "Multidimensional Optical Sensing and Imaging System (MOSIS): From Macroscales to Microscales", Proceedings OP the IEEE, vol. 105 No. 5 May 5, 2017, pp. 850-875.
Javidi, B., Nonlinear joint power spectrum based optical correlation, ADDI. Opt. 28, DD. 2358-2367 (1989).
Kakue et al., "High-speed phase imaging by parallel phase-shifting digital holography", Optics Letters vol. 36 No. 21, pp. 4131-4133.
Kaushal et al., "Underwater Optical Wireless Communication", IEE Access Apr. 11, 2016, pp. 1518-1547.
Khalighi et al., "Underwater Wireless Optical Communications Using Silicon Photo-Multipliers", IEEE Photonics Journal, Jul. 14, 2017, 11 Pgs.
Krizhevsky, I. Sutskever, and G. Hinton, "Imagenet classification with deep convolutional neural networks," in the Neural Information Processing Systems Conference (2012), pp. 1097-1105.
Kullback et al., "On Information and Sufficiency", The Annal of Mathematical. Statistics vol. 22 No. 1, 1951, pp. 79-86.
Lathi et al., "Modern Digital and Analog Communication Systems", Book Oxford University Press 2010, 15 Pgs.
Lawrence, C. L. Giles, A. C. Tsoi, and A. D. Back, "Face recognition: a convolutional neural-network approach," IEEE Trans. Neural Netw. 8(1), 98-113 (1997).
Leith et al. "Imaging Through Scattering Media With Holography," J. Opt. Soc. Am. A9, 1148-1153 (1992) (6 Pages).
LeMaster et al., "Mid-Wave Infrared 3D Integral Imaging at Long Range" J. Display Technology 9(7): 545-551 (2013) [7 pages].
Levin and Q. Zhang, "A global analysis of factors controlling VIIRS nighttime light levels from densely populated areas," Remote Sens. Rev. 190, 366-382 (2017).
Li, Y. et al., Security and encryption optical systems based on a correlator with significant output images, Appl. Opt. 39, pp. 5295-5301 (2000).
Lin et al., "Radiative transfer simulations of the two-dimensional ocean glint reflectance and determination of the sea surface roughness", Applied Optics vol. 55 No. 6 Feb. 20, 2016, pp. 1206-1215.
Lippman, "Epreuves reversibles donnant la sensation du relief", Journal of Theoretical and Applied Physics, vol. 7 No. 1, 1908, pp. 821-825.
Liu et al., "An underwater acoustic direct sequence spread spectrum communication system using dual spread spectrum code", Frontiers of Information Technology & Electronic Engineering vol. 19 No. 8, 2018, pp. 972-983.
Llavador, E. Sánchez-Ortiga, G. Saavedra, B. Javidi, and M. Martinez-Corral, "Free-depths reconstruction with synthetic impulse response in integral imaging," Opt. Express 23(23), 30127-30135 (2015).
Lopez-Salcedo, "Simple Closed-Form Approximation to Ricean Sum Distributions", IEEE Signal Processing Letters, Apr. 2009, 4 Pgs.
Markman et al. "Learning in the dark: 3D integral imaging object recognition in very low illumination conditions using convolutional neural networks" OSA Continuum, 1(2):3068-3071 (2018).
Markman et al. "Three-dimensional object visualization and detection in low light illumination using integral imaging" Optic letters vol. 42, No. 16, Aug. 15, 2017 pp. 3068-3071.
Markman, A., Bahram Javidi, and Mohammad Tehranipoor. "Photon-counting security tagging and verification using optically encoded QR codes." Photonics Journal, IEEE 6.1 (2014): 6800609.
Markman, Adam, and Bahram Javidi. "Full-phase photon-counting double-random-phase encryption." JOSA A 31.2 (2014): 394-403.
Matoba et al., "Multimodal Imaging Based on Digital Holography", Proceedings of the IEEE vol. 105, No. 5, May 2017, pp. 906-923.
Matoba et al., Encrypted optical memory systems based on multidimensional keys for secure data storage and communications, IEEE Gire. Dev. Maa. 16, DD. 8-15 (2000).
Matoba, 0. et al., Optical techniques for information security, Proc. IEEE 97, pp. 1128-1148 (2009).
Mogensen et al., Phase-Only Optical Encryption, Apr. 2000, Optical Society of America, vol. 25 No. 8, pp. 566-568.
Mollah et al., "Comparative Analysis of Gold Codes with PN Codes Using Correlation Property in CDMA Technology" International Conference on Computer Communication and Informatics Jan. 10-12, 2012, 6 Pgs.
Ohbuchi, E. et al., Barcode readers using the camera device in mobile phones, in Proceedings of IEEE 2004 International Conference on Cyberworlds, M. Nakajima, ed. (IEEE, 2004), DD. 260-265.
Oiknin et al., "Compressive sensing resonator spectroscopy", Optics Letters vol. 42, No. 1, Jan. 1, 2017, pp. 25-28.

(56) References Cited

OTHER PUBLICATIONS

Okano, H. Hoshino, J. Arai, and I. Yuyama, "Real-time pickup method for a three-dimensional image based on integral photography," Appl. Opt. 36(7), 1598-1603 (1997).
Okoshi, "Three-Dimensional Displays", Proceedings of the IEEE, vol. 68, No. 5, 1980, pp. 548-564.
Palmese et al., "Spread Spectrum Modulation for Acoustic Communication in Shallow Water Channel", University of Connecticut, Paper No. 061215-038, IEEE © 2007, 4 Pgs.
Peng et al., "Generalization of the Dark Channel Prior for Single Image Restoration", IEEE Transactions on Image Processing, vol. 27. No. 6. Jun. 2018 , 2856-2868.
Peng et al., "Underwater Image Restoration Based on Image Blurriness and Light Absorption", IEEE Transactions on Image Processing, vol. 26, No. 4, Apr. 2017, pp. 1579-1594.
Perez-Cabre, E. et al., Information authentication using photon-counting double-random-phase encrypted images, Opt. Lett. 36, pp. 22-24 (2011).
Perez-Cabre, Elisabet et al., Photon-counting double-random-phase encoding for secure image verification and retrieval, Aug. 2012, Polytechnic University of Catalonica, Journal of Optics 14.
Petrášek and K. Suhling, "Photon arrival timing with sub-camera exposure time resolution in wide-field time-resolved photon counting imaging," Opt. Express 18(24), 24888-24901 (2010).
Phillips, D. Gruber, G. Vasan, C. Roman, V. Pieribone, and J. Sparks, "Observations of in situ deep-sea marine bioluminescence with a high-speed, high-resolution sCMOS camera," Deep Sea Res. Part I Oceanogr. Res. Pap. 111, 102-109 (2016).
Photron, FASTCAM, SA-X2 Datasheets, 2012, 6 pgs.
Proakis, Digital Communication Fourth Edition Book, McGraw-Hill 2000, 12 Pgs.
Proakis, et al. Digital Communication Fifth Edition Book, McGraw-Hill Higher Education, 2008, 15 Pgs.
Refregier et al., "Nonlinear joint-transform correlation: an optimal solution for adaptive image discrimination and input noise robustness", Optics Letters, vol. 19, No. 6, Mar. 15, 1994, pp. 405-407.
Refregier, P. et al., Optical image encryption based on input plane and Fourier plane random encoding, Opt. Lett. 20, DD. 767-769 (1995).
Sadjadi and A. Mahalanobis, "Automatic target recognition XXVIII," Proc. SPIE 10648, 106480I (2018).
Sadjadi et al., "Automatic Target Recognition XXVII", Proceedings of SPIE vol. 10202, April 10-11, 2017, 9 Pgs.
Shan et al, Application of QR Two-dimension Code Technology in Credits Certification System, Dec. 2013, ACM ICCC '13: Proceedings of the Second International Conference on Innovative Computing and Cloud Computing, pp. 222-224.
Song et al., "ROC operating point selection for classification of imbalanced data with application to computer-aided polyp detection in CT colonography", Int J CARS, 2014, pp. 79-89.
Stern, D. Aloni, and B. Javidi, "Experiments with three-dimensional integral imaging under low light levels," IEEE Photon. J. 4(4), 1188-1195 (2012).
Suzuki, H. et al., Experimental evaluation of fingerprint verification system based on double random phase encoding, Opt. Express 14, pp. 1755-1766 (2006).
Tajahuerce, Enrique, and Bahram Javidi. "Encrypting three-dimensional information with digital holography." Applied Optics 39.35 (2000): 6595-6601.
Takai et al., "Optical Vehicle-to-Vehicle Communication System Using LED Transmitter and Camera Receiver", IEEE Photonics Journal vol. 6 No. 5 Oct. 2014, 14 Pgs.
Tanzid et al. "Absorption-Induced Image Resolution Enhancement in Scattering Media," ACS Photonics. 3:1787-1793 (2016) (7 Pages).
Tavakoli, B. Javidi, and E. Watson, "Three dimensional visualization by photon counting computational Integral Imaging," Opt. Express 16(7), 4426-4436 (2008).
Thompson et al., "Imaging in Scattering Media by Use of Laser Speckle," J. Opt. Soc. Am. A 14, 2269-2277 (1997) (9 Pages).
Towghi, N. et al., Fully phase encryption image processor, J. Opt. Soc. Am. A 16, 1999, pp. 1915-1927.
Traver et al. Paper entitled "Human Gesture Recognition Using Three Dimensional Integral Imaging" J. Opt. Soc Am. A 31(10):2312-2320 (2014). [9 pages].
Treibitz et al., "Active Polarization Descattering", IEEE Trans. PAMI, vol. 31, No. 3, 2009, pp. 385-399.
Viola, M. Jones, and D. Snow, "Detecting pedestrians using patterns of motion and appearance," Int. J. Comput. Vis. 63(2), 153-161 (2005).
Wu et al. "Hiding Scattering Layers for Noninvasive Imaging of Hidden Objects," Scientific Reports vol. 5, 8375 (2015) (5 Pages).
Wu et al., Blue Laser Diode Enables Underwater Communication at 12.4Gbps, Scientific Reports, Published: Jan. 17, 2017, 10 Pgs.
Xia et al., "One million fps digital holography", Electronics Letters vol. 50 No. 23, Nov. 6, 2014, pp. 1693-1695.
Xiao et al., "Advances in three-dimensional integral imaging: sensing, display, and applications [Invited]", Applied Optics Vo. 52 No. 4, Feb. 1, 2013 pp. 546-560.
Yamaguchi and R. Higashida, "3D touchable holographic light-field display," Appl. Opt. 55(3), A178-A183 (2016).
Yoo, et al., "Imaging Through A Scattering Wall Using Absorption," Opt. Lett. 16, 1068-1070 (1991) (3 Pages).
Zweig et al., "Receiver-Operating Characteristic (AOC) Plots: A Fundamental Evaluation Tool in Clinical Medicine", Clinical Chemistry Vo. 39 No. 4, 1993, pp. 561-577.
Zhao et al., "A novel three-dimensional object detection with the modified You Only Look Once method," International Journal of Advanced Robotic Systems, Mar.-Apr. 2018: 1-13.

* cited by examiner

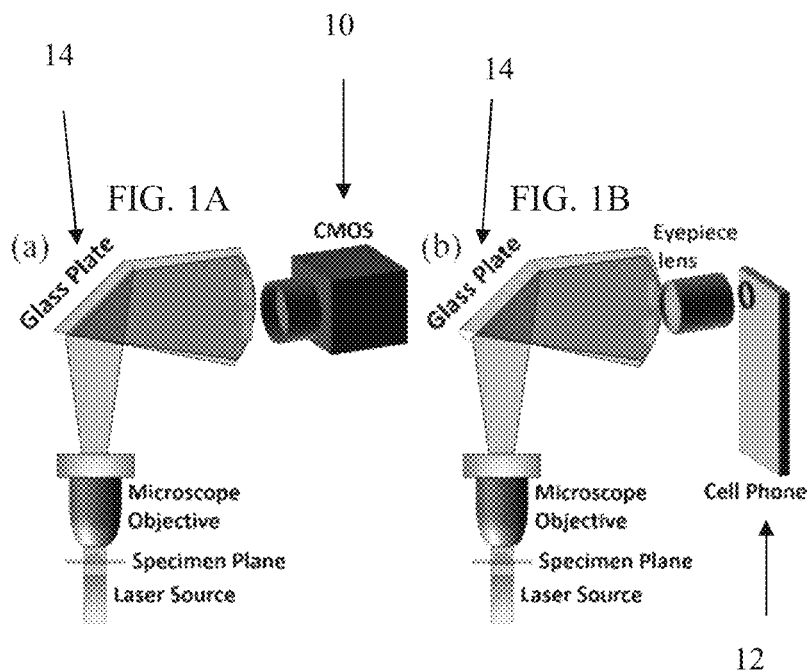
FIG. 1A
FIG. 1B
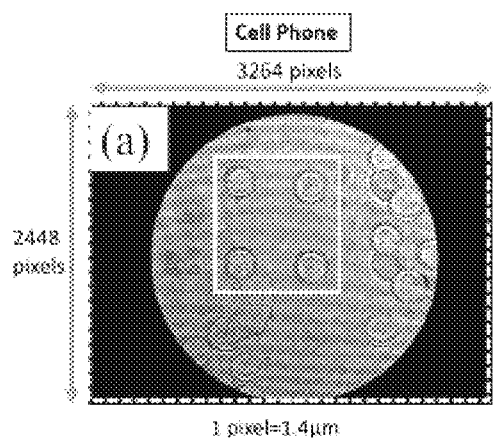
FIG. 2A
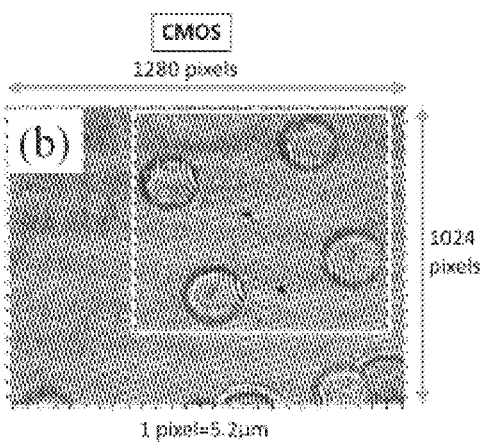
FIG. 2B

FIG. 6A
FIG. 6C
FIG. 6E
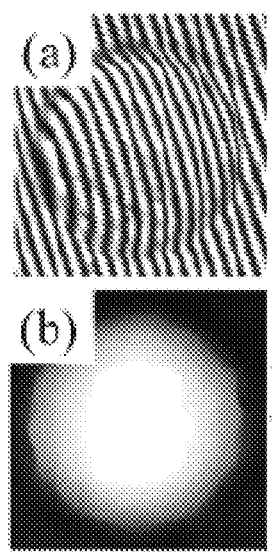
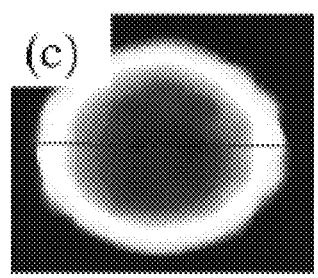
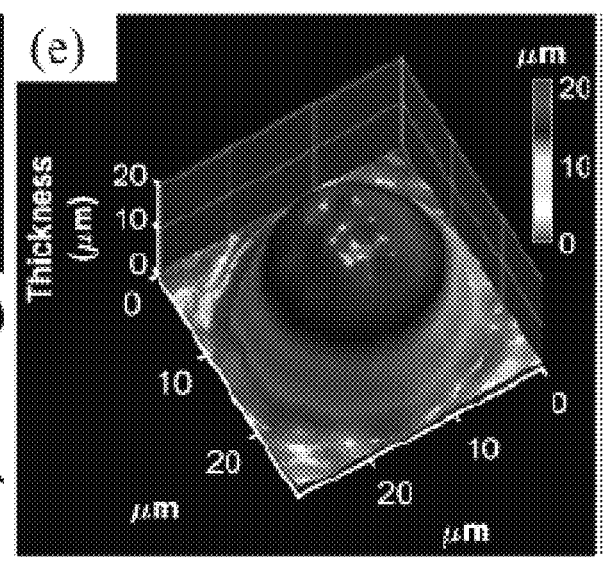
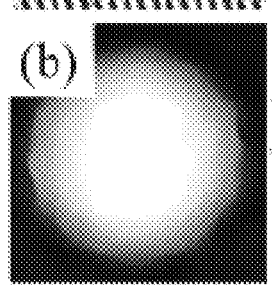
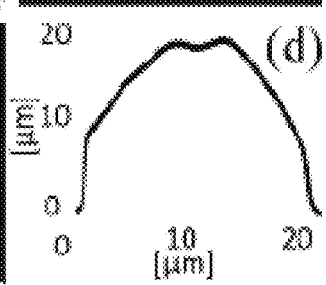
FIG. 6B
FIG. 6D FIG. 7A    FIG. 7B    FIG. 7D
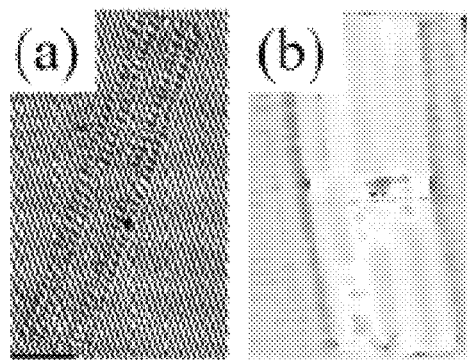
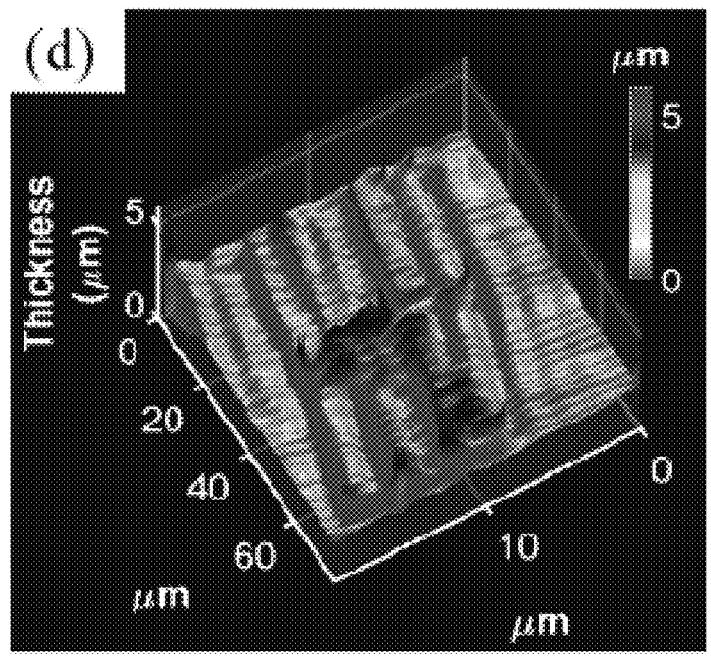
FIG. 7C
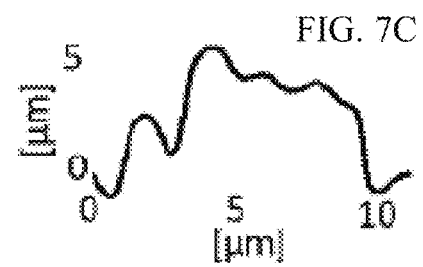
FIG. 7E    FIG. 7F
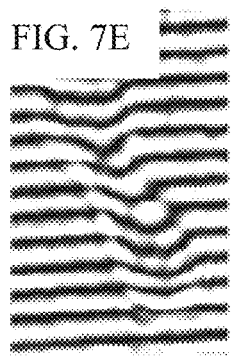 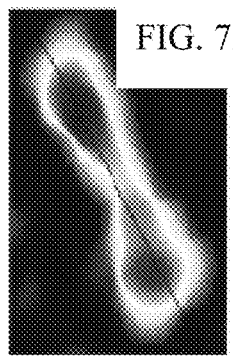
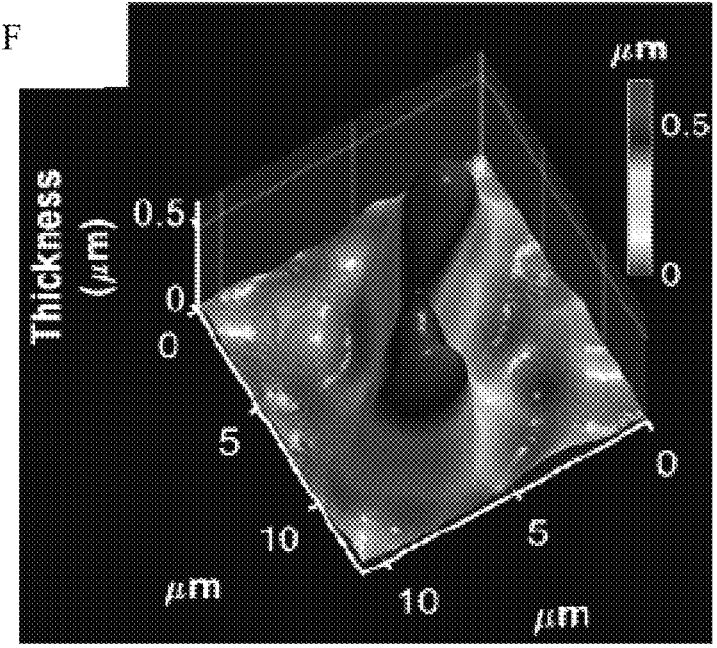
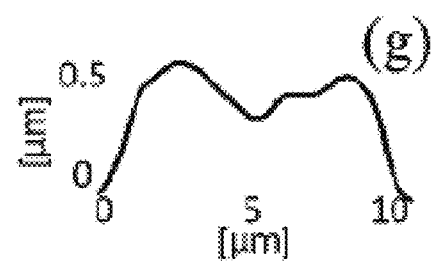
FIG. 7G    FIG. 7H FIG. 8A  FIG. 8C  FIG. 8E
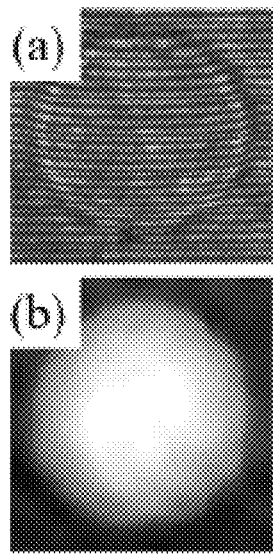
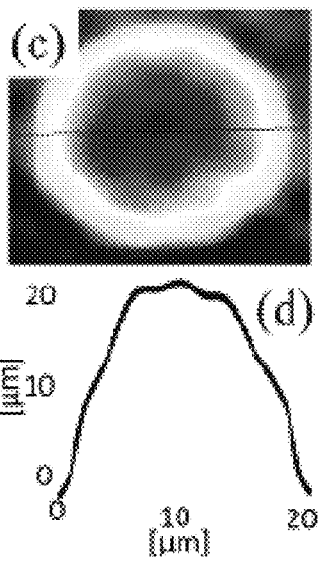
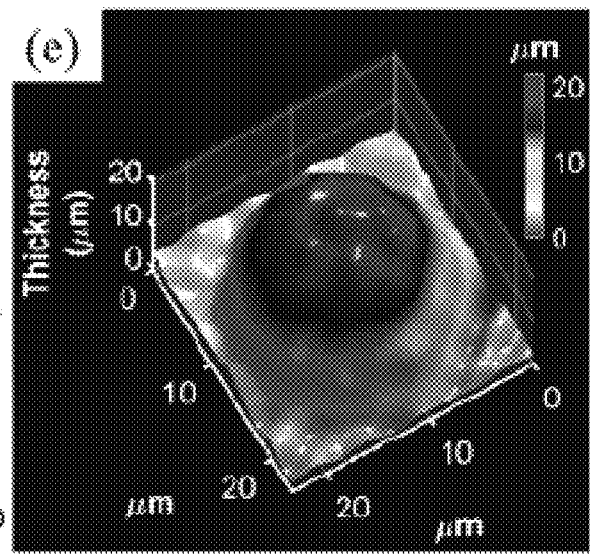
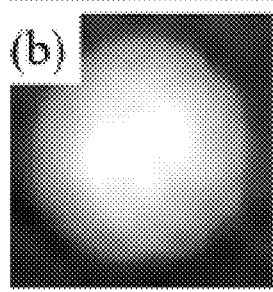
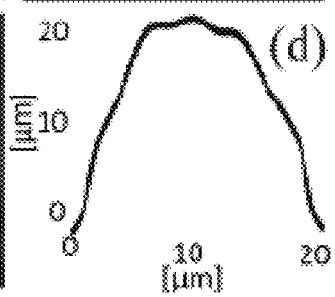
FIG. 8B  FIG. 8D FIG. 9A  FIG. 9C  FIG. 9E
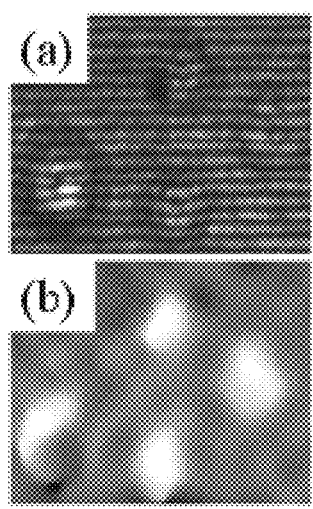
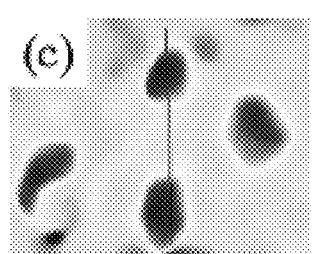
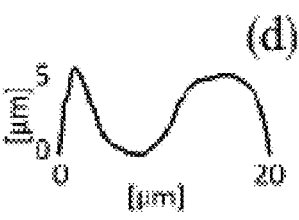
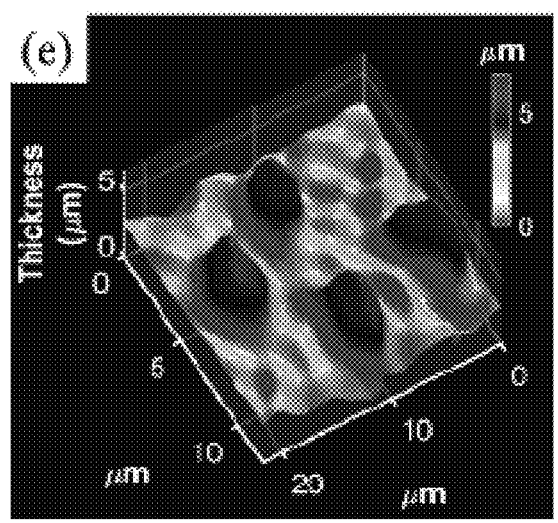
FIG. 9B  FIG. 9D FIG. 12A
FIG. 12B
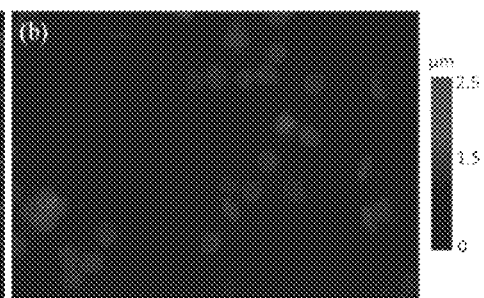

FIGURE 17
Example 3D reconstructed Image
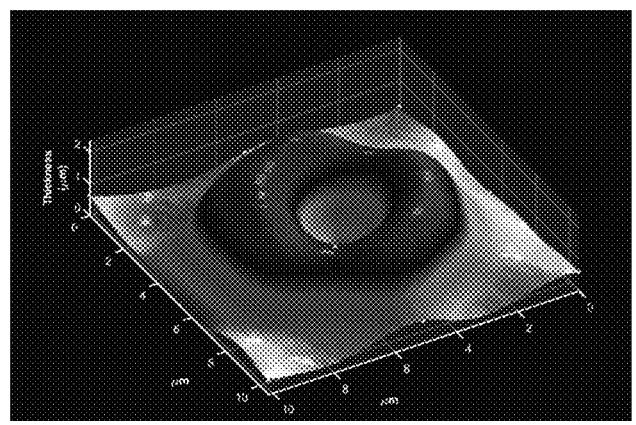
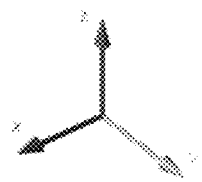

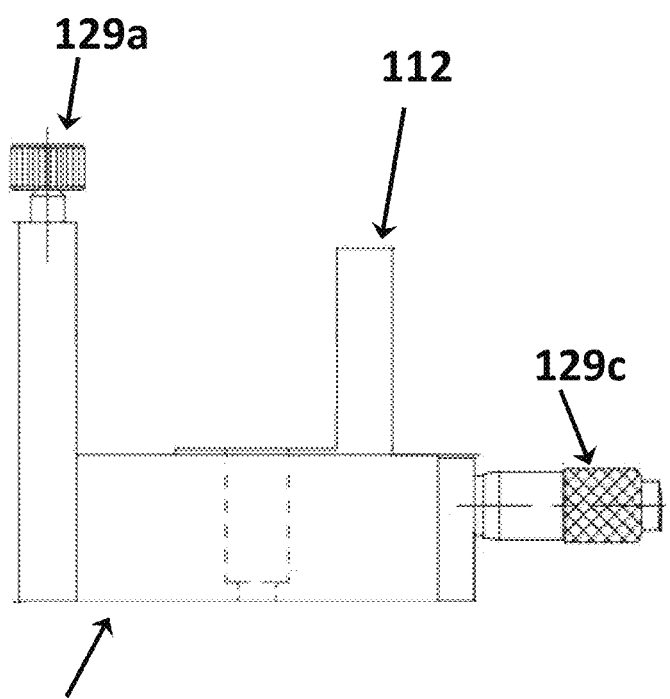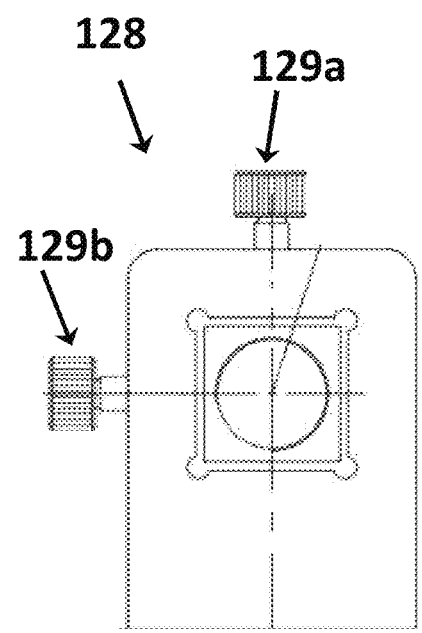
FIG. 25A
FIG. 25B

| Line Color on Graph | Setup used | Data collection location | Bench used | Laser Source | Stability (nm) | Standard deviation (nm) |
|---|---|---|---|---|---|---|
| Red (201) | black setup | Lab on 4th floor ITE (08/08/2017) | floating optical bench | He-Ne laser | 0.11 | 0.010 |
| Black (202) | black setup | Lab on 4th floor ITE (08/08/2017) | Non floating optical bench | He-Ne laser | 0.24 | 0.029 |
| Green (203) | black setup | Lab on 4th floor ITE (08/08/2017) | a wooden table | He-Ne laser | 0.27 | 0.030 |
| Cyan (204) | green setup | Lab in BECAT (07/25/2017) | non-floating optical bench | Red laser diode | 0.39 | 0.172 |
| Magenta (205) | grey setup | UCONN Health center (03/21/2017) | lab bench | Red laser diode | 0.78 | 0.445 |
| Blue (206) | black setup | UCONN Health center (03/21/2017) | lab bench | He-Ne laser | 0.79 | 0.015 |

AUTOMATED CELL IDENTIFICATION USING SHEARING INTERFEROMETRY

CROSS-REFERENCE TO RELATED APPLICATIONS

This application claims priority to U.S. Provisional Application Ser. No. 62/631,140, filed on Feb. 15, 2018, and entitled "Automated Cell Identification Using Shearing Interferometry" and to U.S. Provisional Application Ser. No. 62/631,268, filed on Feb. 15, 2018, and entitled "Portable Common Path Shearing Interferometry-Based Holographic Microscopy System." The content of each of the foregoing provisional applications is incorporated herein in their entireties.

STATEMENT OF GOVERNMENT SUPPORT

This invention was made with Government support under Grant 1545687 awarded by the National Science Foundation. The government has certain rights in the invention.

FIELD OF THE DISCLOSURE

The present disclosure relates generally to systems and methods for automated cell identification/classification and, more particularly, to systems and methods for automated cell identification/classification using shearing interferometry with a digital holographic microscope.

BACKGROUND OF THE DISCLOSURE

Currently, biomolecular analysis is typically used in order to diagnose sickle cell disease. However, such analysis can be expensive and cumbersome, particularly for developing countries.

An interest exists for improved systems and methods for cell identification. These and other inefficiencies and opportunities for improvement are addressed and/or overcome by the assemblies, systems and methods of the present disclosure.

SUMMARY OF THE DISCLOSURE

The present disclosure provides improved systems and methods for automated cell identification/classification. More particularly, the present disclosure provides advantageous systems and methods for automated cell identification/classification using a digital holographic microscope based on shearing interferometry.

In exemplary embodiments, the present disclosure provides for a compact, low-cost, and field-portable 3D printed system for automatic cell identification/classification using a common path shearing interferometry with digital holographic microscopy. This system has been tested and has demonstrated good results for sickle cell disease identification/classification with human blood cells.

The present disclosure provides a robust, low cost cell identification/classification system based on shearing interferometry that can be used for accurate cell identification/classification. For example, by combining both the static features of the cell along with information on the cell motility, identification/classification can be performed to determine the type of cell present in addition to the state of the cell (e.g., diseased vs. healthy).

The present disclosure provides for a method for automated classification of a micro-object, the method including obtaining digital holographic data from a sample imaged in a common path shearing digital holographic microscope, the digital holographic data including a hologram of at least one micro-object in the sample; determining a plurality of features for a micro-object in the hologram from the obtained digital holographic data, the plurality of features including three or more of: a mean thickness value for the micro-object; a coefficient of variation for the thickness of the micro-object; a thickness skewness value for the micro-object, where the thickness skewness measures the lack of symmetry of the thickness values from the mean thickness value; a thickness kurtosis value that describes the sharpness of the thickness distribution for the micro-object; a projected area for the micro-object; an optical volume of the micro-object; a ratio of the projected area to the optical volume for the micro-object; and a dry mass of the micro-object; determining whether the micro-object belongs to a particular type of micro-object by applying a pre-trained classifier to the determined plurality of features; and based on the determination, saving an indication of whether the micro-object belongs to a particular type of micro-object.

The present disclosure also provides for a method for automated classification of a micro-object wherein the pre-trained classifier is a random forest classifier.

The present disclosure also provides for a method for automated classification of a micro-object wherein the particular type of micro-object is a biological cell.

The present disclosure also provides for a method for automated classification of a micro-object wherein the particular type of micro-object is a microorganism.

The present disclosure also provides for a method for automated classification of a micro-object further including generating an unwrapped phase image based on the hologram of at least one micro-object in the sample and a hologram acquired without a sample; and identifying a portion or portions of the unwrapped phase image corresponding to the at least one micro-object based on analysis of the unwrapped phase image.

The present disclosure also provides for a method for automated classification of a micro-object wherein the common path shearing digital holographic microscope includes a laser source, a microscopic objective lens, a glass plate and an imaging device.

The present disclosure also provides for a method for automated classification of a micro-object wherein the particular type of micro-object is selected from the group consisting of glass beads, polystyrene beads, Diatom-Tabellaria cells, blood cells, yeast cells and E. coli bacteria.

The present disclosure also provides for a method for automated classification of a micro-object further including generating a 3D reconstructed height profile of the micro-object in the hologram.

The present disclosure also provides for a method for automated classification of a micro-object further including utilizing the generated 3D reconstructed height profile of the micro-object to determine the plurality of features for the micro-object.

The present disclosure also provides for a method for automated classification of a micro-object wherein the particular type of micro-object distinguishes between healthy or diseased blood cells, between healthy or diseased red blood cells, between healthy or cancerous cells, or between low or high cholesterol levels in the blood.

The present disclosure also provides for a method for automated classification of a micro-object, the method including obtaining digital holographic data from a sample imaged in a common path shearing digital holographic microscope, the digital holographic data including a video hologram of at least one micro-object in the sample recorded over a pre-determined time period; generating a plurality of 3D reconstructed height profiles of a micro-object in the video hologram, the plurality of 3D reconstructed height profiles obtained from a corresponding plurality of hologram frames spanning the pre-determined time period; generating a 2D mean map of the 3D reconstructed height profiles of the micro-object, the 2D mean map generated by determining the mean height for each pixel of the plurality of 3D reconstructed height profiles over the pre-determined time period; generating a 2D standard deviation map of the 3D reconstructed height profiles of the micro-object, the 2D standard deviation map generated by determining the standard deviation in height for each pixel of the plurality of 3D reconstructed height profiles over the pre-determined time period; determining the standard deviation of the 2D mean map to generate a value for a first feature for the micro-object in the video hologram; determining the standard deviation of the 2D standard deviation map to generate a value for a second feature for the micro-object in the video hologram; determining optical flow vectors between 3D reconstructed height profiles corresponding to successive frames for each 3D reconstructed height profile after the first 3D reconstructed height profile; determining the mean of the magnitude of the optical flow vectors over the pre-determined time period; determining the standard deviation of the mean of the magnitude of the optical flow vectors of the plurality of 3D reconstructed height profiles over the pre-determined time period to generate a value for a third feature for the micro-object in the video hologram; determining whether the micro-object belongs to a particular type of micro-object by applying a pre-trained classifier to the value of the first feature, the value of the second feature and value of the third feature; and based on the determination, saving an indication of whether the micro-object belongs to a particular type of micro-object.

The present disclosure also provides for a method for automated classification of a micro-object wherein the pre-trained classifier is a random forest classifier.

The present disclosure also provides for a method for automated classification of a micro-object wherein the particular type of micro-object is a healthy red blood cell.

The present disclosure also provides for a method for automated classification of a micro-object wherein the particular type of micro-object is a sickled red blood cell.

The present disclosure also provides for a method for automated classification of a micro-object wherein the particular type of micro-object is a biological cell or a microorganism.

The present disclosure also provides for a method for automated classification of a micro-object wherein the common path shearing digital holographic microscope includes a laser source, a microscopic objective lens, a glass plate and an imaging device.

The present disclosure also provides for a method for automated classification of a micro-object wherein the sample includes blood.

The present disclosure also provides for a method for automated classification of a micro-object wherein the plurality of hologram frames of the video hologram of the at least one micro-object in the sample are recorded at a rate of between 20 and 40 frames per second.

The present disclosure also provides for a method for automated classification of a micro-object wherein the plurality of hologram frames comprise between 100 and 900 frames.

The present disclosure also provides for a method for automated classification of a micro-object wherein the plurality of hologram frames comprise between 400 and 700 frames.

Any combination or permutation of embodiments is envisioned. Additional advantageous features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIGS. 1A-1B: FIG. 1A shows an exemplary single path setup using a CMOS sensor; and FIG. 1B shows an exemplary single path setup using a cell phone sensor;

FIGS. 2A-2B: FIG. 2A shows a field of view (FOV) of a cell phone used in experiments; and FIG. 2B shows a field of view of a CMOS sensor used in experiments;

FIGS. 6A-6E show experimental results for the compact 3D printed DH microscope shown in FIG. 3 using the CMOS sensor; FIG. 6A shows a digital hologram of a 20 μm glass bead; FIG. 6B shows unwrapped phase profile of the same bead; FIG. 6C shows a 2D thickness profile; FIG. 6D shows a 1D cross-sectional profile of the bead along the line shown in FIG. 6C; and FIG. 6E shows a pseudocolor 3D rendering of the thickness profile for the glass bead;

FIGS. 7A-7H: FIG. 7A shows a digital hologram of Diatom-Tabellaria using the CMOS sensor; FIG. 7B shows a 2D thickness profile; FIG. 7C shows a 1D cross-sectional profile of diatom along the line shown in FIG. 7B; FIG. 7D shows a pseudocolor 3D rendering of the thickness profile for the diatom; Likewise, FIGS. 7E-7H are the digital hologram, 2D thickness profile, 1D cross-sectional profile, and pseudocolor 3D rendering of the thickness profile for *E. coli* bacteria, respectively;

FIGS. 8A-8E show experimental results for the more compact 3D printed DH microscope as shown in FIG. 4: FIG. 8A shows a digital hologram of a 20-μm glass bead;

FIG. 8B shows the unwrapped phase profile of a 20-μm glass bead and FIG. 8C shows a 2D thickness profile; FIG. 8D shows a 1D cross-sectional profile of the bead along the line shown in FIG. 8C; FIG. 8E shows a pseudocolor 3D rendering of the thickness profile for the glass bead;

FIGS. 9A-9E show experimental results for the more compact 3D printed DH microscope shown in FIG. 4: FIG. 9A shows a digital hologram of yeast cells; FIG. 9B shows the unwrapped phase profile for the same cells; FIG. 9C shows a 2D thickness profile; FIG. 9D shows a 1D cross-sectional profile of the yeast cells along the line shown in FIG. 9C; FIG. 9E shows a pseudocolor 3D rendering of the thickness profile for the yeast cells;

FIGS. 12A-12B: Show thickness profile for blood smears from (FIG. 12A) a healthy volunteer, and (FIG. 12B) a patient with SCD;

FIG. 17 shows an example of a 3D reconstructed image;

FIG. 18A shows optical flow between frame 1 and frame 2; and FIG. 18B shows optical flow between frame 2 and frame 3;

FIG. 25A is a side view of a lens and stage mounting component of the system of FIG. 19A;

FIG. 25B is a top view of the lens and stage mounting component of FIG. 25A;

FIG. 39 is a table of experimental temporal stability data acquired using different example systems placed in varying locations that exhibit different sources of noise;

DETAILED DESCRIPTION OF DISCLOSURE

Figure 3:
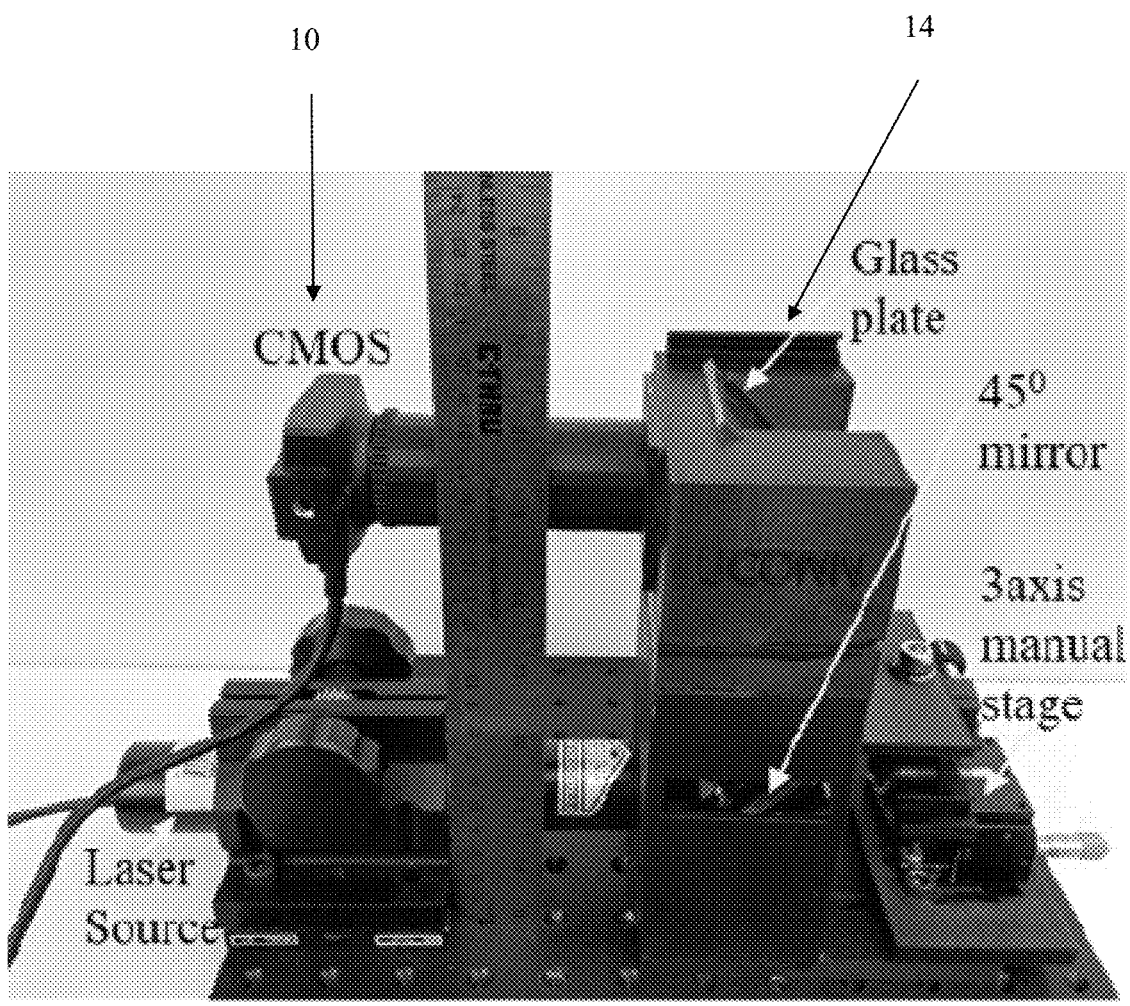
FIG. 3 shows a 3D printed prototype of the DH microscope (with CMOS sensor) with the dimensions of 304× 304×170 mm (with the breadboard); the weight of the system was 4.62 kg with the HeNe laser and breadboard and 800 g without the HeNe laser and breadboard.

The exemplary embodiments disclosed herein are illustrative of advantageous methods for automated cell identification/classification, and systems of the present disclosure and assemblies or techniques thereof. It should be understood, however, that the disclosed embodiments are merely exemplary of the present disclosure, which may be embodied in various forms. Therefore, details disclosed herein with reference to exemplary assemblies and identification/classification methods and associated processes/techniques of assembly and use are not to be interpreted as limiting, but merely as the basis for teaching one skilled in the art how to make and use the advantageous methods for automated cell identification/classification and/or alternative systems of the present disclosure.

The present disclosure provides improved systems and methods for automated cell identification/classification. More particularly, the present disclosure provides advantageous systems and methods for automated cell identification/classification using a digital holographic microscope based on shearing interferometry.

In general, the present disclosure provides for a compact, low-cost, and field-portable 3D printed system for automatic cell identification/classification using a common path shearing interferometry with digital holographic microscopy. This system has demonstrated good results for sickle cell disease identification/classification with human blood cells.

The exemplary system can be used to acquire holographic images of cells, which are then reconstructed to a 3D image. Using this static information, morphological cell features from the reconstructed 3D height profiles can be extracted. In addition, the system can acquire video data of a cell. Each frame of the video of the hologram can be reconstructed. These reconstructions are then combined to form a 3D volume. The cell motility for a time sequence is then recorded and analyzed. Some embodiments of systems and methods employ either static features or dynamic features of the cells for identification/classification of the cells and the state of the cell (e.g., diseased vs. healthy). Also, by combining both the static features of the cell along with information on the cell motility, identification/classification can be performed to determine the type of cell present in addition to the state of the cell (e.g., diseased vs. healthy). As such, the present disclosure provides that a robust, low cost cell identification/classification system based on shearing interferometry can be used for accurate cell identification/classification.

For example, a potential user of the exemplary system/method is a medical professional who desires to analyze a blood sample of a patient. Another potential user may be a medical professional in a remote region with limited accessibility to blood labs and desires to analyze a blood sample of a patient based on the 3D profile and motility of a cell.

The disclosed imaging system/method may also be useful to researchers in medical fields that desire to extract 3D information or motility information on cells they are analyzing or culturing since the disclosed system/method is low cost and can quickly provide this information.

This exemplary system of the present disclosure is important because it is a compact and low cost diagnosis system allowing it to be portable and affordable. Moreover, the system can quickly image a cell and generate a 3D imaging allowing an end user to visualize 3D representation of the cell, and to also extract three-dimensional features on the cell in addition to cell motility information. In general, traditional bright-field microscopes do not provide this information. In addition, the system can rapidly identify/classify a cell based on the 3D information. This can be extremely important as cell identification/classification can take days and sometimes might not be rapidly available if performed in remote areas or developing countries.

The system can provide rapid diagnosis of a cell based on optical signature and its motility which are measured and analyzed with novel analytical approaches. Also, the system can display a 3D image of a cell along with three-dimensional features and information on the movement of the cell. Another unique aspect of the present disclosure is that the imaging system itself can be designed to be compact and field portable. It can include mostly 3D printed parts and other components allowing it to be an inexpensive and compact system. By examining both the static and dynamic features, a rapid diagnosis of a cell is possible. The capturing device used in the system can be a cell-phone camera or a webcam or the like.

The 3D printed prototype can serve as a low-cost alternative for home care, point of care, and the developing world, where access to laboratory facilities for disease diagnosis are limited. Alternately, the exemplary system can enable the user to send the acquired holograms over the internet to a computational device located remotely for cellular identification and classification and/or analysis.

Some advantages of the disclosed systems/methods of the present disclosure include, without limitation: (i) some embodiments utilize dynamic cell behavior information as well as other opto-biological signatures; other embodiments mainly utilize static signatures; (ii) the dynamic signature analysis (e.g., using live human cells (healthy and diseased)) utilize different algorithms because of the dynamic signatures employed; (iii) a novel compact field portable design of the optical system to be used outside of the lab using regular desks, tables, for use in hospitals, doctors offices, and homes, etc; for example, the system has been 3D printed for use in hospitals; (iv) the system has been demonstrated to be effective for sickle cell disease identification/classification.

The present disclosure will be further described with respect to the following examples; however, the scope of the disclosure is not limited thereby. The following examples illustrate the advantageous systems, methods and assemblies for automated cell identification/classification of the present disclosure.

Example 1: Compact and Field-Portable 3D Printed Shearing Digital Holographic Microscope for Automated Cell Identification In exemplary embodiments, the present disclosure provides a low-cost, compact, and field-portable 3D printed holographic microscope for automated cell identification/classification based on a common path shearing interferometer setup. Once a hologram is captured from the portable setup, a 3D reconstructed height profile of the cell is created. One can extract several morphological cell features from the reconstructed 3D height profiles, including mean physical cell thickness, coefficient of variation, optical volume (OV) of the cell, projected area of the cell (PA), ratio of PA to OV, cell thickness kurtosis, cell thickness skewness, and the dry mass of the cell for identification using the random forest (RF) classifier. The 3D printed prototype can serve as a low-cost alternative for the developing world, where access to laboratory facilities for disease diagnosis are limited. Additionally, a cell phone sensor can be used to capture the digital holograms. This enables the user to send the acquired holograms over the internet to a computational device located remotely for cellular identification and classification and/or analysis. The disclosed 3D printed system can be used as a low-cost, stable, and field-portable digital holographic microscope as well as an automated cell identification system. As such, the present disclosure provides for automatic cell identification using a low-cost 3D printed digital holographic microscopy setup based on common path shearing interferometry.

Digital holographic microscopy (DHMIC) is a label-free imaging modality that enables the viewing of microscopic objects without the use of exogenous or contrast agents. DHMIC provides high axial accuracy; however, the lateral resolution can be dependent on the magnification of the objective lens used. DHMIC overcomes two problems associated with conventional microscopy: the finite depth of field, which is inversely proportional to the magnification of the objective; and low contrast between the cell and the surrounding media. Cells alter the phase of the probe wavefront passing through the specimen, depending on the refractive index and thickness of the object. Several methods have been developed to transform the phase information of the object into amplitude or intensity information, but these methods typically only provide qualitative information and lack quantitative information. Staining methods, such as the use of exogenous contrast agents, can enhance the image contrast, but it might change the cell morphology or be destructive. Due to the availability of fast CCD and CMOS sensors, it is possible to record digital holograms in real time. The recorded holograms can be numerically reconstructed by simulating the process of diffraction using scalar diffraction, leading to the complex amplitude of the object. This complex amplitude contains the spatial phase information of the object, from which one can reconstruct the phase profile of the object. A digital holographic microscope integrated with pattern recognition algorithms has been proposed for automated cell identification. Some digital holographic approaches have been proposed for automated cell identification.

In general, digital holography and microscopy are complementary techniques, and when combined, they can be useful for studying cells in a quantitative manner. To study dynamic parameters of the cell, such as cell membrane fluctuations, one should have a very stable setup because these fluctuations occur over just a few nanometers. One problem with existing digital holographic (DH) microscopy setups that use a double path configuration, is that the beams travel in two different arms of the interferometer and are then combined using a beam-splitter. As a result, the two beams may acquire uncorrelated phase changes due to mechanical vibrations. In comparison to two beam or double path interferometric setups, common path setups are more robust and immune to mechanical vibrations. In a common path setup, the two beams travel in the same direction, that is, the direction of beam propagation. There are some common path configurations; however, exemplary embodiments of the present disclosure utilize the self-referencing lateral shearing configuration due to simplicity and cost-effectiveness.

In this disclosure, a low-cost, compact, and field-portable 3D printed DH imaging system that can be used for automated cell identification is disclosed. The system includes a laser source, a microscopic objective lens, a glass plate, and an imaging device (e.g., CMOS camera or a cell phone camera). Some of the components used to fabricate the setup can be off-the-shelf optical components or printed from a 3D printer, leading to a low-cost, compact, and field-portable bio-sensing device. Once a hologram is recorded, a 3D profile reconstruction is created. Features are extracted from the reconstruction. The features are inputted into a pre-trained random forest classifier, which then identifies the cell. An exemplary system provided by this disclosure can be used as a low-cost, stable, and field-portable DH microscope and an automated cell identification system.

System Design and Camera Parameter Estimation:

The schematic for the common path setup used for cell identification is shown in FIGS. 1A-1B. A laser source (λ=633 nm) illuminates the sample under inspection and a microscopic objective magnifies the sample. A fused silica glass plate 14 splits the beam, generating two laterally sheared object beams. These two sheared beams interfere over the imaging sensor (CMOS or cell phone), and interference fringes are observed.

For the DHMIC setup in FIG. 1A, the CMOS sensor 10 used was a Thorlabs 8 bit, 5.2 μm pixel pitch, model DCC1545M, which has a large dynamic range and a 10-bit internal analog-to-digital conversion, but it transfers images to the PC with a bit depth of 8 bits to improve the readout time of the camera. For the cell phone sensor 12 setup (FIG. 1B), a Google Nexus 5, which has an 8 MP primary camera, 1/3.2" sensor size, and 1.4 μm pixel size, was used. Moreover, the cell phone camera 12 used 8 bits/channel. When comparing the camera sensor 10 with the cell phone sensor 12, the dynamic range of the cell phone sensor 12 may be lower due to the small sensor and pixel size, as the pixel wells fill quickly due to low saturation capacity. Moreover, the cell phone sensor 12 has a Bayer filter for color detection. Finally, the cell phone camera sensor 12 has a lower SNR than the CMOS camera 10. One reason is that the images generated from the cell phone camera 12 are in the JPEG format, which is a lossy compression scheme resulting in a poorer image quality. The CMOS camera 10 can save images as .bmp, which does not compress the images.

It is important to calculate the camera parameters. One can utilize ImageJ (a public domain software: https://imagej.nih.gov/ij/) to establish an equivalence between the pixel covered by the object (also taking optical magnification into account) and the distance in microns for the cell phone sensor and CMOS. FIGS. 2A-2B show the equivalence between the pixels and the distance in microns.

The test object used in FIGS. 2A-2B was a 20-μm glass bead (SPI supplies), the other beads as observed in FIGS. 2A-2B (solid yellow boxes around the objects) were the sheared copies of the same objects. Moreover, the field of view (FOV) of the DH microscope can depend on the objective and eyepiece lens used. A higher magnification objective gives a small FOV, as the sensor must image a more magnified object in comparison to a lower magnification lens; hence, a relatively smaller, magnified specimen region can be imaged on the sensor. One can utilize 40× objective lenses with a numerical aperture (NA) of 0.65. The actual magnification depends on the placement of the camera sensor from the objective. The theoretically achievable lateral resolution with this objective is 0.595 μm. The eyepiece used with the cell phone setup had a magnification of 25×. Table 1 below summarizes the parameter values for the CMOS and the cell phone sensor. FIG. 3 depicts an exemplary 3D printed prototype of the DH microscope.

TABLE 1

Camera Parameters

| Camera Parameters | Camera Type | |
| --- | --- | --- |
| | CMOS | Cell Phone Sensor |
| Magnification | 52× | 17× |
| Available sensor area (ASA) | 35 mm$^2$ | 7.78 mm$^2$ |
| Usable FOV (vertical) | 104 μm | 260 μm |
| Usable FOV (horizontal) | 130 μm | 260 μm |
| Pixel size | 5.2 μm | 1.4 μm |
| Sensor type | Mono | Color |

Figure 4:
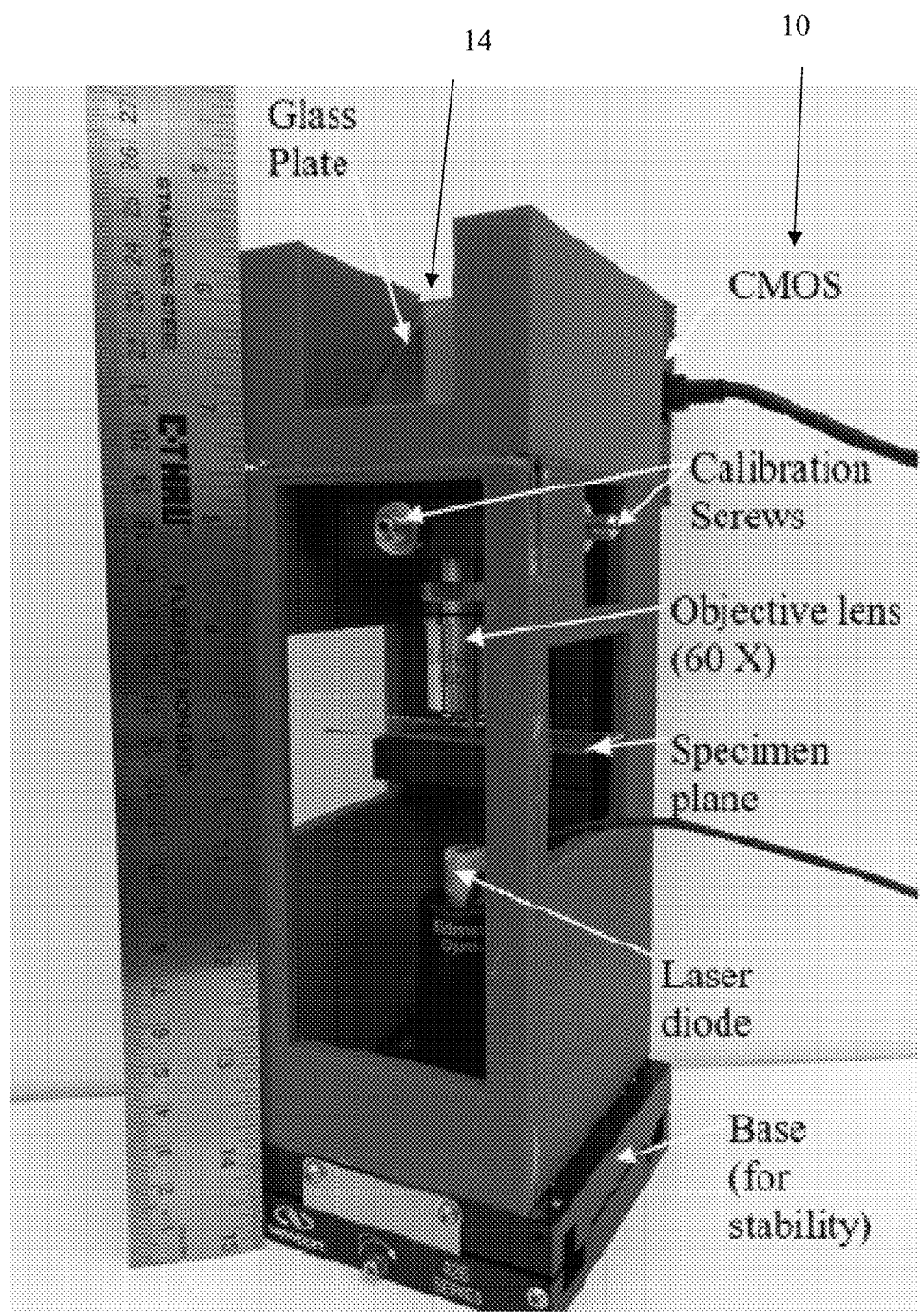
FIG. 4 shows a compact 3D printed prototype of the DH microscope with a laser diode with the dimensions of 75×95×200 mm; the setup weighed 910 g (without the base) and 1.365 kg (with the base)

FIG. 3 is an exemplary prototype with CMOS sensor 10, which is analogous to the schematic shown in FIG. 1A. To use the cell phone sensor with the 3D printed setup shown in FIG. 3, one can replace the CMOS 10 with the eyepiece and the cell phone 12, as shown in FIG. 1B. A cell phone adapter was 3D printed to hold the camera and eyepiece in place. This system weighed 4.62 kg with the HeNe laser and breadboard and 800 g without the HeNe laser and breadboard. In addition, one can design and construct a more compact 3D-printed DHMIC prototype with a smaller form factor, which is shown in FIG. 4. This system uses a laser diode (Thorlabs, CPS 635) with a wavelength of 635 nm and an elliptical beam profile in place of the HeNe laser. Moreover, the system weighed 910 g (without the base) and 1.356 kg (with the base). In FIG. 4, the dimensions of the 3D printed DHMIC prototype were 75×95×200 mm.

3D Reconstruction of Micro-Objects Using the 3D-Printed Shearing DH Setup:

For the 3D printed DHMIC setup (see FIG. 3), a collimated HeNe laser beam passes through a sample that is magnified by an objective lens (40× magnification). In this DH microscope employing lateral shearing geometry, holograms, instead of shearograms, are formed at the detector. This is achieved by introducing shear much larger than the magnified object image so that the images from the front and back surface of the glass plates are spatially separated. Portions of the wavefront (reflected from the front or back surface of the glass plate 14) unmodulated by the object information act as the reference wavefront and interfere with portions of the wavefront (reflected from the back or front surface of the glass plate 14) modulated by the object, which acts as the object wavefront. If the shear amount is larger than the sensor dimension, the second image (either due to reflection from the front or back surface) falls outside the sensor area. If the sensor dimension is more than the shear amount, redundant information about the object is recorded. It should be noted that the full numerical aperture (NA) of the magnifying lens is utilized in the formation of the holograms. As a result, full spectral information is used in the image reconstructions, and only the NA of the imaging lens limits the imaging. In the reconstruction, the size of the filter window of the Fourier transformed holograms should be limited due to unwanted sidebands. These sidebands may appear because of the non-uniform intensity variation at the detector plane, leading to a change in the contrast of the interference fringes. Another reason may be intensity image saturation leading to a non-sinusoidal fringe pattern. In addition, the size of the filter window decides the maximum spatial frequency available in the reconstructed images. In the case of CMOS sensors 10 and cell phone cameras 12, the lateral resolution in the reconstructed images is not limited by the imaging lens, but by the size of the filter window. In an exemplary setup, the computed lateral resolution of the system (see FIGS. 1 and 3), taking into consideration the filter window size, is approximately 1.2 um. In addition, for the system (blue shearing setup, see FIG. 4) with the laser diode and CMOS sensor 10, the computed lateral resolution is 0.9 um.

The lateral shear caused by the glass plate 14 helps to achieve off-axis geometry, which enhances the reconstructions and simplifies the numerical processing of the digital holograms, which is typically not possible in in-line DHMIC setups such as Gabor holography. Moreover, the carrier fringe frequency of the interferogram should not exceed the Nyquist frequency of the sensor, as the carrier fringe frequency is related to the off-axis angle caused by the lateral shear generated by the glass plate 14. This means the fringe frequency is a function of the thickness of the glass plate 14. Thus, a thicker glass plate 14 can be used to increase the off-axis angle. The fringe frequency is $f_s=S/r\lambda$, where S denotes the lateral shift induced by the glass plate, $\lambda$ is the wavelength of light source, and r is the radius of curvature of the wavefront. Moreover, the relationship between shift (S), glass plate thickness (t), incidence angle on glass plate ($\beta$), and refractive index of glass (n) is given as follows: $S/t=\mathrm{Sin}(2\beta)(n^2-\sin\beta)^{-1/2}$. Hence, a 3-5-mm glass plate is sufficient for exemplary experiments, enabling spatial filtering the spectrum and satisfying the Nyquist criteria for sampling. To have more control over the off-axis angle, a wedge plate can be used.

Figure 5:
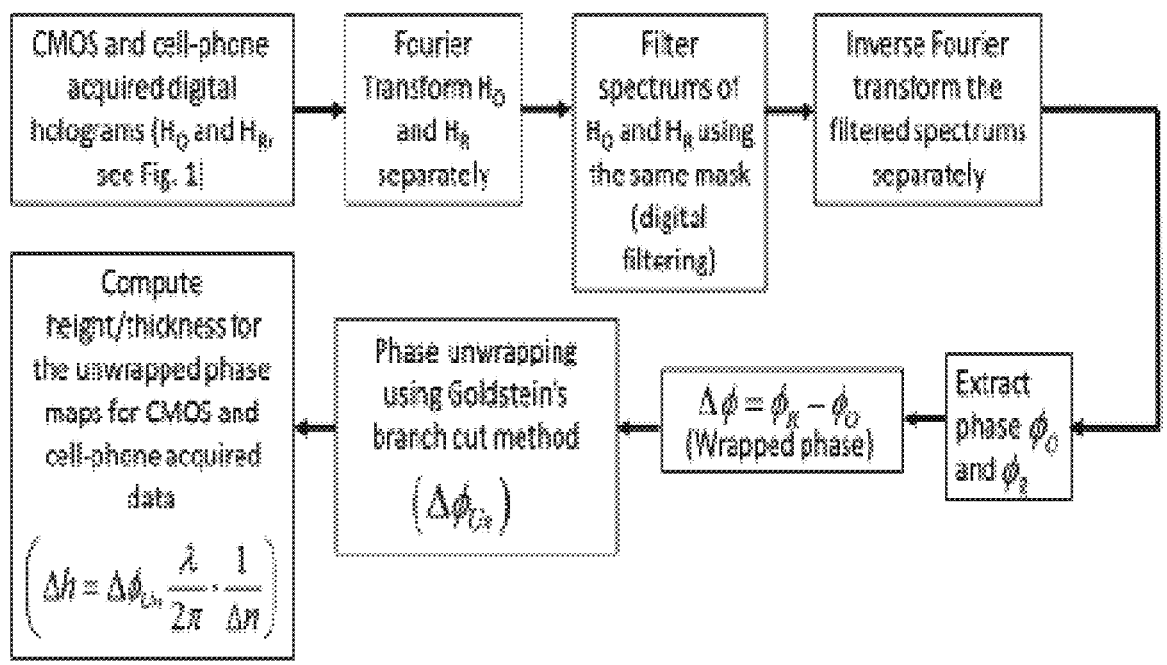
FIG. 5 shows a flowchart of the 3D reconstruction algorithm from the recorded hologram; $\Delta n = n_o - n_m$ is the refractive index difference between the object and surrounding medium.

An exemplary object reconstruction process is shown in FIG. 5. The Fourier transform of the digital hologram is taken, filtered (digital filtering of the real part of spectrum in Fourier domain), and then inverse Fourier transformed, generating the phase map. One can record two holograms: one with object and background ($H_O$), and another with background only ($H_R$). One can inverse Fourier transform the filtered spectrums separately to obtain the object and background phase ($\Delta\phi_O$) and the background phase ($\Delta\phi_R$). To obtain the phase information due to object only, one can subtract the phase map of object and background from the phase map with background only; this process also removes most of the system-related aberrations.

The phase was then unwrapped using the Goldstein's branch cut method. After phase unwrapping, one can compute the cell height/thickness, $\Delta h$, where $\Delta\phi_{Un}$ is the unwrapped phase difference, $\lambda$ is the source wavelength, and $\Delta n$ is the refractive index difference between the object and the surroundings.

Imaging Test Microspheres and Cells for the 3D Printed Setup Using a HeNe Laser:

To test the performance of the system, which utilized the CMOS camera 10 shown in FIG. 3, one can use 20-μm glass microspheres (SPI supplies) with a mean diameter of 19.9 plus/minus 1.4 μm and average refractive index $n_o=1.56$. These microspheres were immersed in oil (average refractive index, $n_m=1.518$) and then spread on a thin microscopic glass slide and covered with a thin coverslip. The digital holograms were recorded, and the 3D profiles were reconstructed using the steps mentioned in FIG. 5.

In FIG. 5, $\Delta n=n_o-n_m$, is the refractive index difference between the object and surrounding medium used in the reconstruction process. The reconstruction results using the steps mentioned in FIG. 5 were implemented and are shown in FIGS. 6A-6E.

FIG. 6A is the digital hologram of a 20-μm glass bead, acquired using the CMOS sensor. FIG. 6B shows the unwrapped phase profile of the bead. FIG. 6C shows the height variations, as depicted by color maps, and FIG. 6D is the one-dimensional cross-sectional profile, along the line (see FIG. 6C). FIG. 6E shows the pseudocolor 3D rendering of the thickness profile for the same bead. One can compute the thickness/diameter for 50 20-μm glass microspheres, where the mean diameter was 17.38 plus/minus 1.38 μm, which was close to the thickness value specified by the manufacturer.

The experiments were repeated for biological cells, such as Diatom-Tabellaria ($n_m=1.50$) and E. coli bacteria ($n_m=1.35$). Both cell types were immersed in deionized water ($n_m=1.33$). FIG. 7A shows the digital hologram of the Diatom-Tabellaria cells. FIG. 7B shows the height variations depicted by color maps, FIG. 7C shows the 1D cross-sectional profile of the diatom along the line, and FIG. 7D is the reconstructed 3D height profile for the diatom. Likewise, FIGS. 7E-7H are the digital hologram, the height variations depicted by color maps, the 1D cross-sectional profile along the line (see FIG. 7F), and the reconstructed 3D height profile for the E. coli bacteria. From FIG. 7H, one can see that the length of E. coli is close to 12 μm, the width is between 2-4 μm, and maximum height is 0.6 μm.

Imaging Test Microspheres and Cells for the More Compact 3D Printed Setup Using a Laser Diode:

To show the 3D reconstruction capabilities with the more compact 3D printed DH microscope shown in FIG. 4, one can implement numerical reconstruction steps, as mentioned previously for FIG. 5.

FIG. 8A is the digital hologram of a 20-μm glass bead ($n_o=1.56$) immersed in oil ($n_m=1.5181$) that was acquired using the CMOS sensor. The bead diameter (obtained experimentally) is 17.427 μm plus/minus 0.9029 μm.

FIG. 8B shows the unwrapped phase profile of the bead. FIG. 8C shows the height variations depicted by the color maps, and FIG. 8D is the one-dimensional cross-sectional profile along the line (see FIG. 8B). FIG. 8E shows the pseudocolor 3D rendering of the thickness profile for the same bead.

Likewise, one can perform 3D reconstructions for yeast cells ($n_o=1.53$) immersed in deionized water ($n_m=1.33$).

FIG. 9A is the digital hologram of yeast cells immersed in distilled water acquired using the CMOS sensor. FIG. 9B shows the unwrapped phase profile of the cells. FIG. 9C shows the height variations depicted by color maps, and FIG. 9D is the one-dimensional cross-sectional profile, along the line (see FIG. 9C). FIG. 9E shows the pseudocolor 3D rendering of the thickness profile for the same cells.

In the reconstructions, roughness around and on the objects was observed. This roughness can be attributed to optical thickness variations. Microspheres may not be smooth. Moreover, the optical thickness variation of the object and its surroundings depends on either change in the real thickness or due to spatially changing refractive index (due to density change) in the micro-sphere and its surroundings.

The size of the roughness is approximately 1-2 μm, which becomes visible as the window size becomes large enough to accommodate the spatial frequencies. One can obtain smooth reconstructions if the size of the filter window is reduced. Other possible reasons for the roughness is sample deformations and the presence of impurities.

Temporal Stability of the Compact 3D Printed DH Microscope Setup:

An exemplary setup (see FIGS. 1 and 3) utilizes the common path digital holography and exhibits a very high temporal stability in contrast to the two beam configurations such as Michelson and Mach-Zehnder, where the two beams may acquire uncorrelated phase changes due to vibrations. To determine the temporal stability of the 3D printed prototype (FIG. 3), one can record a series of fringe patterns or movies for a glass slide without any object. For example, one can record 9000 fringe patterns for 5 min at a frame rate of 30 Hz for a sensor area of 128×128 pixels (15.8×15.8 μm) using the "windowing" functionality of the CMOS sensor 10 for the setup shown in FIG. 3.

CMOS sensors can read out a certain region of interest (ROI) from the whole sensor area, which is known as windowing. One of the advantages of windowing is the elevated frame rates, which makes CMOS a favorable choice over CCDs to study the dynamic cell membrane fluctuations. One of the main reasons for using a small sensor area (128×128 pixels) is because processing the whole sensor area images (1280×1024 pixels) may be computationally expensive and time consuming. Path length changes were computed by comparing the reconstructed phase distribution for each frame (containing the fringe patterns) to a previously recorded reference background. It should be noted that the 3D-printed DHMIC prototype was not isolated against vibrations, that is, it was not placed on an air floating optical table. One can compute standard deviations for a total of 16,384 (128×128) pixel locations.

Figure 10:
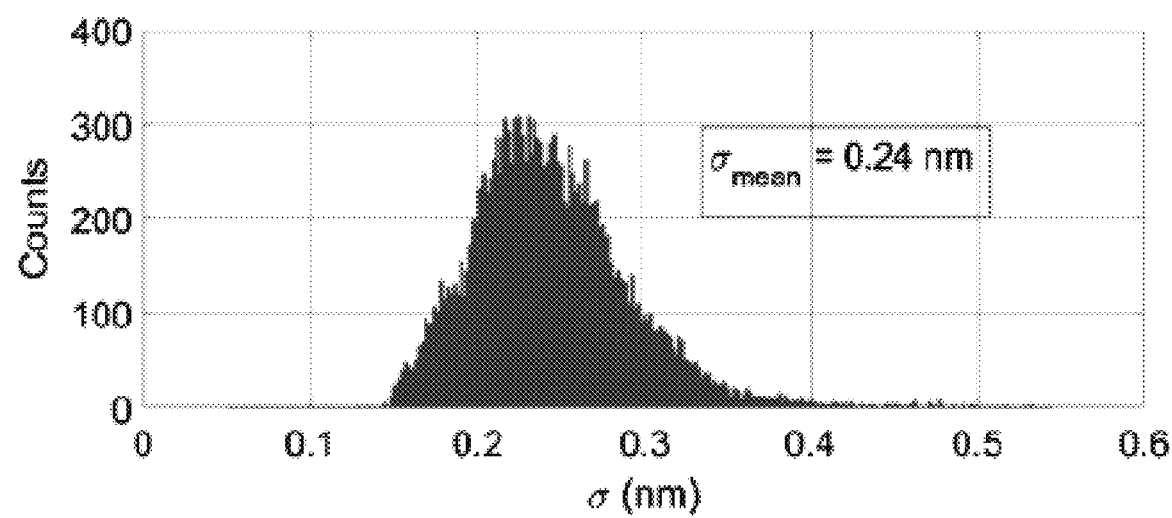
FIG. 10 shows experimental results for the temporal stability of the compact 3D printed DH microscope; Histogram of standard deviations of fluctuations of 128×128 pixels recorded at a frame rate of 30 Hz without mechanical isolation; The inset shows the mean of standard deviations, which was 0.24 nm.

FIG. 10 shows the histogram of standard deviation fluctuations with a mean standard deviation of 0.24 nm. With the 3D printed DHMIC prototype, one can achieve sub-nanometer temporal stability of the order of 0.24 nm without any vibration isolation. This can be highly beneficial in the study involving cell membrane fluctuations, which are on the order of tens of nanometers.

Feature Extraction and Automated Cell Classification:

From the 3D reconstructions of micro-objects, one can extract a series of features: mean physical cell thickness, coefficient of variation (COV), optical volume (OV) of the cell, projected area of cell (PA), ratio of PA to OV, cell thickness kurtosis, cell thickness skewness and the dry mass of the cell. Before extracting these features, one can apply Otsu's algorithm, which clusters based on image thresholding on the 2D unwrapped phase images. These eight features are morphological cell features that contain more information than the extracted features from the 2D bright-field microscopic images.

In exemplary embodiments, the random forest (RF) classifier was chosen for cell identification/classification (see, e.g., Pal, Mahesh, "Random forest classifier for remote sensing classification," Int'l J. of Remote Sensing 26, No. 1 (2005): 217-222). RF is an ensemble learning method used for classification tasks. In this classifier, a decision is taken by considering the majority vote from the outputs of the decision trees consisting of nodes, branches, and leaves. Using the RF classifier, one can perform classification on data obtained from the CMOS 10 and cell phone 12 using the setup in FIGS. 1 and 3.

A dataset of unwrapped phase images was created for four classes: 10-μm polystyrene bead, 20-μm glass bead, Diatom-Tabellaria fenestrate, and frog blood cell. 3D profiles were reconstructed from the CMOS 10 acquired digital holograms by processing a total of 200 phase images (50 images per class) using the steps described in the FIG. 5. This forms the true class dataset. In addition, false class data that did not belong to any of the four classes was recorded. The false class data consisted of 3D reconstructions of digital holograms of the class of 20-μm polystyrene beads. A total of 50 false class 3D reconstructions were used. From these 3D reconstructions, one can extract several cell features such as mean physical cell thickness, COV, OV of the cell, projected area of cell (PA), ratio of PA to OV, cell thickness kurtosis, cell thickness skewness, and the dry mass of the cell.

After the feature extraction process, the RF classifier was trained on the true class data. The true class dataset was split in such a way that 30 reconstructions (features) from each class were used to train the classifier, and the remaining 20 were used for testing. For the RF model, 100 decision trees were used and Gini diversity index (GDI) criteria was used to form the trees from the training data. To determine the reliability of the classifier, one can examine the scores or percentage of trees that voted for that class. If the scores were below 75%, one can determine that the class output was not reliable, and the data was false class. Table 2 below depicts the confusion matrix for the classifier, which is calculated by (TP+TN)/N, where TP is the number of true positives, TN is the number of true negatives, and N is the total number of test data. The classifier had an accuracy of 95.38% for CMOS-acquired data.

TABLE 2

Comparison of Cell Classification Results for Data Acquired Using the Setup in FIG. 1 for CMOS and Cell Phone Sensors[a]

| | Random Forest (RF) Classifier (CMOS Data) | | Random Forest (RF) Classifier (Cell Phone Data) | |
|---|---|---|---|---|
| | PP | PN | PP | PN |
| TP | 75 | 5 | 75 | 5 |
| TN | 1 | 49 | 3 | 47 |

[a]Random forest (RF) classifier was used.
TP: true positive,
TN: true negative,
PP: predicted positive,
PN: predicted negative.

One can also record digital holograms with a cell phone sensor 12 using the setup in FIG. 1B with the same micro-objects. There were 200 true and 50 false reconstructions (features). For training, 120 true reconstructions were used and 80 true and 50 false reconstructions (features) were used for testing. The classifier had an accuracy of 93.85%. Table 2 describes the confusion matrix for the cell phone sensor-based acquisition system. One reason for the marginally lower classification accuracy for the system using the cell phone sensor is that the recorded images were in the JPEG format, which is a lossy compression scheme resulting in a poorer image quality, while the CMOS camera 10 can save images as .bmp, which does not compress the images. It is noted that the cell phone camera 12 has a lower SNR than the CMOS camera 10. Also, the dynamic range of the CMOS 10 is higher than the cell phone sensor 12 due to larger sensor areas and pixel sizes. An accuracy of 93.5% using the cell phone system can be considered high enough for classification-related tasks and shows that cell phone sensors are capable of reliable hologram acquisition, which can be used for automated cell identification.

In some embodiments, a computing device or computing system may be programmed to determine features of a cell, a cell-like object, or a microorganism (e.g., micro-object) in a reconstructed image. These features can include some or all of, but are not limited to: a mean physical cell thickness value ($\bar{h}$) for the cell/microorganism in the image; a standard deviation of optical thickness ($\sigma_O$) for the cell/microorganism; a coefficient of variation (COV) for the thickness of the cell/microorganism; a projected area ($A_P$) of the cell/microorganism; an optical volume ($V_O$) of the cell/microorganism; a thickness skewness value for the cell/microorganism, where the thickness skewness measures the lack of symmetry of the cell/microorganism thickness values from the mean thickness value; a ratio of the projected area to the optical volume ($R_{p\_a}$) for the cell/microorganism; a thickness kurtosis value that describes the sharpness of the thickness distribution for the cell/microorganism; and a dry mass (M) of the cell/microorganism. The mean physical cell thickness is the mean value of optical thickness for a microorganism/cell and can be calculated using the following equations:

$$OPL = [n_c(x, y) - n_m(x, y)]h(x, y) =$$

$$\Delta n(x, y) \cdot h(x, y) \Rightarrow h(x, y) = h_i = \frac{\lambda \cdot \Delta \phi}{2\pi \Delta n} \Rightarrow \bar{h} = \frac{1}{N}\left(\sum_{i=1}^{N} h_i\right),$$

where $i = 1, 2, 3 \ldots N^{th}$ pixel where $n_c(x, y)$ is the refractive index of the cell, $n_m(x, y)$ is the refractive index of the surrounding medium and $h(x, y)$ is the thickness of the cell of a pixel location (x, y), and where $n_c(x, y)$ satisfies the following equation:

$$n_c(x, y) = \frac{1}{h}\int_0^h n_c(x, y, z)dz$$

The coefficient of variation (COV) in thickness is the standard deviation of optical thickness for a microorganism/cell divided by the mean thickness. The standard deviation of optical thickness can be calculated using the following equation:

$$\sigma_0 = \sqrt{\frac{1}{N-1}\sum_{i=1}^{N}(h_i - \bar{h})^2}$$

where N is the total number of pixels containing the cell, $h_i$ are the cell thickness values and is the mean cell thickness. The COV can be calculated using the following equation:

$$COV = \frac{\sigma_0}{\bar{h}}$$

The optical volume ($V_0$) is obtained by multiplying the area of each pixel with the thickness value at each pixel location and integrating over the entire cell thickness profile (SP) using the following equation:

$$V_0 = \int_{SP} h(x, y)ds$$

The projected area ($A_P$) can be calculated as the product of the total number of pixels containing the cell and the area of a single pixel using the following equation:

$$A_p = N \times \left(\frac{\Delta_{Pix\_x} \times \Delta_{Pix\_y}}{(\text{Optical Magnification})^2}\right)$$

where N is the total number of pixels that contain the cell, and $\Delta P_{Pix\_x}$ and $\Delta_{Pix\_y}$ are the pixel sizes in the x direction and the y direction, respectively, for a single pixel of the sensor. The projected area also depends upon the optical magnification of the objective lens.

The cell thickness skewness measures the lack of symmetry of the cell thickness values from the mean cell thickness value and can be calculated using the following equation:

$$\text{skewness} = \sum_{i=1}^{N}\frac{(h_i - \bar{h})^3}{\sigma_0^3}$$

The ratio of the projected area to the optical volume ($R_{p\_a}$) and can be calculated using the following equation:

$$R_{p\_a} = \frac{A_p}{V_0}$$

Cell thickness kurtosis describes the sharpness of the thickness distribution. It measures whether the cell thickness distribution is more peaked or flatter and can be calculated using the following equation:

$$\text{Kurtosis} = \sum_{i=1}^{N}\frac{(h_i - \bar{h})^4}{\sigma_0^4}$$

The cell thickness is directly proportional to the dry mass (M) of the cell, which quantifies the mass of the non-aqueous material of the cell. That is, total mass of substances other than water in the cell is known as the dry mass (M) and can be calculated using the following equation:

$$M = \frac{10\lambda}{2\pi\alpha}\int_{A_p}\Delta n(x, y)ds$$

where α is the refractive increment a, which can be approximated by 0.0018-0.0021 m³/Kg when considering a mixture of all the components of a typical cell, $A_p$ is the projected area of the cell, and λ is the wavelength.

Conclusions:

In summary, one can design and fabricate a low-cost, compact, and field-portable 3D printed DH microscope (see FIGS. 1, 3, and 4). The microscope can require a minimal number of off-the-shelf optical components compared to complex and sophisticated two beam setups. The 3D printed prototype exhibits a high temporal stability of the order of 0.24 nm according to exemplary experiments, which is highly desirable in studies involving cell membrane fluctuations or to study cell dynamics.

Feature extraction was performed separately for the CMOS and cell phone acquired data, and the cells were classified using the RF classifier. High accuracies for cell classification have been achieved for both CMOS and cell phone sensors. In addition, a high classification accuracy of 93.85% shows that cell phone cameras have the potential to be used as an alternative to CMOS sensors.

Thus, the 3D printed DHMIC prototype can be used with common mobile devices for hologram recording, and they produce good classification results (see Table 2). There are many advantages to using mobile devices in microscopy. For example, using the field-portable prototype presented in the present disclosure, it is possible to record and send digital holograms to a computational device located remotely, via the internet for data analysis. This becomes important when the personnel handling the prototype lack the skills to process the acquired data. It is believed that one can further reduce the cost of the proposed device by incorporating more 3D printed components to replace mechanical components.

In addition, inexpensive laser diodes and CMOS sensors, such as webcams, can be used in the setup. One can envision that by making these changes, the whole setup will cost between 50-100 USD. Mass-producing the system can further reduce the cost. Some additional work aims to study dynamic cell parameters, such as cell membrane vibration amplitude and vibration frequency, using the cell phone sensor for human red blood cells and diagnosis diseases using the compact setups shown in FIGS. 3 and 4.

Example 2: Sickle Cell Disease Diagnosis Based on Spatio-Temporal Cell Dynamics Analysis Using 3D Printed Shearing Digital Holographic Microscopy This Example provides a spatio-temporal analysis of cell membrane fluctuations to distinguish healthy patients from patients with sickle cell disease. A video hologram containing either healthy red blood cells (h-RBCs) or sickle cell disease red blood cells (SCD-RBCs) was recorded using a low-cost, compact, 3D printed shearing interferometer. Reconstructions were created for each hologram frame (time steps), forming a spatio-temporal data cube. Features were extracted by computing the standard deviations and the mean of the height fluctuations over time and for every location on the cell membrane, resulting in two-dimensional standard deviation and mean maps, followed by taking the standard deviations of these maps. The optical flow algorithm was used to estimate the apparent motion fields between subsequent frames (reconstructions). The standard deviation of the magnitude of the optical flow vectors across all frames was then computed. In addition, seven morphological cell (spatial) features based on optical path length were extracted from the cells to further improve the classification accuracy. A random forest classifier was trained to perform cell identification to distinguish between SCD-RBCs and h-RBCs. This is the first report of machine learning assisted cell identification and diagnosis of sickle cell disease based on cell membrane fluctuations and morphology using both spatio-temporal and spatial analysis.

Introduction:

Sickle cell disease (SCD) belongs to a group of inherited red blood cell disorders. According to the National Institutes of Health, people affected with SCD have abnormal hemoglobin, called hemoglobin S or sickle hemoglobin in their red blood cells (RBCs). Hemoglobin is a protein that is responsible for transporting oxygen throughout the body. Individuals suffering from SCD inherit two abnormal hemoglobin genes, one from each parent. Healthy RBCs (h-RBCs) contain normal hemoglobin and have a biconcave disk shape, allowing them to squeeze through the micron sized blood vessels to supply oxygen to various parts of the body. In SCD, hemoglobin can form stiff rods within the RBCs, creating crescent or sickle shaped RBCs and hindering oxygen transportation. The lack of oxygen delivery in the body can cause sudden, severe pain, known as a pain crisis, which may result over time in chronic organ damage or failure.

Optical technologies are becoming increasingly popular standalone modalities for disease diagnosis as these are usually less invasive in nature. Recently, digital holographic microscopy (DHM) and quantitative phase imaging (QPI) based techniques have been used to study the morphology and mechanical properties of RBCs for disease diagnosis. DHM is an interferometry-based approach to image biological samples. The system generates a hologram which can then be numerically reconstructed, forming a three-dimensional (3D) image of the height or optical path length (OPL) profile of the cell. DHM and QPI techniques are label-free and can non-invasively and quantitatively measure the optical path delays in phase objects, such as biological cells and sparse tissue samples. Some DHM and QPI based techniques may be complicated, bulky, and sensitive to mechanical noise. However, DHM and QPI have proven to be extremely powerful 3D imaging tools due to their single-cell profiling and label-free imaging capabilities. It has been shown that healthy RBC and SCD-RBC membranes may fluctuate at different rates providing additional information for cell identification.

In this Example, classification of healthy RBCs and sickle cell disease RBCs was performed using spatio-temporal analysis with a compact and low-cost 3D printed shearing interferometer. The prototype consisted of a laser source, a microscope objective, glass plate and an imaging sensor. In addition, this setup allowed for a stable, common-path DHM system based on shearing geometry and used the cell membrane fluctuations in the lateral and axial directions as features for classification. A prospective, limited clinical research study was conducted using peripheral blood from consenting sickle cell patients and healthy control volunteers. This study was conducted in accordance with UConn Health and UConn Storrs Institutional Review Board policy standards. To be eligible for participation, each subject had to be at least eighteen years of age and have not received a blood transfusion in the previous three months. A total of fourteen subjects were enrolled, eight with sickle cell disease (two females and six males) and six healthy volunteers without sickle cell disease or any hemoglobinopathy trait (four females and two males). For the healthy controls, the mean age, in years, and standard deviation was 37 and 9 respectively, while the mean age and standard deviation of subjects with SCD-RBCs—was 32 and 8, respectively. Approximately 6-8 ml of blood was drawn from each human subject. The time between drawing blood and measurement was less than two hours. The mean and standard deviation of the hemoglobin was 13.1 g/dL and 1.6 g/dL for the healthy controls, respectively, while it was 8 g/dL and 1.4 g/dL for the SCD subjects, respectively. The demographic data and clinical results by electrophoresis are presented in Table 3.

TABLE 3

Demographic and Clinical Comparison of Healthy Controls vs. SCD Subjects:

|  | Healthy Controls n = 6 | SCD subjects n = 8 |
|---|---|---|
| Gender, % Female (n) | 67 (4) | 25 (2) |
| Age (in years), mean (SD) | 37 (9) | 32 (8) |
| Race, % Black (n) | 100 (6) | 100 (8) |
| Hemoglobin (in g/dL), mean (SD) | 13.1 (1.6) | 8 (1.4) |
| Hemoglobin percentage, mean (SD) | | |
| A | 97.5 (0.3) | 0 |
| A2 | 2.5 (0.3) | 2.5 (0.3) |
| S | 0 | 79.6 (4.8) |
| F | 0 | 17.9 (4.7) |

*n = number of subjects, SD = standard deviation, SCD = sickle cell disease RBC

As shown in Table 3, all healthy controls had a normal hemoglobin level and distribution of hemoglobin A and A2 indicating healthy controls produce normal adult hemoglobin. Conversely, all subjects with sickle cell disease had low total hemoglobin levels (as expected) and hemoglobin electrophoretic results consistent with sickle cell disease (e.g., no hemoglobin A production, normal A2 levels, and varying degrees of hemoglobin F and hemoglobin S). All hemoglobin F production was endogenous as no subjects were taking hydroxyurea, a medication that is known to stimulate hemoglobin F production.

After obtaining blood samples from each subject, thin blood smears were prepared and sequenced digital holograms of red blood cells using the proposed 3D microscope. A blood-smear of human blood containing either h-RBCs or SCD-RBCs was prepared and imaged using the compact DHM setup and a video containing hologram frames was recorded. Once a video hologram was captured from the portable setup, cells were manually segmented and a 3D reconstructed OPL profile of each cell was created for each time frame followed by the formation of a spatio-temporal data cube to measure the dynamic fluctuations of the cells. Statistical analysis on dynamic features was performed including computation of 2D mean and standard deviations (STD) maps for every location on the cell membrane of the data cube along the time axis. Once the 2D maps were generated, the standard deviation for each 2D map was computed. Moreover, optical flow (OF) was used to extract cell fluctuation information between subsequent frames in the temporal 3D reconstructions. The STD of the magnitude of the OF vectors across all frames were then computed. In addition, spatial features were extracted from the OPL profiles based on seven morphological cell features including mean optical path length (M-OPL), coefficient of variation (COV), Optical volume (OV), projected area (PA), ratio of PA to OV, skewness and kurtosis. These additional features were used along with the three spatio-temporal features in order to further improve the classification accuracy. Using this information, all features were inputted into a pre-trained random forest classifier to determine whether the sample under inspection is SCD-RBC or h-RBC. An advantage of the proposed system over previous works is that SCD-RBCs may appear similar (morphological similarity) to healthy RBCs, potentially compromising the accuracy of classification by morphological features; however, differences in hemoglobin cause the cells fluctuate at different rates. By including features related to cell motility (membrane fluctuations) for classification, improved classification may be possible.

Materials and Methods:

Experimental System:

For the 3D printed DHM setup, a collimated laser beam passes through a sample which is then magnified by an objective lens 16 (40× magnification). A fused silica glass plate 14 (3 to 5 mm thick) inclined at an angle of 45° splits the beam (from the objective) into two beams due to reflections from the front and the back surface of the glass plate 14 generating two laterally shifted object wavefronts. The portion of the wavefront unmodulated by the object provides the reference beam and the wavefront modulated by the object acts as an object beam. These beams interfere over the sensor and digital holograms are recorded. Also, the lateral shear caused by the glass plate 14 helps to achieve off-axis geometry which enhances the reconstructions and simplifies the numerical processing of the digital holograms in comparison to in-line DHM setups such as Gabor holography. The fringe frequency is $f_s=S/r\lambda$ where S denotes the lateral shift induced by the glass plate, $\lambda$ is the wavelength of light source and r is the radius of curvature of the wavefront. Moreover, the relationship between shift (S), glass plate thickness (t), incidence angle on glass plate ($\beta$) and refractive index of glass (n) is given as follows: $S/t=\sin(2\beta)(n^2-\sin^2\beta)^{-1/2}$. Hence a glass plate thickness of 3 to 5 mm is enough for the experiments, allowing for spatial filtering of the spectrum and satisfying the Nyquist criteria for sampling. In order to have more control over the off-axis angle, a wedge plate can be used.

Figure 11A:
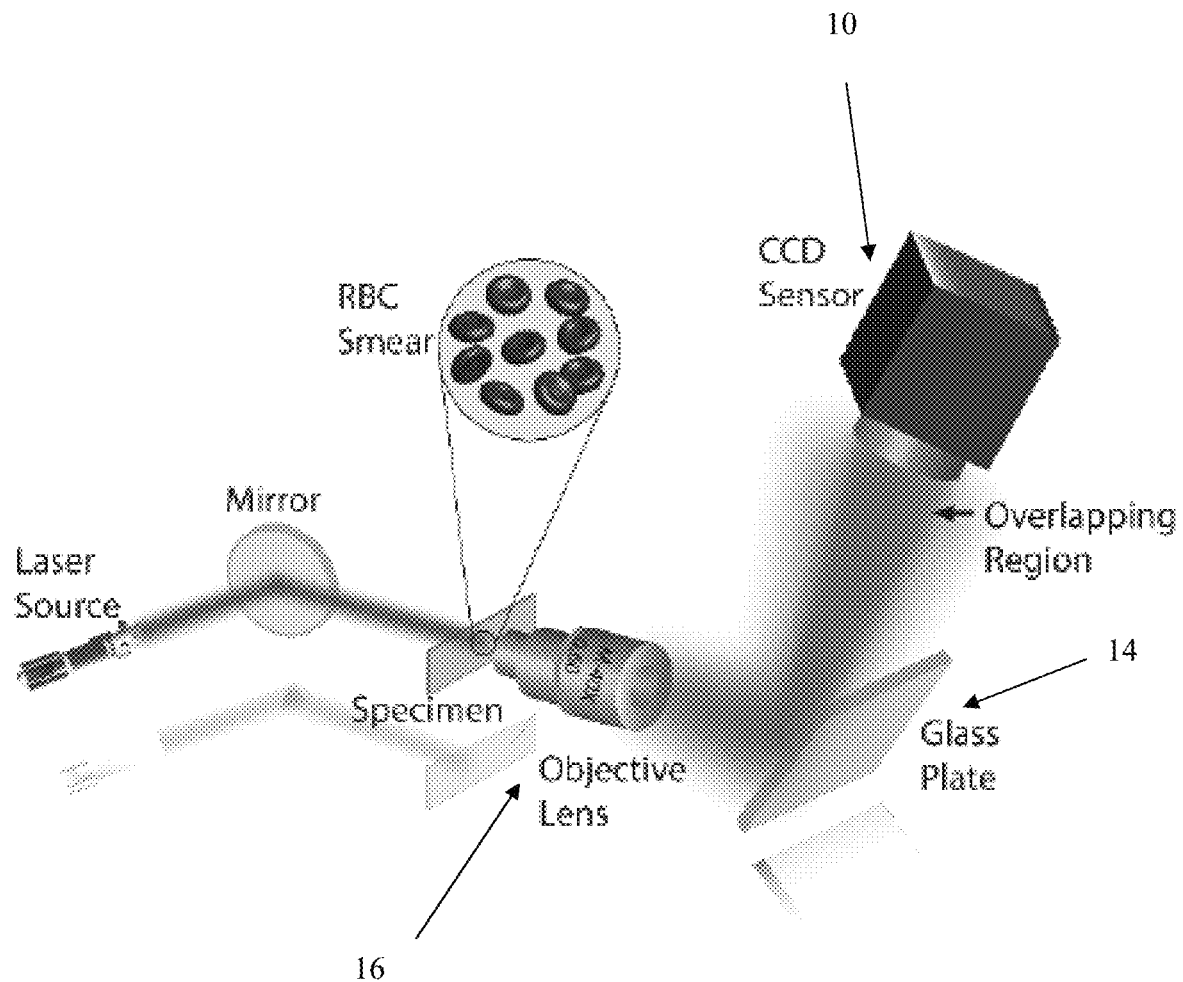
FIG. 11A shows a setup for an exemplary common-path biosensor based on shearing digital holographic microscopy.

FIG. 11A illustrates a schematic of the proposed digital holographic microscope (DHM) based on shearing geometry for cell identification and disease diagnosis. A laser source ($\lambda=633$ nm) illuminates the sample under inspection and a microscope objective magnifies the sample. A fused silica glass plate splits the beam, generating two laterally sheared object beams. These two sheared beams interfere over the imaging sensor 10 (CMOS or CCD), and interference fringes are observed.

Figure 11B:
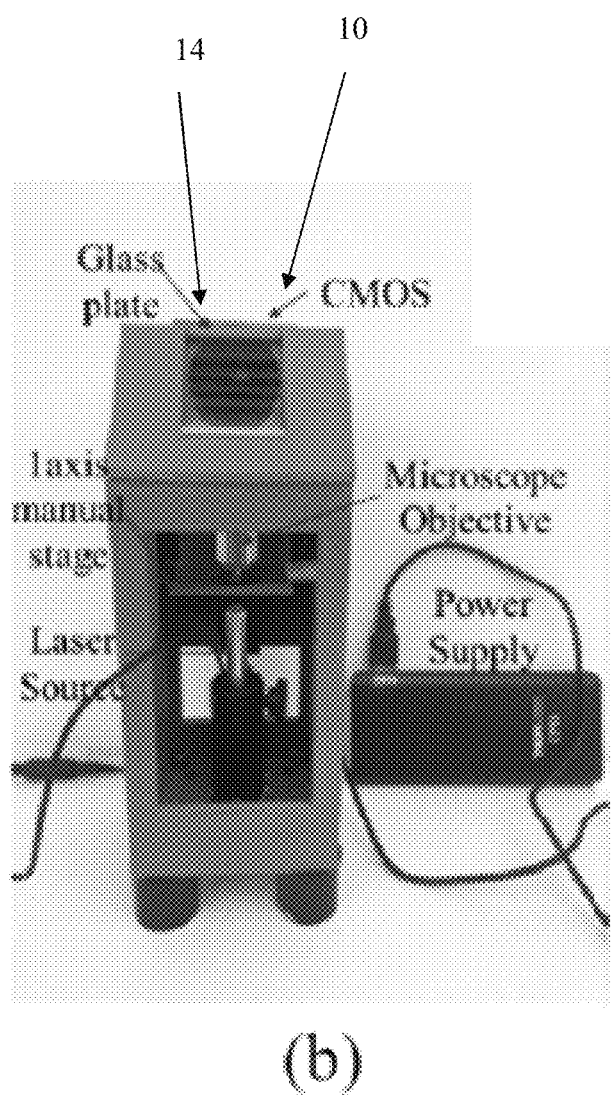
FIG. 11B shows a compact 3D printed prototype of the DH microscope with the dimensions of 90 mm×85 mm×200 mm.

FIG. 11B shows the 3D printed prototype employing shearing geometry. Moreover, the dimensions of the system shown in FIG. 11B are 90 mm×85 mm×200 mm.

FIG. 12A depicts the thickness profile of a blood smear from a healthy volunteer and FIG. 12B shows a thickness profile for a blood smear from a patient with SCD. It can be seen from FIG. 12A that most of the healthy RBCs are round while in FIG. 12B some of the RBCs from a SCD patient are round, but the depressions in the RBCs' center are not as prominent and a few RBCs are elongated, or sickle shaped. Accurate SCD diagnosis with respect to the state of health of RBCs is difficult using visual inspection. Moreover, visual inspection is not regarded as a valid medical diagnostic test by medical professionals and lab tests are generally necessary for an accurate medical diagnosis of sickle cell disease. Even though the patient with SCD may have round shaped RBCs, all RBCs produced by a patient with SCD will contain abnormal hemoglobin. Morphological similarities between the healthy and SCD-RBCs may pose a problem for accurate classification tasks, hence by including features related to cell motility (membrane fluctuations), improved classification may be possible.

Figure 16A:
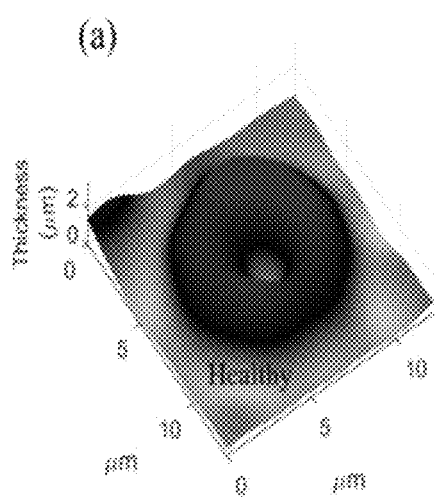
FIGS. 16A-B show: Pseudo-color 3D reconstructions for (FIG. 16A) a healthy RBC, and (FIG. 16B) a round sickle (left of FIG. 16B) and a crescent shaped sickle cell disease RBC (right of FIG. 16B)
Figure 16B:
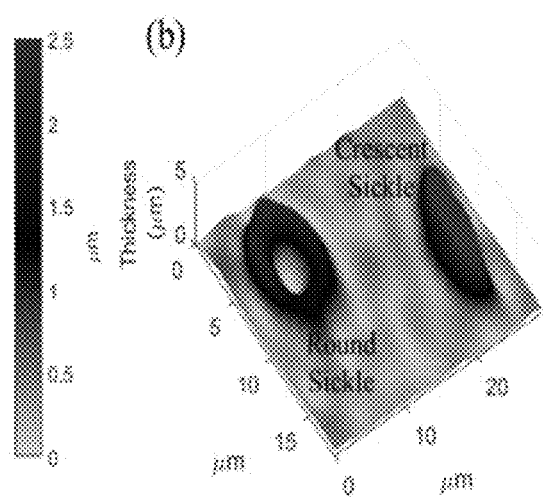

FIG. 16A shows a pseudo-color 3D height reconstruction for an h-RBC and FIG. 16B shows a pseudo-color 3D reconstruction for a round shaped SCD-RBC (see left in FIG. 16B) and a crescent shaped SCD-RBC (see right in FIG. 16B).

Off-Axis DHM Reconstruction Algorithm:

Once the video containing hologram frames has been recorded, the 3D OPL reconstruction is generated from each of the hologram frames (e.g., with object and background ($H_o$)). Thereafter, a Fourier transform of every digital hologram frame is taken, filtered by digital filtering of the real part of spectrum in Fourier domain, and then inverse Fourier transformed, which outputs the phase map. Additionally, also recorded was a hologram frame containing background only ($H_R$) information—e.g., a hologram frame of the glass slide containing no cell (just blood plasma).

One can inverse Fourier transform the filtered spectrums separately to get object plus background phase ($\Delta\Phi_o$ from $H_O$) and background phase ($\Delta\Phi_R$ from $H_R$). In order to get the phase information due to object only one can subtract the phase map of the object and background from the phase map with background only (e.g., $\Delta\Phi=\Delta\Phi_R-\Delta\Phi_o$). This process also removes most of the system related aberrations.

After the background phase subtraction, cells are manually segmented to allow for computation of features from the individual cells. The phase was then unwrapped using the Goldstein's branch cut method to get the unwrapped phase $\Delta\Phi_{Un}$. After phase unwrapping, one can compute the optical path length (OPL) using the linear relationship given by:

$$OPL=\Delta\Phi_{Un}\cdot(\lambda/2\pi) \text{ where } \lambda \text{ is the source wavelength.}$$

Height ($\Delta h$) information can be calculated from the OPL by $\Delta n=OPL/\Delta n$ when object and surrounding media's refractive indices are known and $\Delta n = n_{RBC} - n_{plasma}$, is the refractive index difference between the cell and the surrounding plasma.

It is worth mentioning that average refractive index of a healthy RBC is given by $n_{RBC} = 1.42$, while the average refractive index for plasma is given by $n_{plasma} = 1.34$, the refractive index varies for individual SCD-RBCs due to stiffening of hemoglobin. Thus, accurate 3D height reconstructions are difficult to compute in SCD case. Therefore, one could have computed 3D OPL reconstructions for feature extraction (used in classification) as $\Delta n$ is not required.

Temporal Stability of the Prototype:

The proposed prototype (see FIG. 11B) based on shearing geometry exhibits very high temporal stability, which is desired when studying the cell membrane fluctuations, which are of the order of tens of nanometers. In order to determine the temporal stability of the proposed prototype (see FIG. 11B), one can record 600 fringe patterns for 20 seconds at a frame rate of 30 Hz for a sensor area of 512×512 pixels (or 67 μm×67 μm) exploiting the "windowing" functionality of the CMOS sensors, which is not available on CCD sensors.

Using windowing, a user can select a region of interest (ROI) from the available sensor area. One of the advantages of windowing is the elevated frame rates, which allows dynamic cell membrane fluctuations to be recorded at higher frame rates (FPS). One reason for choosing a small ROI from the whole image is the lower computation time.

After recording a movie of fringe patterns, path length changes were computed by computing the standard deviation between the reconstructed phase distributions for each frame (containing the fringe patterns) and a previously recorded reference phase distribution. The proposed prototype was tested, and the blood smears from healthy volunteers and patients suffering from SCD were collected and prepared.

Figure 44:
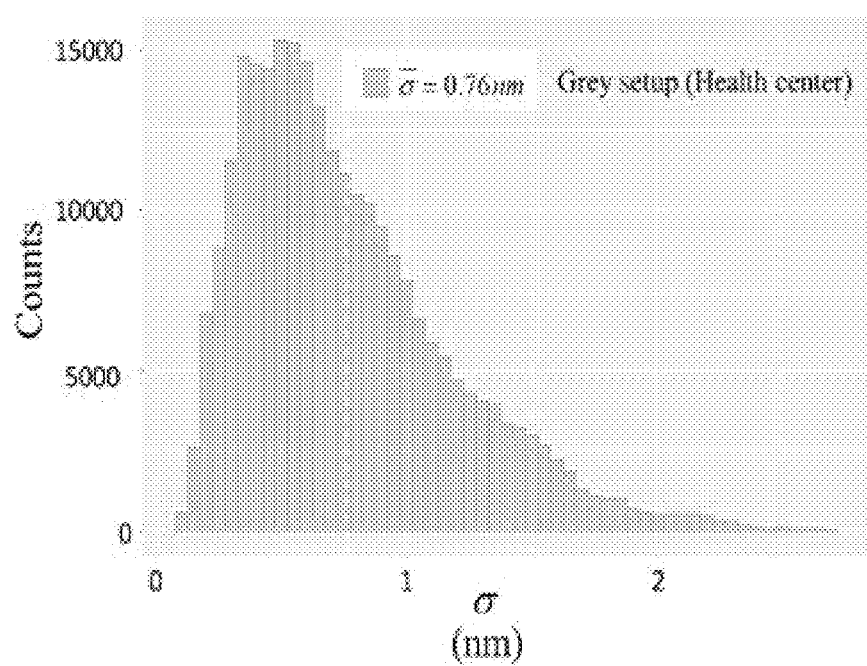
FIG. 44 shows experimental results for the temporal stability of an exemplary compact 3D printed prototype (see FIG. 11B) in a clinical setting.

FIG. 44 shows a histogram of the standard deviation values using the grey colored setup (see FIG. 11B). The prototype has sub-nanometer stability, e.g., a mean of 0.76 nm with a standard deviation of 0.426 nm, taken on a clinical bench. In FIG. 44, the dashed white line depicts location of statistical mean, where σ is the average of the standard deviations.

The mean of the mechanical noise in the system, which is due to both environmental noise and noise attributed to optical components used in the system, was found to be in the sub-nanometer range.

The mean noise is less than the expected value for cell membrane fluctuations (usually on the scale of tens of nanometers) of healthy and SCD-RBCs, which is highly desired when studying membrane fluctuations.

Figures 45A, 45B:
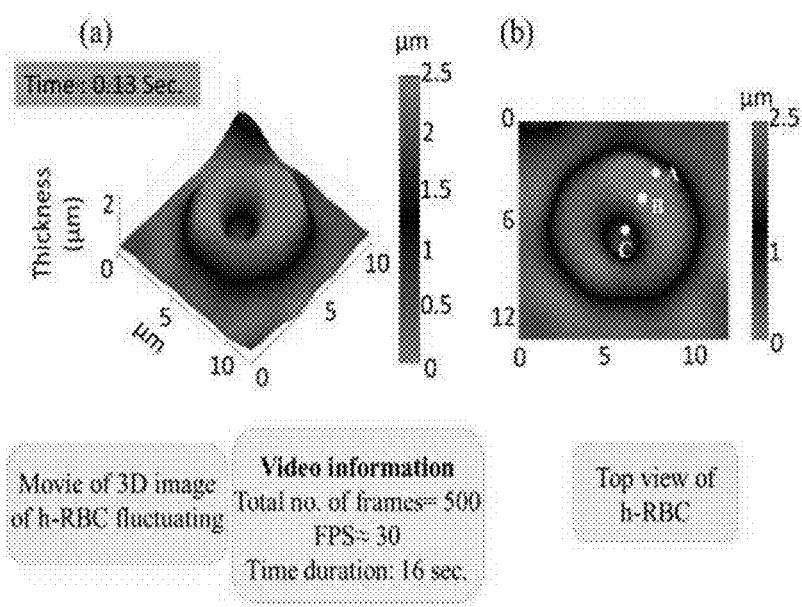
FIG. 45A is a 3D pseudo color reconstruction video frame for an h-RBC depicting the cell thickness.
FIG. 45B is a top view of the same h-RBC.

FIG. 45A shows a video frame from the 3D pseudo-color reconstruction for a h-RBC's membrane fluctuations as discussed above. FIG. 45B is the top view of the same h-RBC, where the height fluctuations for three different locations on the cell membrane's surface were computed.

Figure 46:
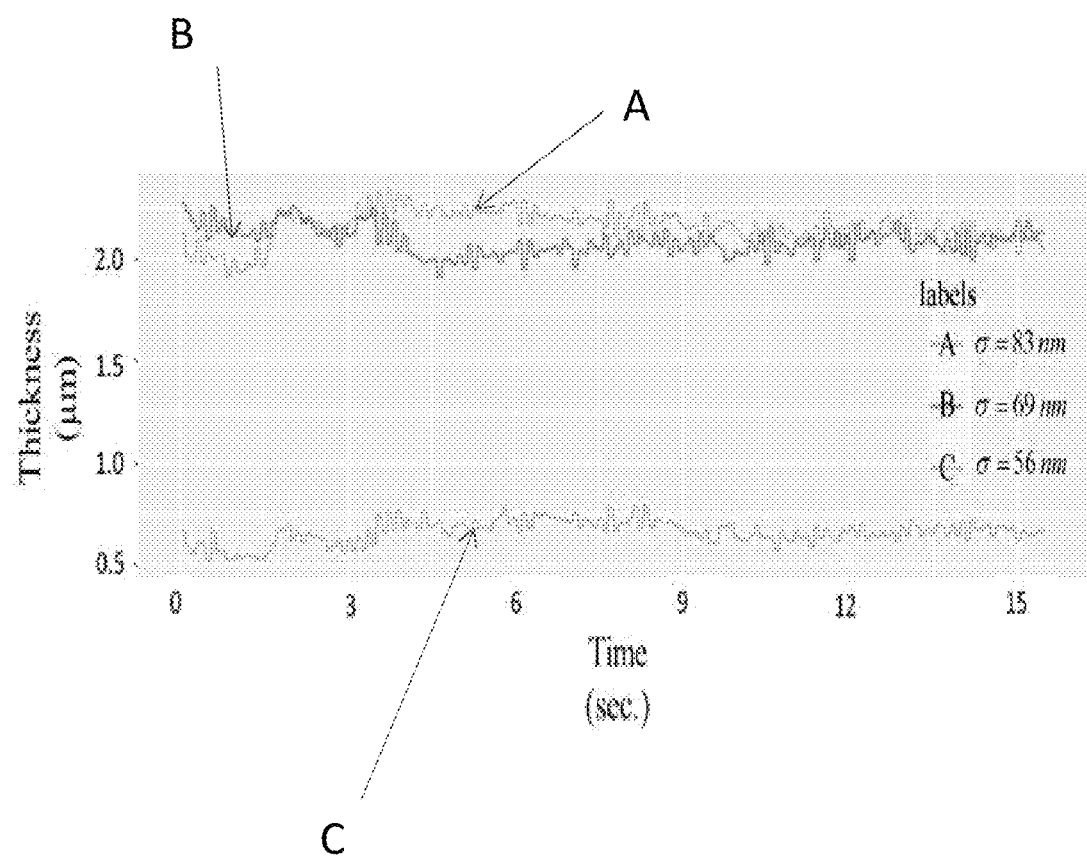
FIG. 46 shows cell membrane fluctuations for three different spatial locations (A, B, and C from FIG. 45B) on an h-RBC's membrane; σ=standard deviation.

FIG. 46 shows a plot of the cell membrane fluctuations for three different locations (A-C) as shown in FIG. 45B taken over approximately 15 seconds. As shown in FIG. 46, the standard deviation, σ, of points A, B, and C are 83 nm, 69 nm, and 56 nm, respectively. The standard deviations of the fluctuations are higher in the outer cell regions and lower in the cell's center.

Feature Extraction:

This Example investigated time-related features for classification to utilize the cell motility and dynamics as features. To do this, a video hologram of RBCs is recorded over a time period, t.

In practice, video holograms containing RBCs were recorded for approximately 20 seconds at a frame rate of 30 frames/sec resulting in approximately 600 frames. Cells are manually segmented from the phase map and reconstructed individually. After each hologram is reconstructed (e.g., OPL reconstructions), these reconstructions are stacked together to form a data cube by employing the reconstruction steps mentioned above.

Figures 13A, 13B:
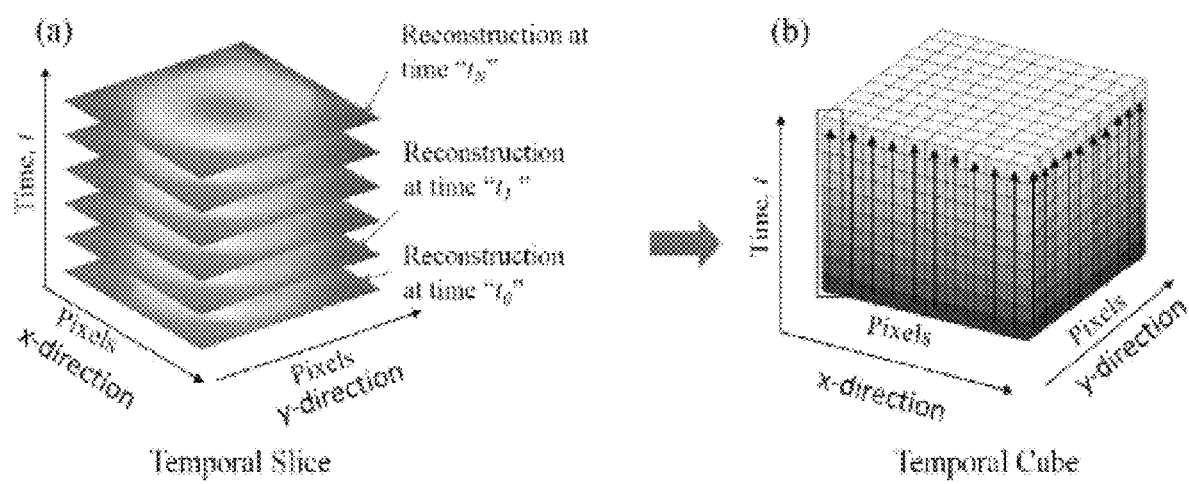
FIG. 13A shows a stack of 3D optical path length (OPL) reconstructions for a h-RBC at different time intervals.
FIG. 13B shows a data cube of 3D cell reconstructions recorded over time t; The far left rectangular box in the temporal cube of FIG. 13B represents a single pixel stack, each element of this stack contains membrane fluctuation information at any time instance.

FIGS. 13A-B depict the formation of the data cube and data stacks. FIG. 13A shows a stack of 3D reconstructions for a healthy RBC at different time intervals. FIG. 13B depicts the stack of reconstructed images as a spatio-temporal data cube. Each pixel stack (tower) represents the optical path length (OPL) changes on the cell membrane at different interval of times t.

Thus, the new data set contains information of the cell for the x-direction, y-direction, and axial OPL fluctuations over time.

From the feature data cube, the mean and standard deviation (STD) of each spatio-temp oral pixel stack was taken across t. More specifically, the first spatio-temporal feature is computed by creating a 2D mean map, shown in FIG. 14A, generated by finding the mean for each pixel stack individually.

Figures 14A, 14B:
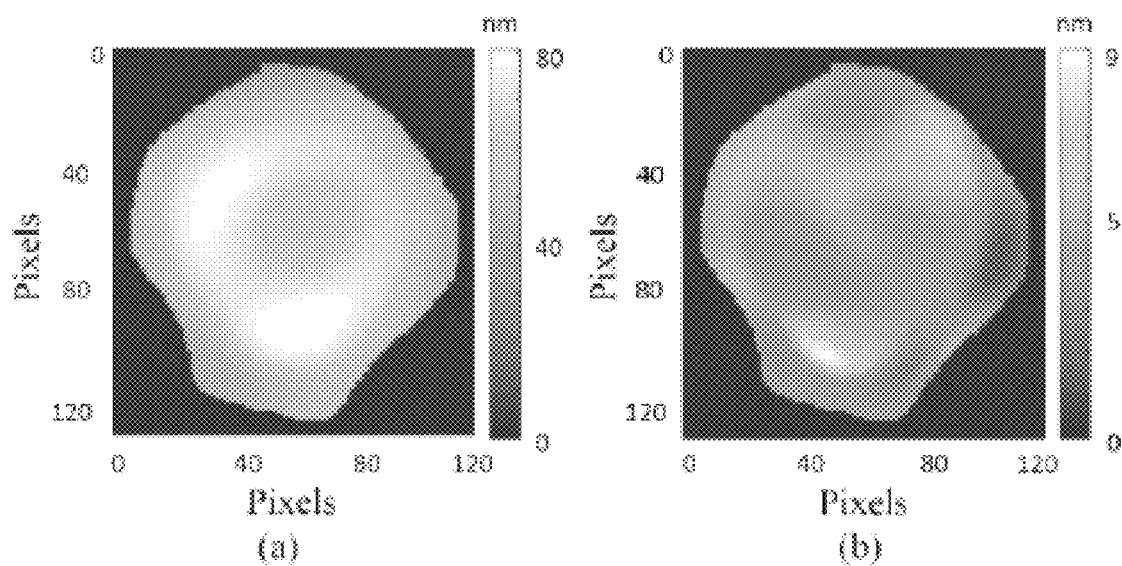
FIG. 14A shows the 2D mean pixel map.
FIG. 14B shows the 2D standard deviation (STD) pixel map, computed by taking the mean and standard deviation, respectively, of the spatio-temporal cube consisting of 3D reconstructed holograms over time t along the t dimension.

Thereafter, one can compute the standard deviation from the 2D mean map. In a similar fashion, the second spatio-temporal feature is determined by first computing the standard deviation (STD) for each pixel stack individually, generating a 2D STD map, as shown in FIG. 14B. Thereafter, the STD of the 2D STD map is computed.

To extract information about the cell motility between subsequent frames (3D OPL reconstructions), e.g., the cell's lateral movement in time t, the optical flow algorithm was used. This algorithm generates feature vectors corresponding to the magnitude and direction of the movement of an object's pixels between frames. For feature extraction, the mean of the magnitude vectors was computed between each subsequent frame. The standard deviation of the mean of the vectors was then used to compute the lateral motion (x-y) of the RBC over time which was used as a third spatio-temporal feature. The rationale is that SCD-RBCs are assumed to be stiffer than the h-RBCs due hemoglobinopathies. Thus, the fluctuations between subsequent frames will be abnormal for a SCD-RBC compared to an h-RBC.

Figure 15:
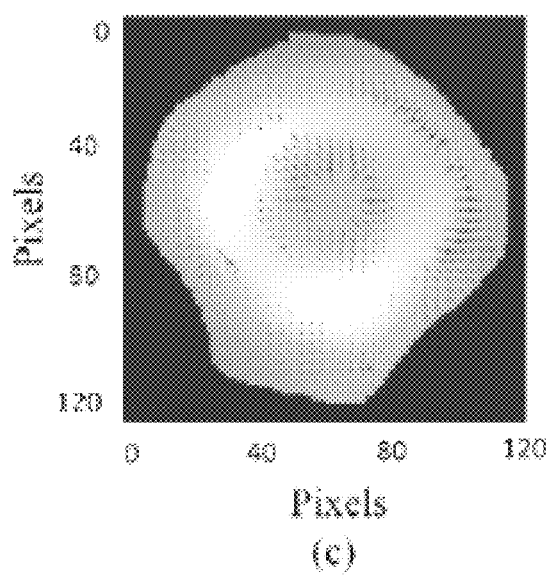
FIG. 15 depicts optical flow vectors (shown by a quiver plot) for a healthy (segmented) RBC between two successive 3D reconstructed OPL frames.
Figure 47:
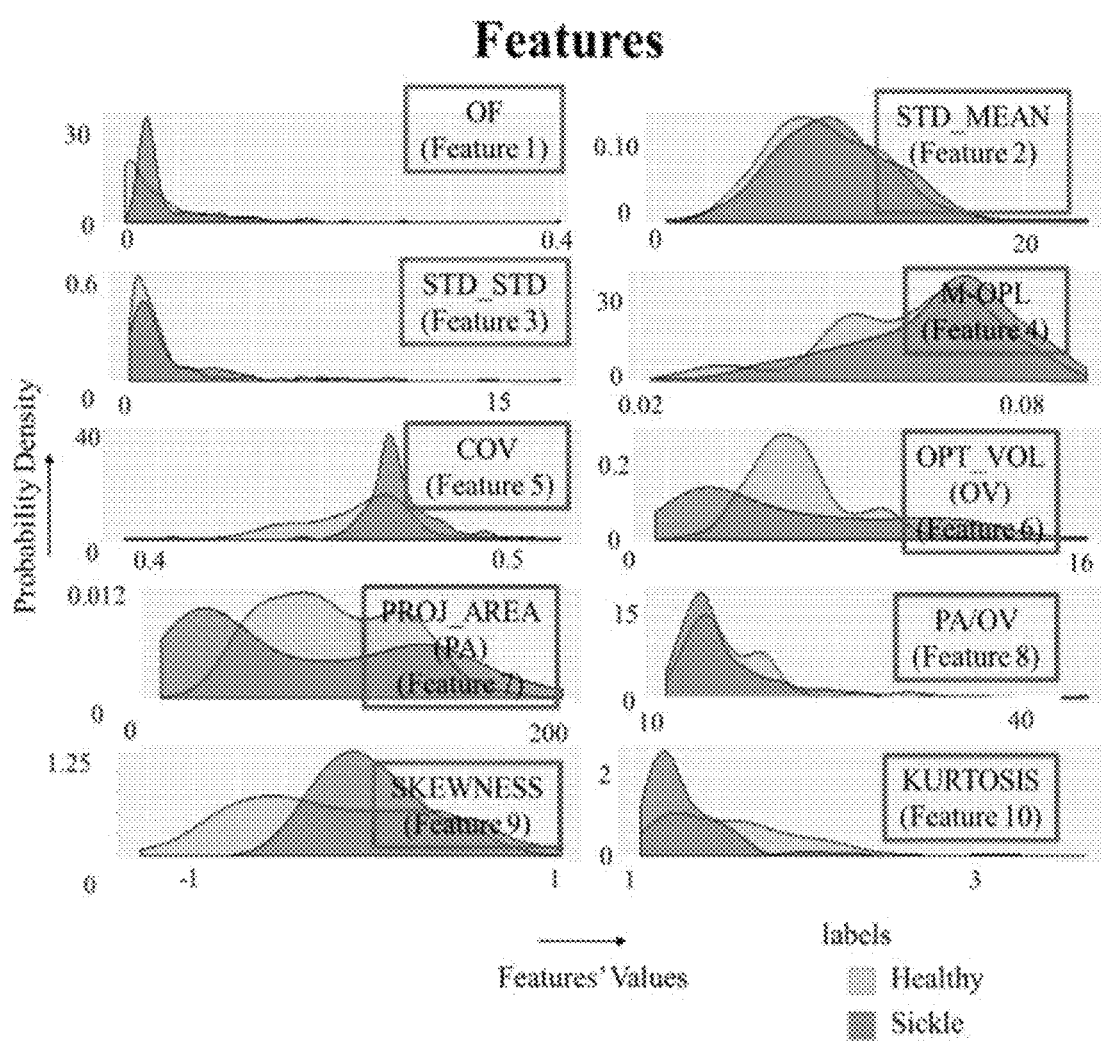
FIG. 47 shows density plots of three spatio-temporal and seven morphological features extracted from the cell data; OF=optical flow, STD_MEAN=standard deviation of the 2D mean map, STD_STD=standard deviation of the standard deviation map, M-OPL=mean of optical path length values, COV=coefficient of variation, OPT_VOL (OV)=optical volume based on OPL, PROJ_AREA (PA)=projected cell area based on OPL, PA/OV=ratio of PA over OV, SKEWNESS=skewness based on OPL, KURTOSIS=kurtosis based on OPL; The spatio-temporal feature labels are Features 1, 2 and 3, and OPL based morphological features labels are Features 4-10.

FIG. 15 depicts an example of the optical flow vectors. Along with the three aforementioned spatio-temporal features, one can use seven morphological features (spatial) based on optical path length (OPL) such as, for example, mean optical path length (M-OPL), coefficient of variation (COV), Optical volume (OV), Projected area (PA), ratio of PA and OV, skewness and kurtosis. FIG. 47 shows density plots of the extracted features from the cell data.

Digital reconstruction of the holograms was implemented using MATLAB. For a single frame with area of 512×512 pixels (21 μm×21 μm) using a 3.07 GHz Intel i7 Processor, the reconstruction takes about 3.5 seconds, however multiple frames can be processed simultaneously by utilizing parallel computing to reduce the overall processing time. Feature extraction for 25 cells with 600 frames for each cell takes approximately 1 minute.

The total processing time for a patient depends on the number of cells necessary for accurate diagnosis as well as the length and frame rate of videos required to extract motility information. Optimization of these parameters as well as dedicated hardware and software may significantly reduce the overall computation time necessary for a diagnosis.

Classification:

After feature extraction, classification was performed using a random-forest classifier with 100 trees for two scenarios. The first scenario consisted of a training set containing SCD-RBC cells and healthy RBCs from all patients whereas the test set contained SCD-RBCs and healthy RBCs not used for training in the classifier.

The second scenario involved training of SCD cells and healthy RBCS from a select few patients whereas the test set consisted of patients' cells not used in the training set to determine if the patient suffers from SCD. For each scenario, cell classification was performed for three cases.

In case 1, only the three aforementioned spatio-temporal cell features were used, in case 2 only the seven aforementioned morphological (spatial) features based on optical path length (OPL) were used, and in case 3 the three spatio-temporal and the seven morphological (spatial) features were combined to further improve the classification accuracy.

The data set collected consisted of randomly selected 150 cells from six healthy volunteers and 150 randomly selected cells from eight patients with SCD-RBCs. The data set was then randomly split in half for testing and training. More specifically, 75 h-RBCs and 75 SCD-RBCs were used for training and 75 h-RBCs and 75 SCD-RBCs were used for testing.

Table 4 depicts the confusion matrices for all three cases. Using only the spatio-temporal-based features, a 78.00% accuracy was achieved with a specificity of 81.33%, and a sensitivity of 74.67%.

In case 2, wherein one can consider only the morphology-based features, a 92.67% accuracy with a specificity of 96.00% and a sensitivity of 89.33% was achieved. The classification results for using both the spatio-temporal and the morphological-based features was 93.33% accurate with a specificity of 100% and a sensitivity of 86.67%.

TABLE 4

Confusion matrix for classification of healthy RBCs and SCD-RBC:

| | spatio-temporal-based features | | morphology-based features | | morphological and spatio-temporal-based features | |
|---|---|---|---|---|---|---|
| | Predicted Healthy | Predicted SCD | Predicted Healthy | Predicted SCD | Predicted Healthy | Predicted SCD |
| Actual Healthy | 56 | 19 | 67 | 8 | 65 | 10 |
| Actual SCD | 14 | 61 | 3 | 72 | 0 | 75 |

*Healthy = healthy RBCs; SCD = sickle cell disease RBC

A new classification model was created to determine if sickle cell disease RBC was present in a patient. A training set was created by randomly removing 2 healthy patients and 2 SCD patients from the data set to be used for testing.

A random forest model was trained using only the remaining 4 healthy and 6 SCD patients, then each patient held out from the training set was tested individually using the trained random forest classifier (RFC).

A patient was determined to be either healthy or suffering from sickle cell disease based on the majority vote of the RFC. If the majority of a patient's cells are classified into a single class, the patient was said to belong to that class.

More specifically, if more than 50% of the cells extracted from the patient and inputted into the RFC are classified as being SCD-RBCs, the patient was said to have sickle cell disease. Otherwise, the patient was considered healthy.

Using only the spatio-temporal-based features, the two healthy patients' cells were classified as healthy RBCs with accuracies of 20% and 30% leading to incorrect diagnosis, whereas the two SCD patients' cells were classified as SCD-RBC with accuracies of 72% and 96%, leading to the correct diagnosis as shown in Table 5.

Using only morphology-based features, the two healthy patients' cells were correctly classified as healthy RBC with an accuracy of 90% and 80% resulting in a correct diagnosis.

The two SCD patients' cells were classified as SCD-RBCs with accuracies of 92% and 96%, leading to the correct diagnosis.

Table 6 depicts the corresponding results. When both morphology-based and spatio-temporal-based features were used, the cells from the four patients (2 healthy and 2 with SCD) were classified with 100% accuracy as healthy RBC or SCD-RBC for their respective subjects.

The classification table for these patients is presented in Table 7 below.

TABLE 5

Classification output for disease detection of patients using only spatio-temporal-based features:

| | Healthy | | | | SCD | | | |
| --- | --- | --- | --- | --- | --- | --- | --- | --- |
| | Healthy Patient 1 | | Healthy Patient 2 | | SCD Patient 1 | | SCD Patient 2 | |
| | Predicted Healthy | Predicted SCD | Predicted Healthy | Predicted SCD | Predicted Healthy | Predicted SCD | Predicted Healthy | Predicted SCD |
| Actual Healthy | 2 | 8 | 3 | 7 | — | — | — | — |
| Actual SCD | — | — | — | — | 7 | 18 | 1 | 24 |

*Healthy = healthy RBCs; SCD = sickle cell disease RBC; — = not applicable

TABLE 6

Classification output for disease detection of patients using only morphology-based features:

| | Healthy | | | | SCD | | | |
| --- | --- | --- | --- | --- | --- | --- | --- | --- |
| | Healthy Patient 1 | | Healthy Patient 2 | | SCD Patient 1 | | SCD Patient 2 | |
| | Predicted Healthy | Predicted SCD | Predicted Healthy | Predicted SCD | Predicted Healthy | Predicted SCD | Predicted Healthy | Predicted SCD |
| Actual Healthy | 9 | 1 | 8 | 2 | — | — | — | — |
| Actual SCD | — | — | — | — | 2 | 23 | 1 | 24 |

*Healthy = healthy RBCs; SCD = sickle cell disease RBC; — = not applicable

TABLE 7

Classification output for disease detection of patients using both morphological and spatio-temporal-based features:

| | Healthy | | | | SCD | | | |
| --- | --- | --- | --- | --- | --- | --- | --- | --- |
| | Healthy Patient 1 | | Healthy Patient 2 | | SCD Patient 1 | | SCD Patient 2 | |
| | Predicted Healthy | Predicted SCD | Predicted Healthy | Predicted SCD | Predicted Healthy | Predicted SCD | Predicted Healthy | Predicted SCD |
| Actual Healthy | 10 | 0 | 10 | 0 | — | — | — | — |
| Actual SCD | — | — | — | — | 0 | 25 | 0 | 25 |

*Healthy = healthy RBCs; SCD = sickle cell disease RBC; — = not applicable

Feature importance was then computed using the predictor importance estimate (PIE) to verify that the features used contributed to the training model. The PIE was computed for the random forest model used for patient level testing, wherein both spatio-temporal and morphology-based features were used. The predictor importance estimate is a measure of a feature's influence in determining the output of a random forest classifier. To find this estimate, first the out-of-bag error is calculated at each decision tree in the random forest. The features associated with each decision tree are then indexed. The values for a particular feature in a decision tree are then permuted and a new out-of-bag error is computed. The difference between the new out-of-bag error and the original out-of-bag error is calculated to determine the model error. A lower model error indicates that a feature is not influential in predicting the output. This is then repeated for all features in a decision tree and for all decision trees. For each feature, the mean ($\bar{d}_e$) and standard deviations ($\sigma_e$) of the model error is taken across all decision trees and the final predictor importance estimate is calculated for a given feature by ($\bar{d}_e$)/$\sigma_e$.

Figure 48:
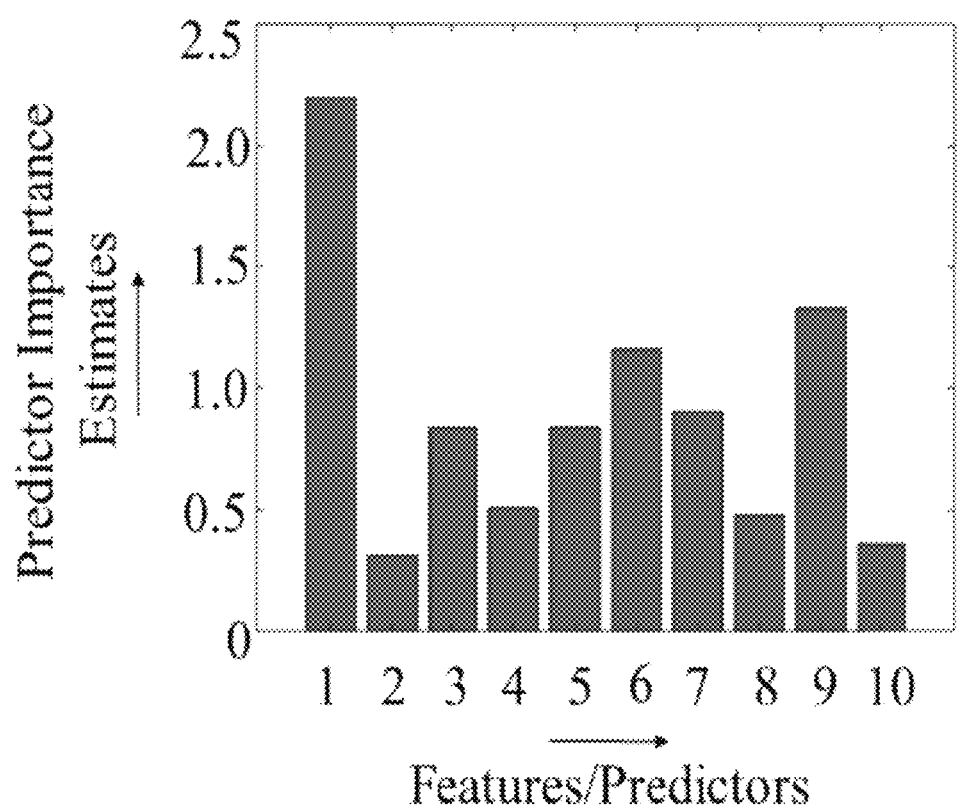
FIG. 48 shows predictor importance estimates for the 10 features (see FIG. 47); Features are numbered 1-10 and represent optical flow, standard deviation of the 2D mean map, standard deviation of the standard deviation map, mean optical path length, coefficient of variation, optical volume, projected area, projected area to optical volume ratio, skewness, and kurtosis, respectively.

The higher the predictor importance estimate (PIE), the more influential a feature is in determining the output and therefore, the more information the feature contributes to the model. In FIG. 48, the importance of all 10 features is shown. The ten features in order are optical flow, standard deviation of the 2D mean map, standard deviation of the standard deviation map, optical path length (M-OPL), coefficient of variation (COV), Optical volume (OV), Projected area (PA), ratio of PA and OV, skewness and kurtosis. Feature 1 (optical flow) is the most important feature with a PIE of 2.1989. Feature 2 (Mean of the Standard deviation) is the least important with a PIE of 0.3103. From FIG. 48 one can deduce that inclusion of spatio-temporal features provides additional useful information to the classifier, which may result in improved classification accuracy. In particular, feature 1 (optical flow) outperforms all other features.

Discussion

There are several advantages of the proposed approach over more traditional lab-based tests such as hemoglobin electrophoresis, including time, cost and accessibility. The electrophoretic assay takes a few hours, but oftentimes, multiple patients are batched together to reduce cost, which can extend the time to results for a patient to several days. Additionally, these tests require trained personnel and adequate lab facilities, which may not be available in third-world countries. Using the disclosed proposed approach, specially trained personnel is not necessary, and diagnosis of a patient may be capable in as little as a few minutes from the initial blood draw, which may be further reduced with optimized hardware and software. Furthermore, the proposed approach may reduce cost, as a single system is not limited in the number of patients it can be used to test.

Conclusion:

This Example has presented a compact, field portable imaging system using shearing interferometry that can distinguish between healthy red blood cells (RBC) and sickle cell disease (SCD) red blood cells using a spatio-temporal analysis of cell membrane fluctuations combined with morphological cell (spatial) features based on optical path length (OPL). By testing on patients not included in the training of the classifier, this proposed system is capable of performing diagnosis of sickle cell disease. The proposed biosensor recorded a video containing hologram frames of cells, which were segmented and reconstructed for the individual frames then stacked together to form a data cube. Feature extraction was performed on the spatio-temporal data by computing standard deviation (STD) of the mean and STD of the spatio-temporal cube over time for each location on the cell membrane.

Moreover, optical flow (OF) vectors were computed to measure the lateral displacement of a cell over time. The STD of the magnitude of the OF vectors were computed. Spatial features based on the morphology of the cells were then computed based on the optical path length including mean optical path length (M-OPL), coefficient of variation (COV), Optical volume (OV), Projected area (PA), ratio of PA and OV, skewness and kurtosis.

By combining the spatio-temporal features and spatial features, a pre-trained random forest classifier was able to achieve high prediction accuracy. Using this approach is advantageous, as the proposed classification system may be capable of rapid and cost-effective testing to provide results in near real time. Future work can involve a deeper analysis of motility related features for biological classification problems, automated segmentation algorithms, larger pool of patients, ROC analysis to determine the optimal cutoff value for diagnosis, and increased frame rates of hologram video acquisition as well as testing the proposed systems on different types of diseased cells with various holographic approaches.

In another example embodiment and with reference to FIG. 17, it is noted that a RBC can have three possible degrees of freedom (e.g., in the x, y and z directions of FIG. 17). An exemplary digital holographic microscope can compute the axial motion (e.g., along the z-axis) of a RBC over time. As such, exemplary 3D reconstructed images have dimensions (x, y, z).

By generating a video sequence of these 3D reconstructed images, one can gather unique information about the cell.

For example, Feature 1 can be the standard deviation of the mean of the 3D reconstructed image, I(x, y, z), over time t, which yields a single number.

Feature 2 can be the standard deviation of the standard deviation of the 3D reconstructed image I(x, y, z) over time t, which yields a single number.

The optical flow magnitude vectors compute the lateral motion (x-y) of a RBC in time t. As such, Feature 3 can be the standard deviation of the mean of the optical flow vectors of a 3D reconstructed image I(x, y, z) over time t, which yields a single number. The values for Feature 1, Feature 2, and Feature 3 for a micro-object (e.g., a cell or microorganism) can be used for classification of the micro-object.

Optical flow computes the movement of an object (e.g., RBC) from one frame to another. Optical flow estimation can be used in computer vision to characterize and quantify the motion of objects in a video stream, sometimes for motion-based object detection and tracking systems and often uses the assumption of constant illumination over time t.

The output of the optical flow algorithm are vectors, V, that depict the direction of the movement of an object with four features: vector magnitude [V], vector angle θ, x-component of vector, $V_x$, and y-component of vector, $V_y$.

Figure 18A:
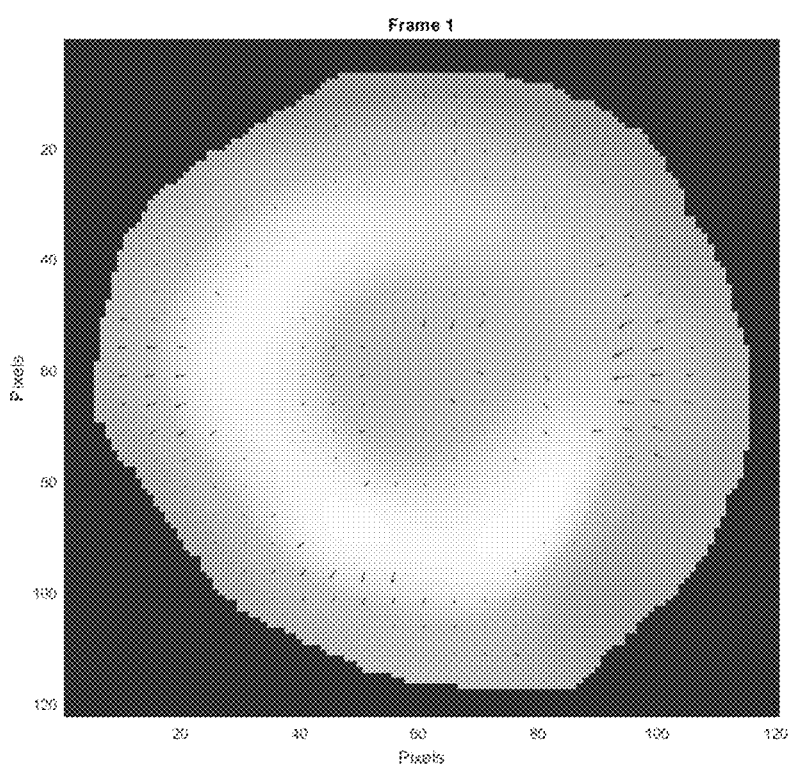
FIGS. 18A-18B show optical flow between successive frames of a segmented RBC.
Figure 18B:
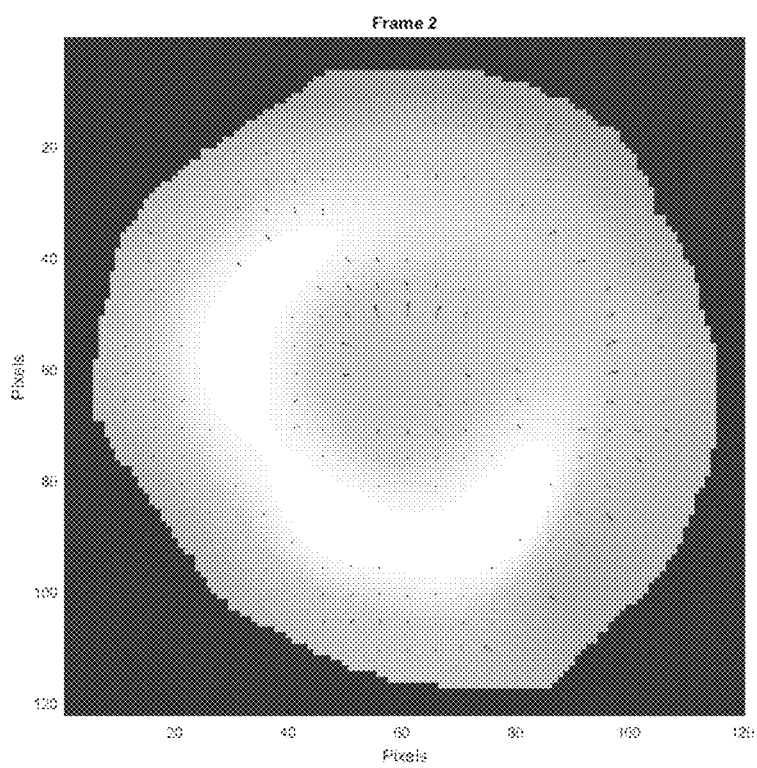
Figure 19A:
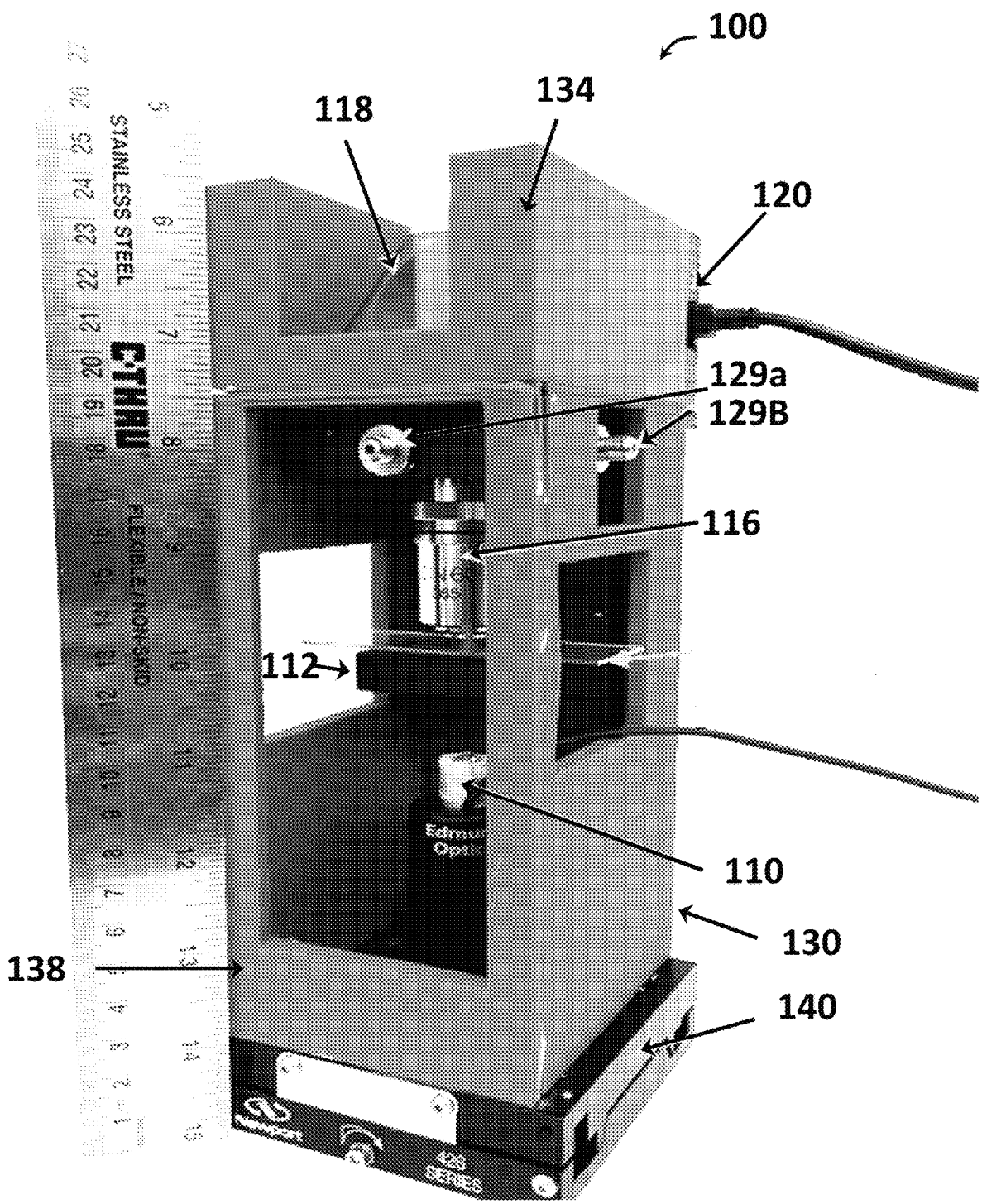
FIG. 19A is a perspective view of a portable common path shearing interferometry-based holographic microscopy system in accordance with some embodiments.
Figure 19B:
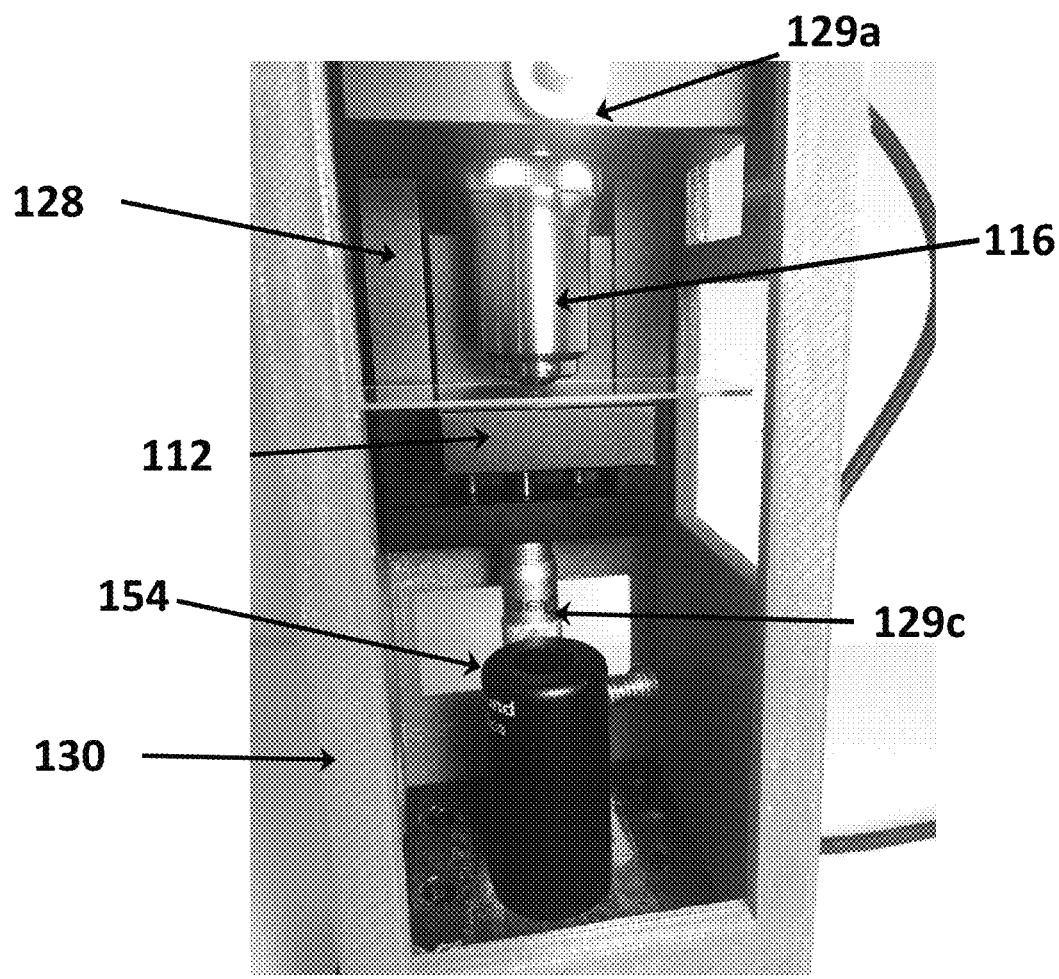
FIG. 19B is a front perspective view of a portion of the system of FIG. 19A.
Figure 19C:
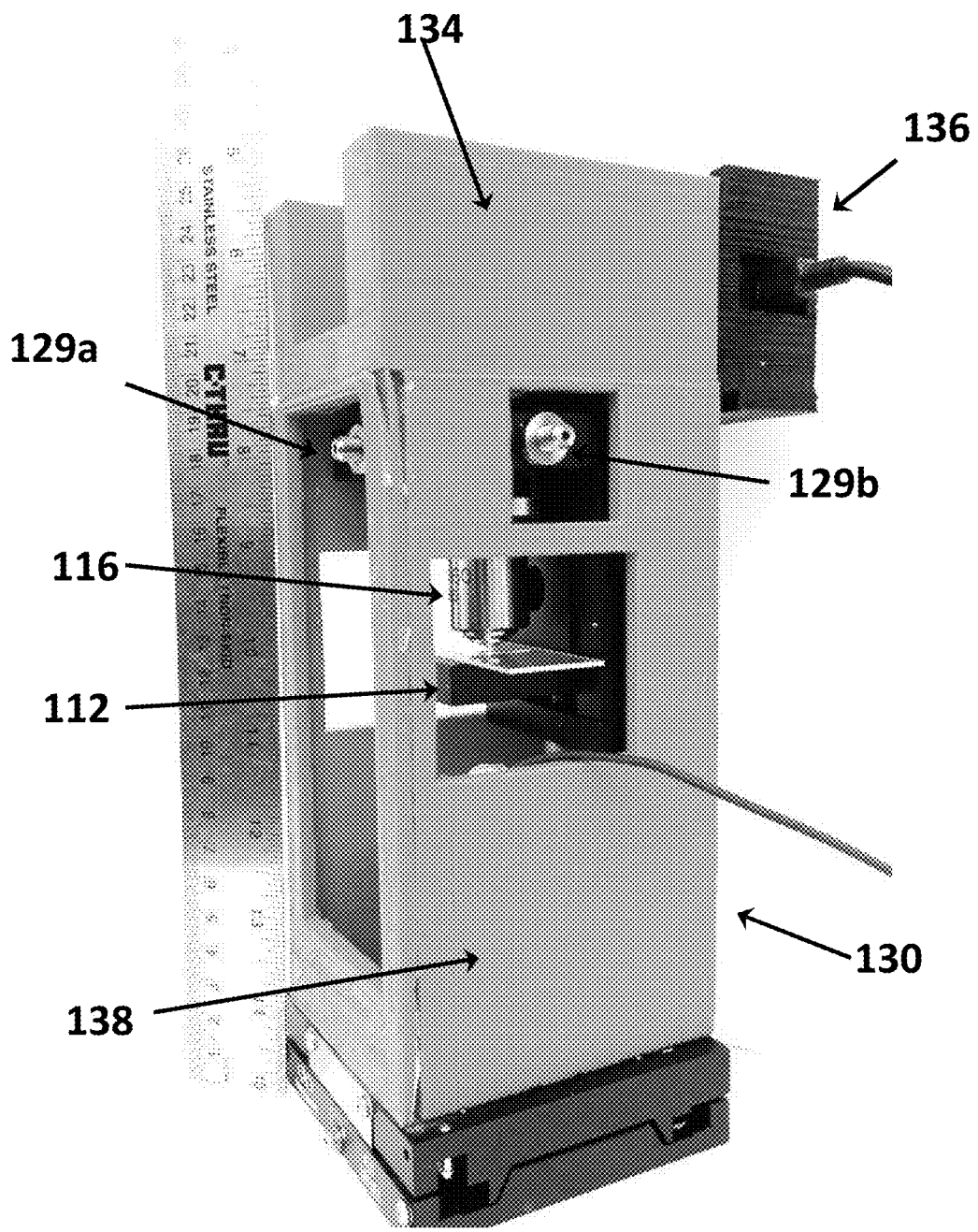
FIG. 19C is a side perspective view of the system of FIG. 19A.
Figure 19D:
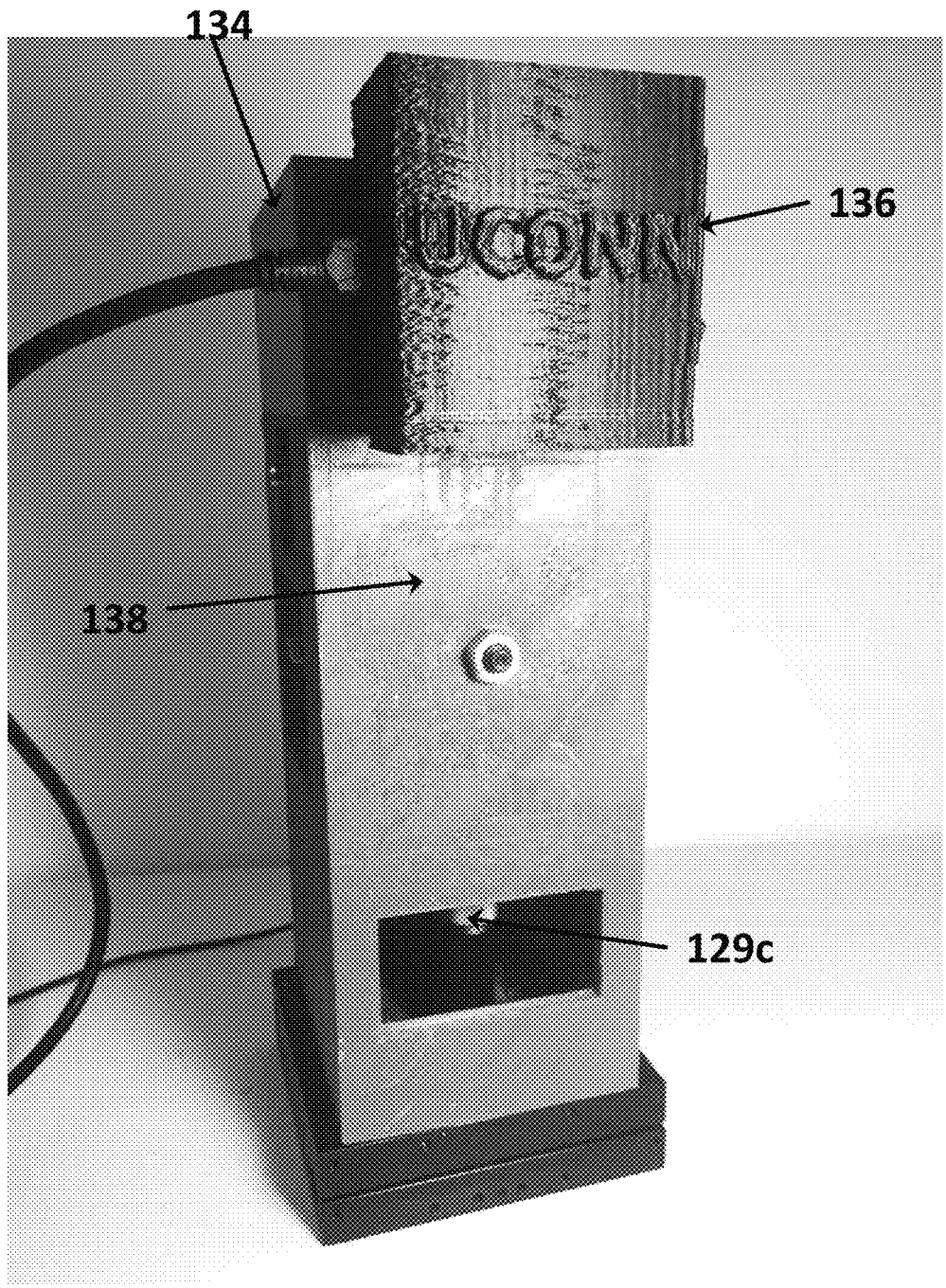
FIG. 19D is a back perspective view of the system of FIG. 19A.
Figure 19E:
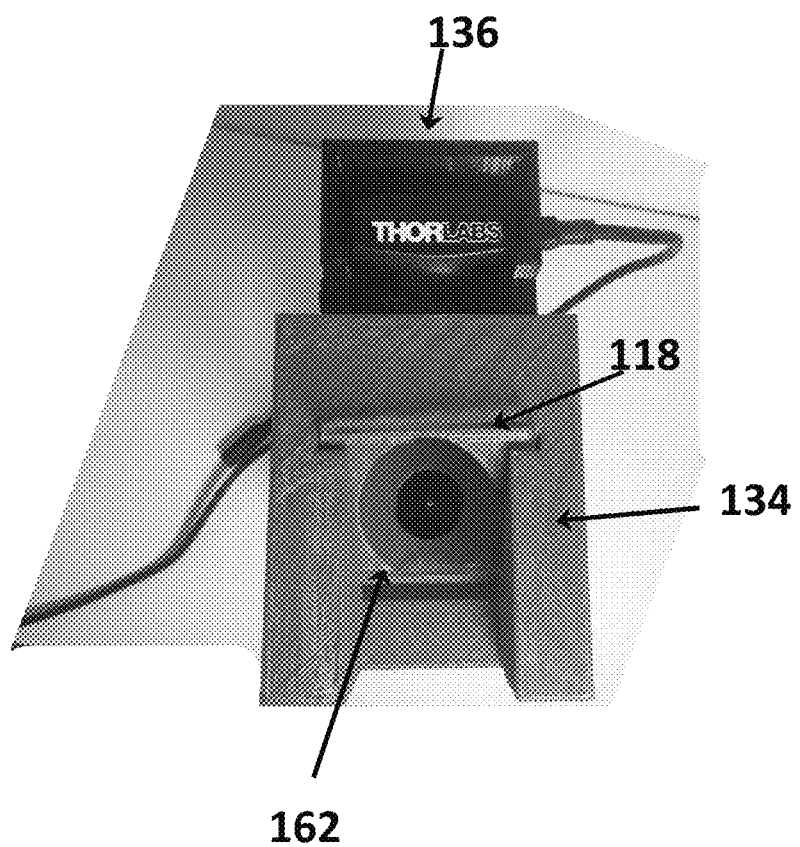
FIG. 19E depicts a top perspective view of the system of FIG. 19A.
Figure 19F:
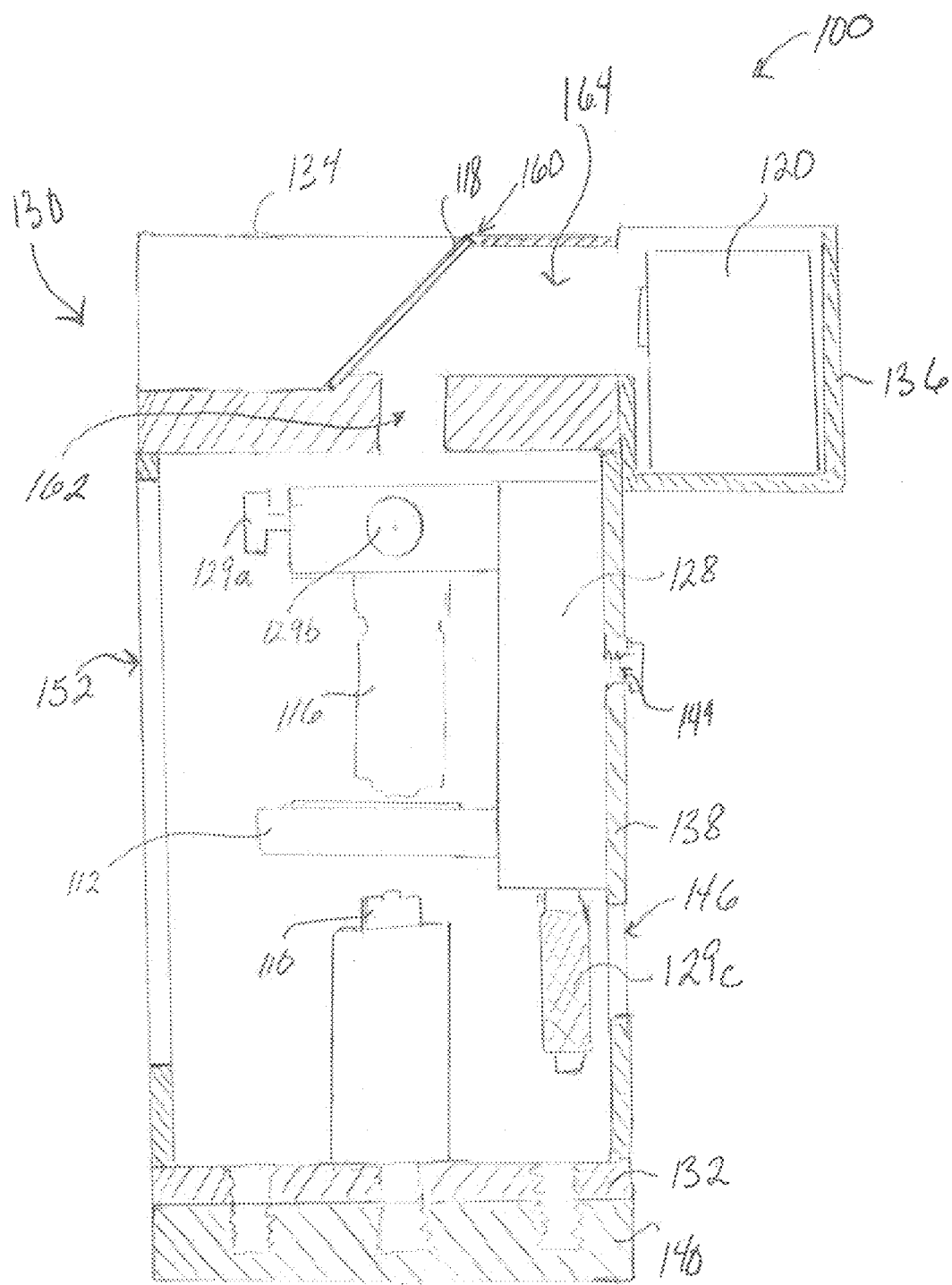
FIG. 19F schematically depicts a side cutaway view of the system of FIG. 19A with the housing cut away to show components within the housing.

FIGS. 18A-18B show optical flow between successive frames of a segmented RBC. FIG. 18A shows optical flow between frame 1 and frame 2, and FIG. 18B shows optical flow between frame 2 and frame 3. The magnitude of the optical flow vectors of FIGS. 18A and 18B are computed for Feature 3.

A single example frame from an example sickled RBC video of optical flow over all frames can be depicted. In each frame, the direction of flow is given by the vectors (quivers). It is noted that the high fluctuations occurred on the periphery of the cell.

As noted above, once Features 1, 2 and 3 were extracted, classification was performed using a random-forest classifier. Feature 1 can be the standard deviation of the mean of the data cube, thereby generating a 2D mean map (FIG. 14A). Feature 2 can be the standard deviation of the standard deviation of the data cube, thereby generating a 2D standard deviation map (FIG. 14B). Feature 3 can be the standard deviation of the mean of the optical flow. The dataset collected included 38 cells from healthy patients and 24 cells from sickled patients. The dataset was then split in half for testing/training. For the random-forest classifier, 100 trees were used.

It is also noted that these systems and methods fusing machine learning paired with OF as a simple and robust tool for automated classification can be utilized for other microscopic processes where cells exhibits cellular movement (e.g., cell division, cancer studies, stem cells, etc.).

Example 3

Digital holographic microscopy (DHMIC) is a label-free imaging modality that enables the viewing of microscopic objects without the use of exogenous or contrast agents. DHMIC provides high axial accuracy; however, the lateral resolution is dependent on the magnification of the objective lens used. DHMIC overcomes two problems associated with conventional microscopy: the finite depth of field, which is inversely proportional to the magnification of the objective, and low contrast between the cell and the surrounding media. Cells alter the phase of the probe wave front passing through the specimen, depending on the refractive index and thickness of the object. Several methods have been developed to transform the phase information of the object into amplitude or intensity information, but these methods only provide qualitative information and lack quantitative information. Staining methods, such as the use of exogenous contrast agents, can enhance the image contrast, but it might change the cell morphology or be destructive. Due to the availability of fast CCD and CMOS sensors, it is possible to record digital holograms in real time. The recorded holograms can be numerically reconstructed by simulating the process of diffraction using scalar diffraction, leading to the complex amplitude of the object. This complex amplitude contains the spatial phase information of the object, from which one can reconstruct the phase profile of the object.

Digital holography and microscopy are complementary techniques, and when combined, they can be useful for studying cells in a quantitative manner. To study dynamic parameters of the cell, such as cell membrane fluctuations, one needs a very stable setup because these fluctuations occur over just a few nanometers. The problem with existing digital holographic (DH) microscopy setups that use a double path configuration, is that the beams travel in two different arms of the interferometer and are then combined using a beam-splitter. As a result, the two beams may acquire uncorrelated phase changes due to mechanical vibrations. In comparison to two beam or double path interferometric setups, common path setups are more robust and immune to mechanical vibrations. In a common path setup, the two beams travel in the same direction, that is, the direction of beam propagation.

Some embodiments include a compact, and field portable holographic microcopy imaging system. In some embodiments, the system that can be used for automated cell identification. In some embodiments, the system includes a laser light source, a microscopic objective lens, a shear plate, an imaging device (e.g., a CMOS camera or a cell phone camera), and a housing configured to hold the shear plate and to maintain a position of the shear plate relative to the objective lens. In some embodiments, the components used to build the setup are off-the-shelf optical components combined with a custom housing. In some embodiments, the custom housing may be printed from using 3D printer. In some embodiments, the system is a low cost, compact, and field-portable holographic microscopy system.

In some embodiments, the system also includes a computing device in communication with the imaging device. In some embodiments, the computing device is programmed to reconstruct pseudocolor 3D renderings from the phase maps after numerical processing of the digital hologram. In some embodiments, the computing system is also programmed to extract features from the 3D reconstruction. In some embodiments, features are extracted from a cell or a microorganism or a cell-like object in the sample.

In some embodiments, the compact and field portable holographic microcopy imaging systems are described and disclosed in the related U.S. Provisional Application No. 62/631,268 and entitled "PORTABLE COMMON PATH SHEARING INTERFEROMETRY-BASED HOLOGRAPHIC MICROSCOPY SYSTEM" filed on Feb. 15, 2018, the entirety of which is incorporated herein by reference, and such systems can be used to classify a cell as similarly disclosed in Examples 1 and 2 above.

In some embodiments, data is recorded at various time points, features are extracted for various points in time, and time-dependent features are used for the automated cell classification as described in Examples 1 and 2 above.

Based on their developments in automated classification of cells based on time dependent features, the inventors realized that a portable, common-path shearing interferometry-based microscope with good temporal stability that could be used for automated cell identification would be incredibly advantageous for onsite analysis of samples in facilities and areas where space is at a premium, or where normal analysis facilities are not available and the system could be carried in.

Some embodiments of the portable common path shearing interferometry-based holographic microscopy system have good stability over time even though they are small and not mounted on a traditional floating optical table. As noted above, this is especially important when time-dependent processes, such as cell membrane fluctuations, are being studied or time-dependent features are being used for the classification of cells. Some embodiments eliminate components and optical elements used in traditional common path shearing interferometry-based holographic microscopy systems to improve temporal stability. The custom housing of systems also improves temporal stability by reducing vibrations between various components (e.g., between the shear plate and the objective lens) by mounting both components to the same housing. Further, in contrast to traditional common path shearing interferometry-based holographic microscopy systems, the geometries employed by the housings in embodiments enable the optical components to be housed in a relatively small system that is lightweight and portable, while maintaining good temporal stability.

In some embodiments, the system is portable having a relatively small size and a relatively small weight. For example, in some embodiments, the system has a length of less than 350 mm, a width of less than 350 mm and a height of less than 300 mm. In some embodiments the system has a length of less than 320 mm, a width of less than 320 mm and a height of less than 250 mm. In some embodiments, the system has a length of less than 150 mm, a width of less than 150 mm and a height of less than 250 mm. In some embodiments, the system has a length of less than 100 mm, a width of less than 95 mm and a height of less than 200 mm. In some embodiments, the system has a length of less than 90 mm, a width of less than 90 mm and a height of less than 130 mm. In some embodiments, the system has a mass of less than 6 kg. In some embodiments, the system has a mass of less than 2 kg. In some embodiments, the system has a mass of less than 0.9 kg. In some embodiments, the system has a mass of less than 0.5 kg. In one example embodiment, a system has a length of about 95 mm, a width of about 75 mm and a height of about 200 mm. In one embodiment, the system has a length of about 90 mm, a width of about 85 mm and a height of about 200 mm. In one example embodiment, a system has a length of about 80 mm, a width of about 80 mm and a height of about 130 mm. In one example embodiment the system has a mass of about 0.87 kg. In one example embodiment the system has a mass of 0.45 kg.

FIGS. 19A-19F depict an embodiment of a portable common path shearing interferometry based holographic imaging system 100. The system 100 includes a light source (e.g., laser diode 110), a sample holder 112, an objective lens 116, a shear plate 118, an imaging device 120, and a housing 130, where the housing 130 holds the shear plate 118. In some embodiments, the housing 130 is mounted on a base 140 as shown. The system 100 is configured to position the laser light source 110, the sample holder 112, the objective lens 116, the glass plate 118 and the imaging device 120 in a common path shearing interferometry configuration as explained below with respect to FIG. 20.

Figure 20:
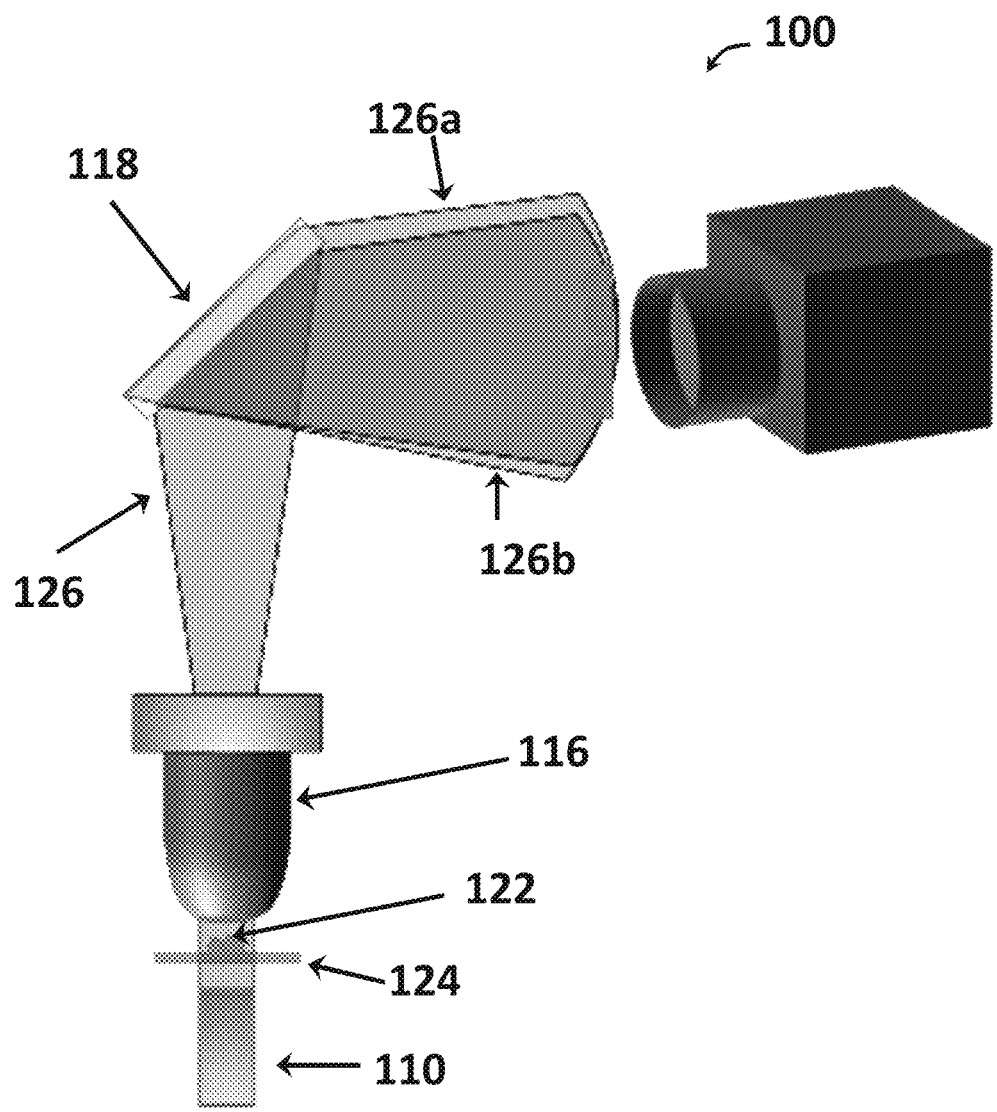
FIG. 20 schematically depicts the optical path of the common path shearing interferometry system of FIG. 19A.

FIG. 20 schematically depicts the beam path and optical elements of the system 100 shown FIGS. 19A-19F. The laser light source (e.g., laser diode 110) outputs a beam 126 which illuminates a sample 122 at a specimen plane 124. After passing through the specimen plane 124 and through/around the sample 122, the beam 126 is magnified by the microscope objective lens 116, and is incident on the shear plate 118, which splits the beam generating two laterally sheared object beams 126a, 126b. These two sheared beams interfere at the imaging device 120 and interference fringes are observed.

In some embodiments, the system may exhibit good temporal stability. As noted above, in comparison to two beam or double path interferometric setups, common path interferometers are more robust and immune to mechanical vibrations, at least, because in a common path setup the two beams in the same direction at the same time along the common path. Some embodiments incorporate additional features that increase the temporal stability of the system. For example, some digital holographic imaging systems incorporate a beam expander, a mirror or other additional optical elements between the laser light source and the specimen plane; however, the more optical elements between the laser source and the imaging device, the greater the impact of vibrations on temporal stability. Thus, some embodiments do not include any optical elements in the beam path between the laser source and the specimen plane. In some embodiments, the only optical elements in the beam path between the laser light source and the imaging device are the shear plate, the microscope objective and a support for the sample, such as a sample stage/slide mount. Further, having many of the optical components supported by the same housing increases the temporal stability of the system. In embodiments where the different portions of the housing are all part of a unitary piece, the system may exhibit even better temporal stability.

In some embodiments, the housing 130 is configured to maintain the relative positions of at least the objective lens 116 and the shear plate 118. For example, in some embodiments, the objective lens 116 is mounted to the housing 130, either directly or indirectly. In some embodiments, the housing is also configured to maintain the position of the sample holder 112 relative to the objective lens 116 and the shear plate 118. For example, in some embodiments, the sample holder 112 is mounted to the housing 130, either directly or indirectly. In the embodiment shown in FIGS. 19A-19F, the objective lens 116 is mounted to a lens and stage mounting component 128 that enables x-y lateral adjustment of the objective lens 116 through two adjustment knobs 129a, 129b. The lens and stage mounting component 128 also has a portion, which is used as the sample holder 112, that can be translated in the z-direction relative to the objective lens 116 using a third control knob 129c. The lens and stage mounting component 128 is mounted to a back wall of the housing 130. An opening 146 in the back wall of the housing provides access to the third control knob 129c (see FIGS. 19B, 19D and 19F). In this embodiment, the lens and stage mounting component 128 is a modified version of a commercially available spatial filter mount, which is depicted in Figured 25A and 25B. In some embodiments, the housing 130 is also configured to maintain the position of the imaging device 120 relative to the objective lens 116 and the shear plate 118. For example in some embodiments, the imaging device 120 is also mounted to the housing 130, either directly or indirectly. In the embodiment shown in FIGS. 19A-19F, the housing 130 includes an imaging device holding portion 136 that is configured to receive and hold an imaging device (see also FIGS. 24A and 24B).

The housing 130 also includes a shear plate holding portion 134 that is configured to receive and hold the shear plate. Further details regarding the shear plate holding portion are provided below with respect to FIGS. 23A and 23B.

FIGS. 21-25B depict components of the housing 130, specifically the sidewall portion 138, the housing base portion 132, the shear plate holding portion 134 and the imaging device holding portion 136. In some embodiments, one or more of the components depicted in FIGS. 21-25B may be combined into one or more unitary pieces instead of being formed as separated components. In some embodiments, one or more of the components of the housing may be formed by 3D printing. In some embodiments, one or more of the components may be formed by molding. Any other suitable technique may be employed for forming or making the components of the housing.

Figure 21A:
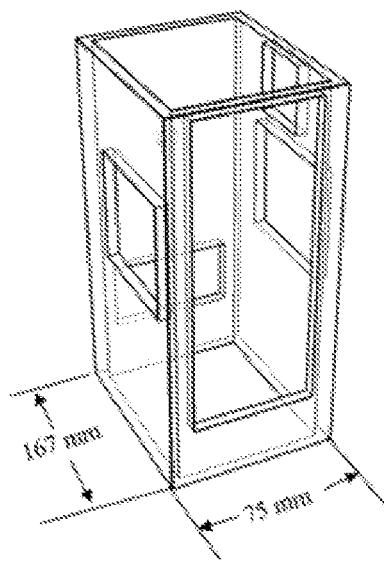
FIG. 21A depicts a perspective view of the sidewall portion of the housing of the system of FIG. 19A.
Figure 21B:
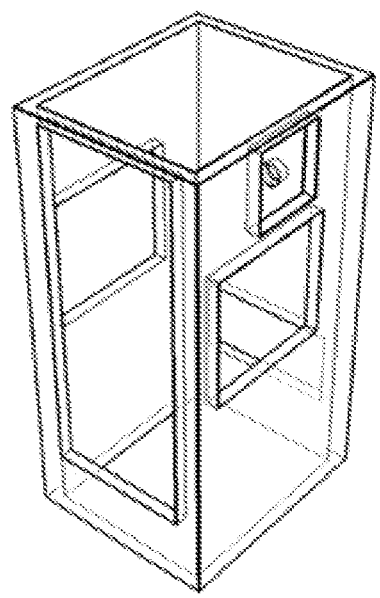
FIG. 21B depicts another perspective view of the sidewall portion of the housing of FIG. 21A.

FIGS. 21A and 21B depict a sidewall portion 138 of the housing, to which the microscope objective lens 116 and the sample holder 112 are mounted. In the embodiment depicted, a front wall of the sidewall portion has a large opening 142 for accessing the laser light source 110, the microscope objective 116 and the sample holder 112. In the embodiment depicted, a back wall of the sidewall portion 138 has a hole 144 to enable attachment of the lens and stage mounting component 128 using a screw or bolt. The back wall of the sidewall portion 138 also has an opening 146 to enable access to the knob 129c to the z-control for the lens and stage mounting component 128 to control a height of the sample holder 112. The housing is also configured to enclose the laser light source 110, the sample holder 112, and the microscope objective lens 116. In some embodiments, a first side wall of the sidewall portion 138 includes two openings, a lower opening 148 for accessing the sample holder 112 and an upper opening 150 for accessing the adjustment knob 129b for adjusting a lateral position of the microscope objective 116. In some embodiments, a second sidewall of the sidewall portion 138 includes an opening 152 for accessing the sample holder 112.

Figure 22:
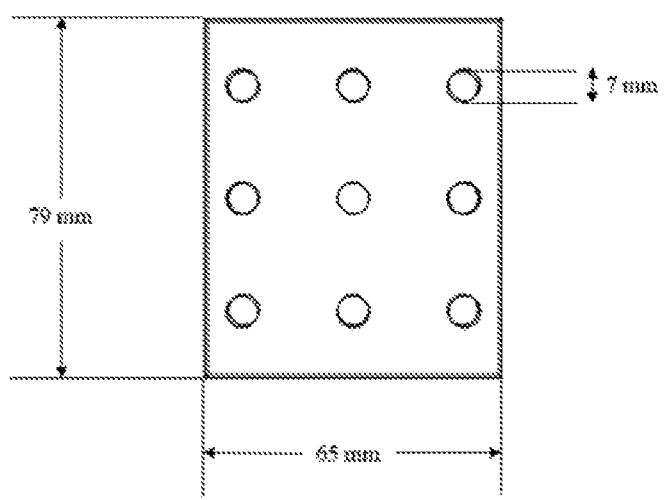
FIG. 22 is a top view of a base portion of the housing of the system of FIG. 19A.

In some embodiments, the housing 130 includes a base portion 132 that may be attached to the housing or may be a unitary portion of the housing. In some embodiments, a separate base 140 may be employed where the housing 130 is attached to the separate base 140. In some embodiments, the housing 130 includes a base portion 132 and the housing including the base portion are attached to a separate base 140. FIG. 22 depicts a top view of a base portion 132 of the housing 130. In the system depicted in FIGS. 19A-19F, the laser light source (e.g., the laser diode light source) is mounted to the separate base 140 using a post holder 154 that screws into the separate base 140 through the base portion 132 of the housing (see FIGS. 19B and 19F).

Figure 23A:
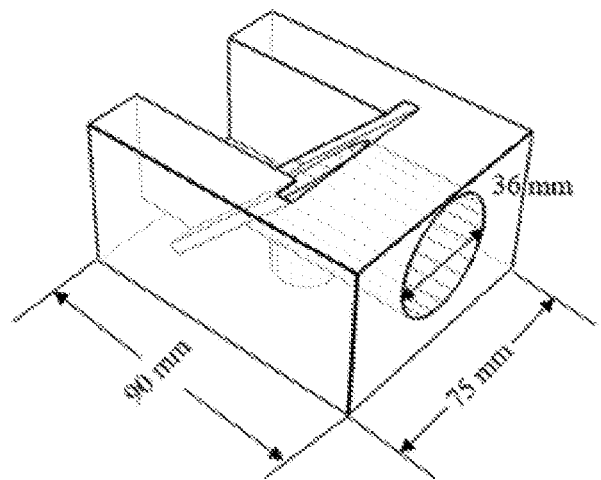
FIG. 23A is a perspective view of a shear plate holding portion of the housing of the system of FIG. 19A.
Figure 23B:
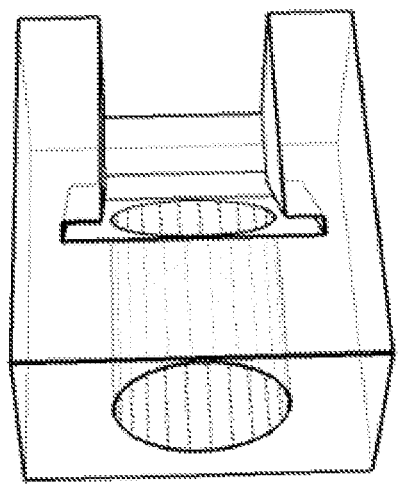
FIG. 23B is a perspective view from the top and front of the shear plate holding portion of FIG. 23A.

FIGS. 23A and 23B depict a shear plate holding portion 134 of the housing that is configured to hold the shear plate 118. In some embodiments, the shear plate holding portion 134 of the housing is positioned over the sidewall portion 138 of the housing. In some embodiments, the shear plate holding portion 134 is attached to the sidewall portion 138 (e.g., via glue, melt bonding, or via screws) In some embodiments, the shear plate holding portion 134 of the housing includes a slot 160 configured to receive the shear plate 118 as shown. In some embodiments, the shear plate holding portion 134 of the housing defines a first channel 162 extending to the slot configured to hold the shear plate 118 (see also FIG. 19F). In some embodiments, the shear plate holding portion 134 of the housing also a second channel 162 that intersects with the first channel 164. The shear plate holding portion 134 of the housing is configured such the light beam 126 enters through the first channel 162, strikes the shear plate 118, and is reflected off the different surfaces of the shear plate 118 as two different beams 126a, 126b along the second channel 164 toward the imaging device 120.

Figure 24A:
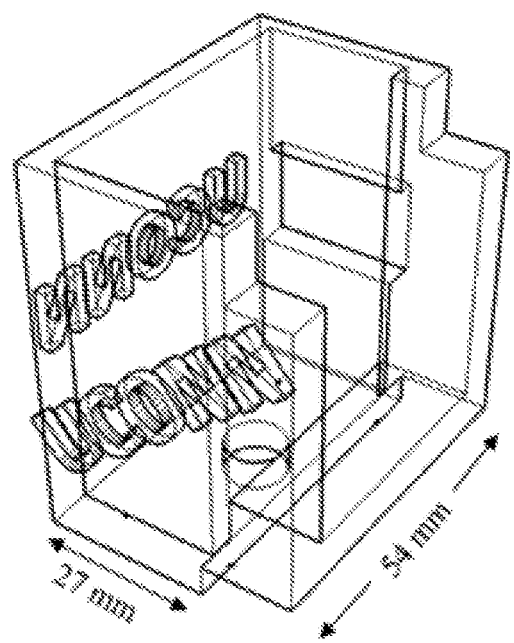
FIG. 24A is a perspective view from the side and front of an imaging device holding portion of the housing of the system of FIG. 19A.
Figure 24B:
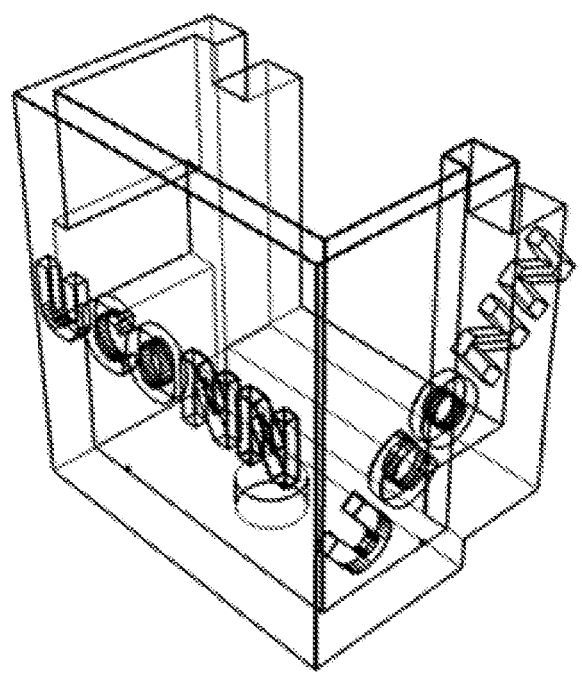
FIG. 24B is a perspective view from the side and back of the imaging device holding portion of FIG. 24A.
Figure 24C:
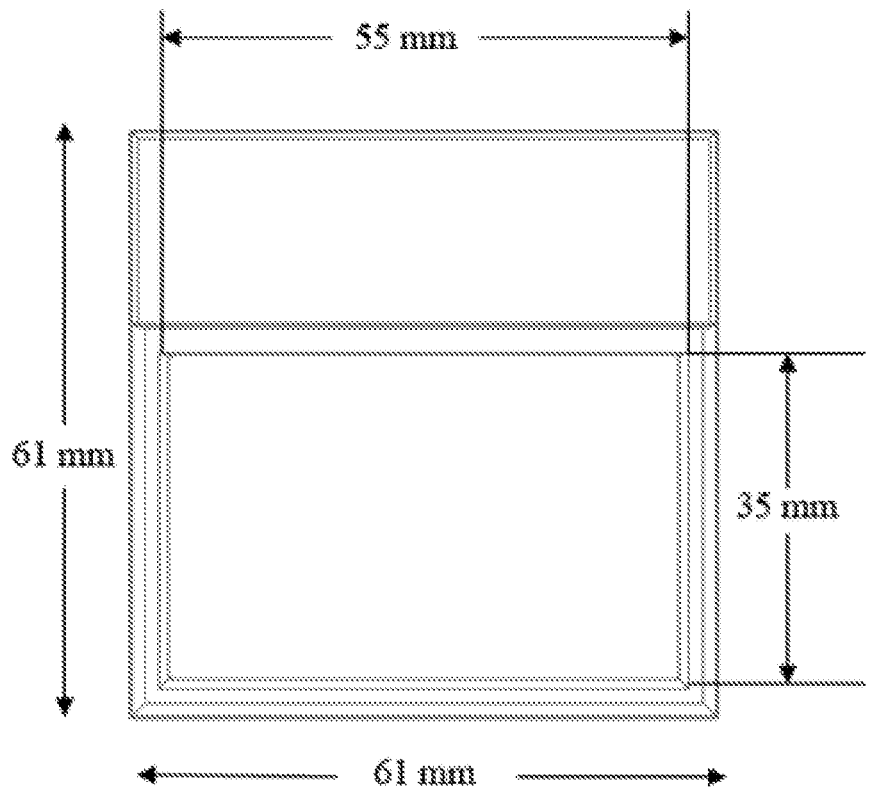
FIG. 24C is a top view of a cover for the imaging device holding portion FIG. 24A.
Figure 24D:
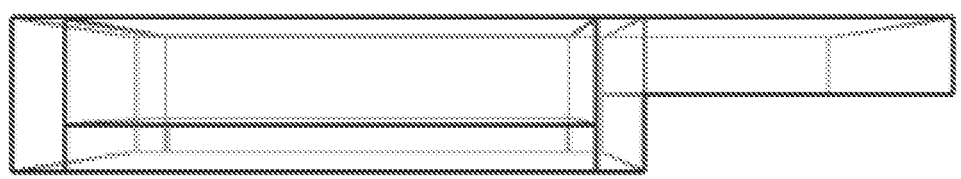
FIG. 24D is a side view of the cover of FIG. 24C.

FIGS. 24A and 24B depict the imaging device holding portion 136 of the housing. In some embodiments, the imaging device holding portion 136 of the housing is attached to the shear plate holding portion 136 of the housing (see FIGS. 19C-19E). The imaging device holding portion 136 of the housing is configured to receive and hold the imaging device 120 (e.g., a CMOS image sensor). In some embodiments imaging device holding portion 136 is permanently attached to the shear plate holding portion 136 and in some embodiments it is detachable or removable to enable the system to work with other imaging devices having other physical configurations. FIGS. 24C and 24D depict an optional cover 137 for the imaging device holding portion 136 of the housing that may be included in some embodiments.

FIGS. 25A and 25B depict the 128 lens and stage mounting component 128.

Figure 26A:
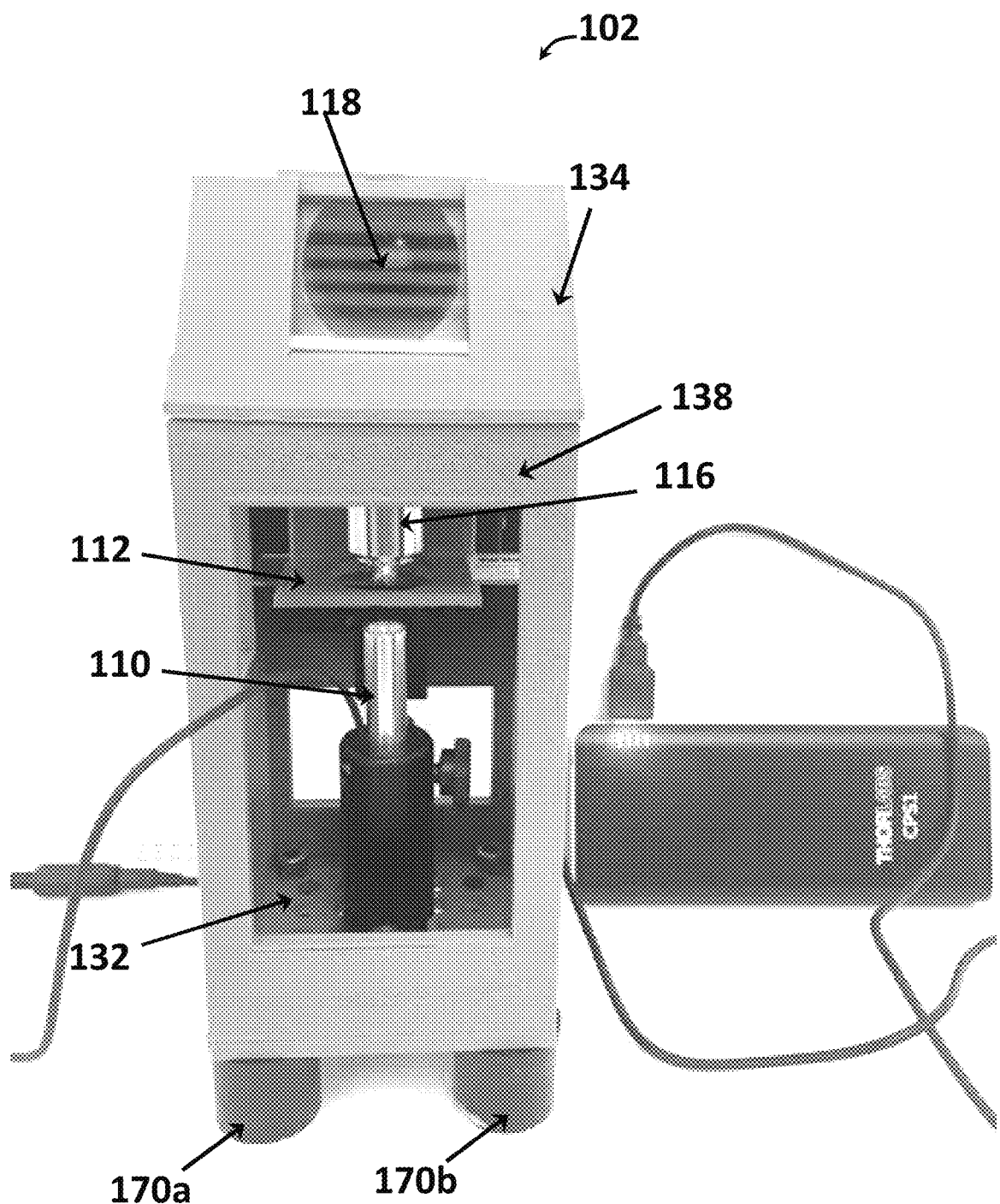
FIG. 26A is a perspective view of a portable common path shearing interferometry-based holographic microscopy system in accordance with some embodiments.
Figure 26B:
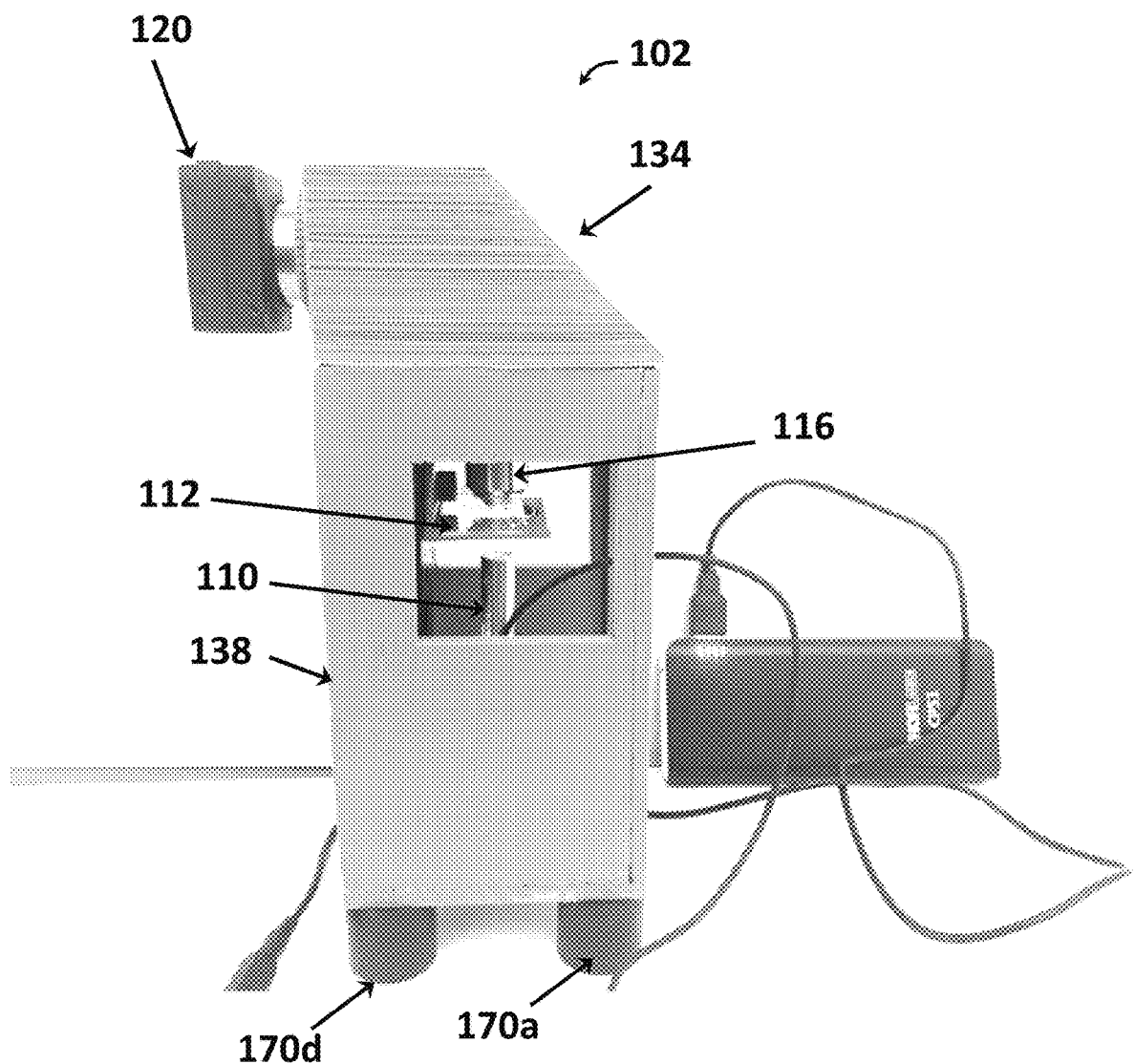
FIG. 26B is a side perspective view of the system of FIG. 26A.
Figures 26C, 26D:
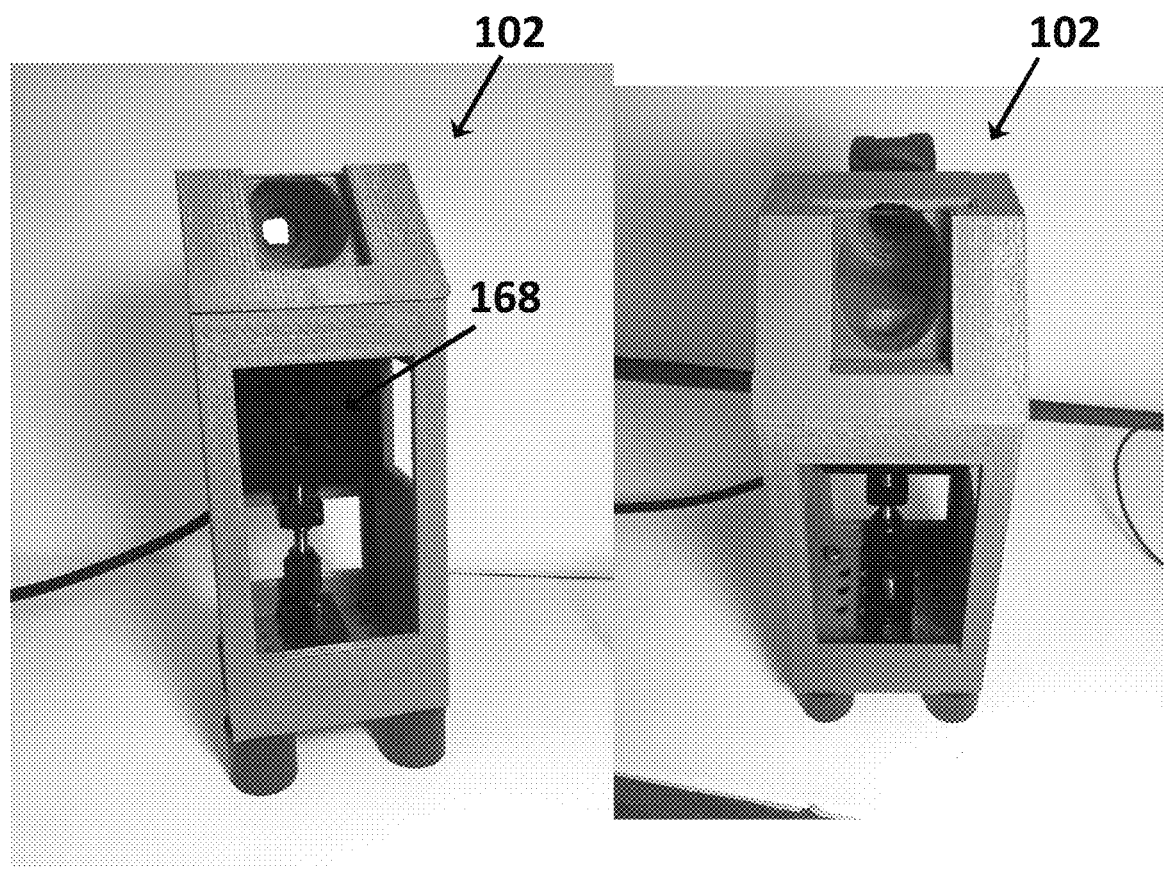
FIG. 26C is another perspective view of the system of FIG. 26A.
FIG. 26D is a perspective view from the top and front of the system of FIG. 26A.

FIGS. 26A-26E depict another embodiment of a portable common path shearing interferometry based holographic imaging system 102. System 102 has some similarities with system 100 described above, however, it has fewer components. For simplicity, the reference numbers employed for system 100 will be used to when referring to similar components in system 102, however, there are differences between many of the components in the different systems which are described below. In system 102, the lens and stage mounting component 128 is replaced with single translating stage 168 that attaches to the back of the sidewall portion 138 of the housing. FIGS. 26C and 26D show the system 102 with the sample holder 112, microscope objective 116 and laser light source 110 removed to provide a clear view of the single translating stage 168. A sample holder 112 is attached to the single translating stage 168. A microscope objective holder is affixed (e.g., by an adhesive) in a tapered hole in the shear plate holding portion 134 of the housing. The microscope objective holder includes internal threads that mate with threads in the microscope objective lens 116 for removably mounting the microscope objective lens 116 to the shear plate holding portion 134 of the housing. Because there is no longer an x-y adjustment for the objective, fewer openings are needed in the sidewall portion 138 of the housing.

Figure 26E:
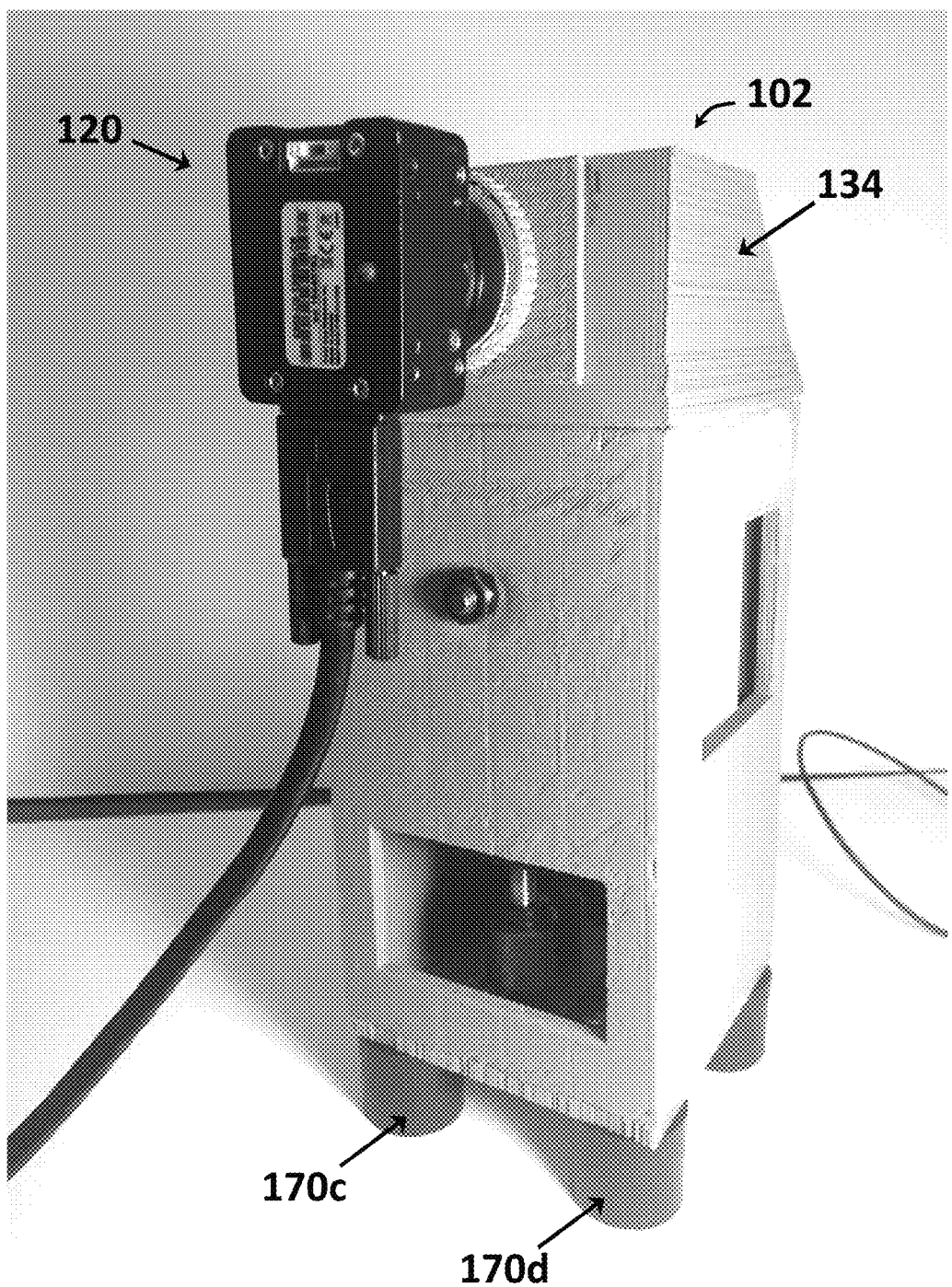
FIG. 26E is a perspective view from the back and side of the system of 26A.

In system 102, the imaging device holding portion 136 of the housing is omitted and the imaging device 120 itself mounts to the shear plate holding portion 134 of the housing (see FIGS. 26B and 26E).

System 102 includes a base portion 132 of the housing, but does not include a separate base 140. Instead, the housing 130 in system 102 is supported on legs 170a-170d.

Figure 27:
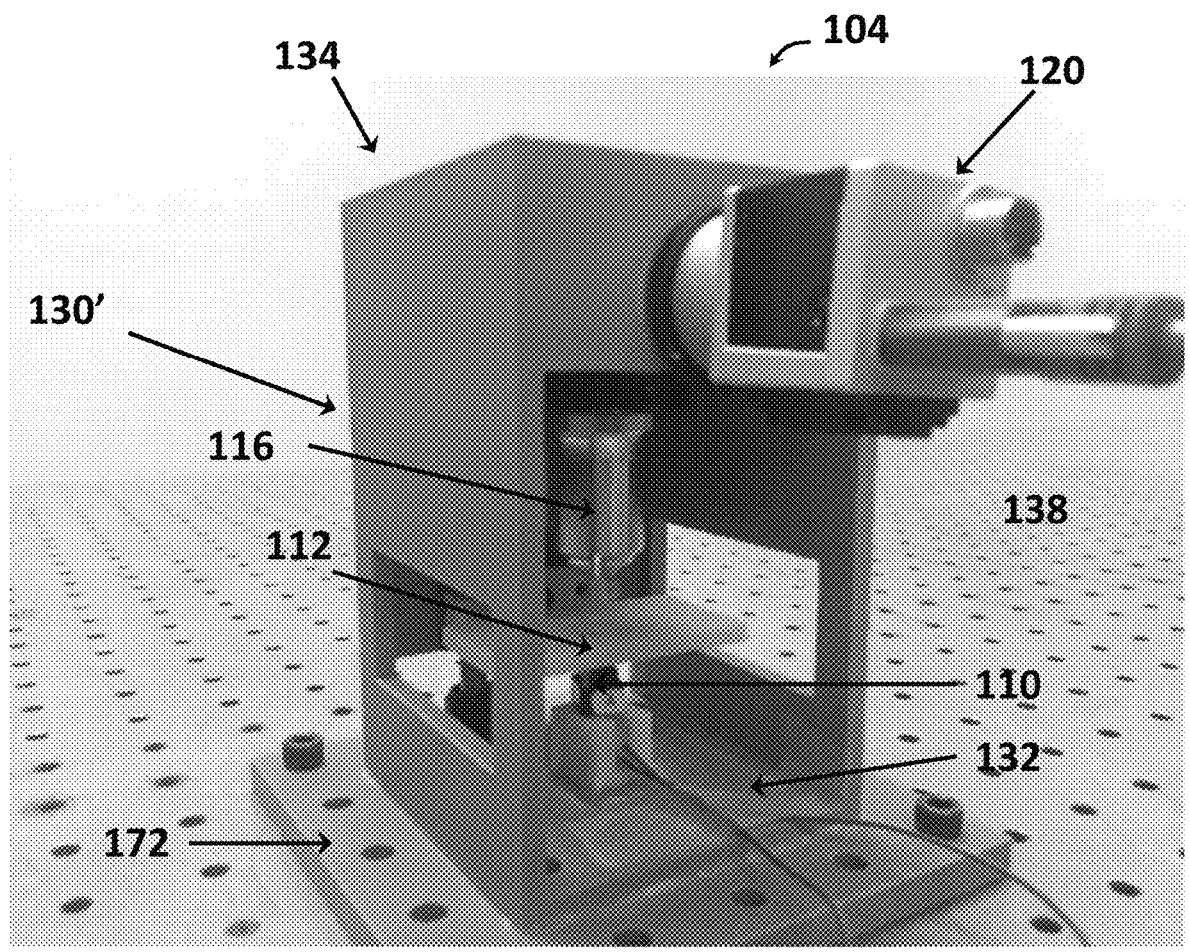
FIG. 27 is a perspective view of a portable common path shearing interferometry-based holographic microscopy system in accordance with some embodiments.
Figure 28A:
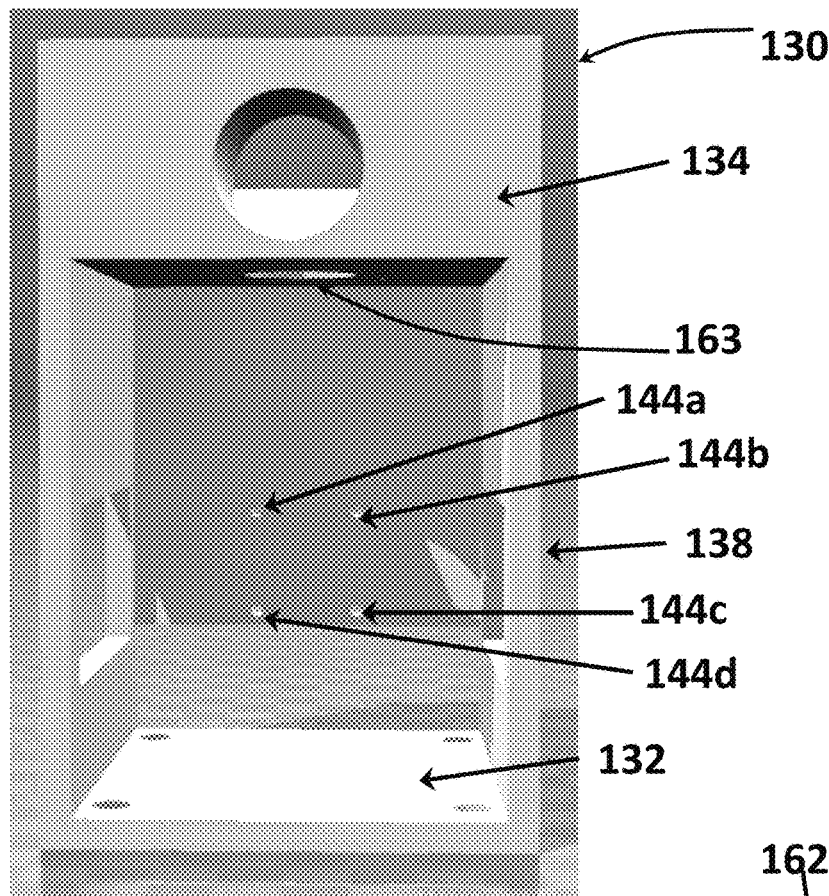
FIG. 28A is a front perspective view of a housing of the system of FIG. 27.
Figure 28B:
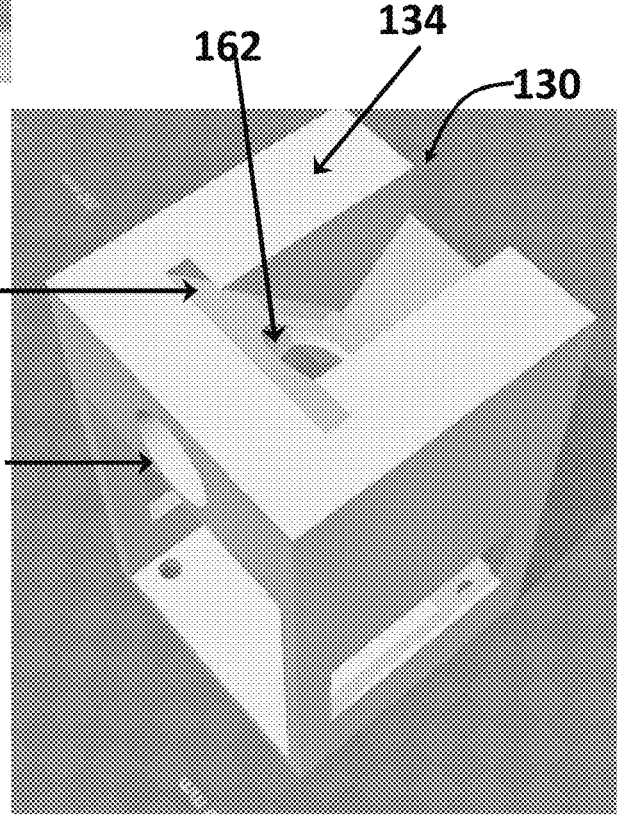
FIG. 28B is top perspective view of the housing of FIG. 28A.
Figure 28C:
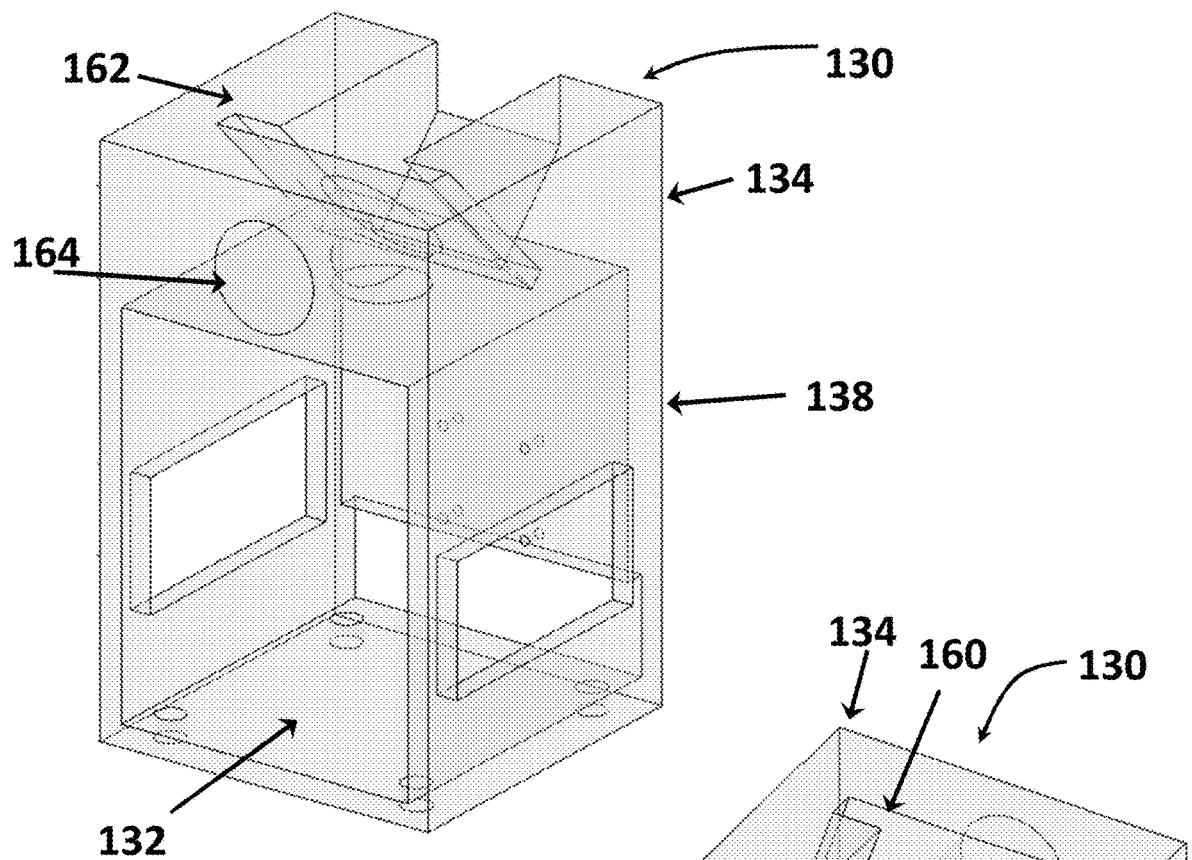
FIG. 28C is a perspective view from the front and side of the housing of FIG. 28A.
Figure 28D:
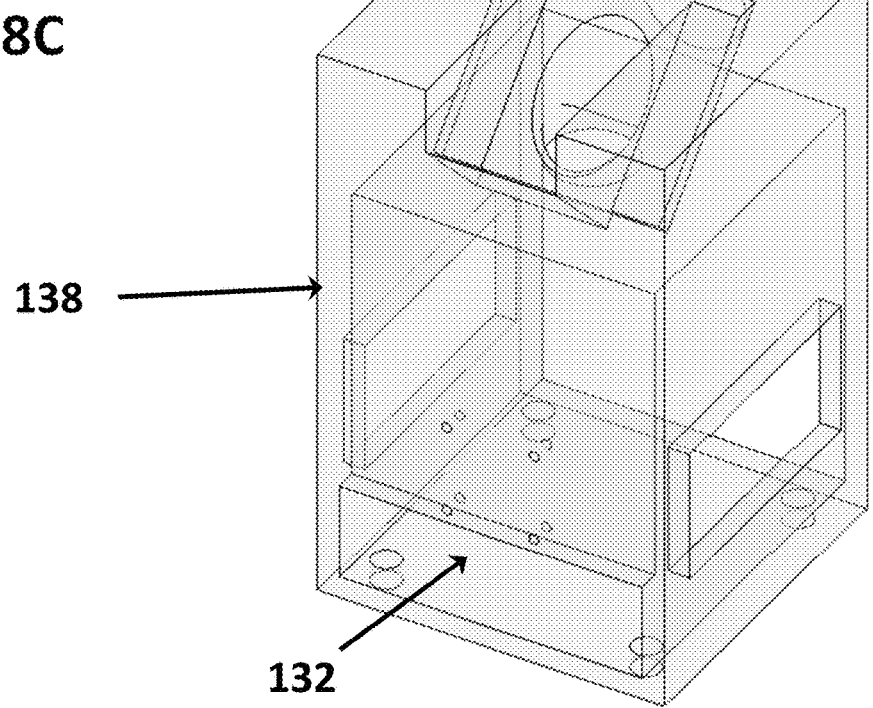
FIG. 28D is a perspective view from the top and back of the housing of FIG. 28A.

FIG. 27 depicts another embodiment of a portable common path shearing interferometry based holographic imaging system 104. System 104 has some similarities with system 100 and system 102 described above, however, it includes fewer components as compared to system 100 and system 102, and may exhibit more robust temporal stability.

In system 104, the orientation of the shear plate holding portion 134 of the housing is reversed with respect to that of system 100 and 102 so that the imaging device 120 is mounted to the front of the system.

In system 104, the sidewall portion 138 of the housing, the bottom portion 132 of the housing and the shear plate holding portion 143 of the housing are all formed in one unitary piece, instead of being multiple components that are attached to each other. By forming these portions of the housing in one unitary piece, vibrations between different portions of the housing may be reduced, thereby increasing the temporal stability of the system 104. FIGS. 28A-28D depict different views of the housing 130 of system 104. In this embodiment, the back wall of the housing has four holes 144a-144d for mounting the translation stage 168, which translates the sample holder, to the housing 130. Further, the opening 163 of the first channel 162 in the shear plate holding portion 134 of the housing is sized and configured for mounting the microscope objective.

Figure 29A:
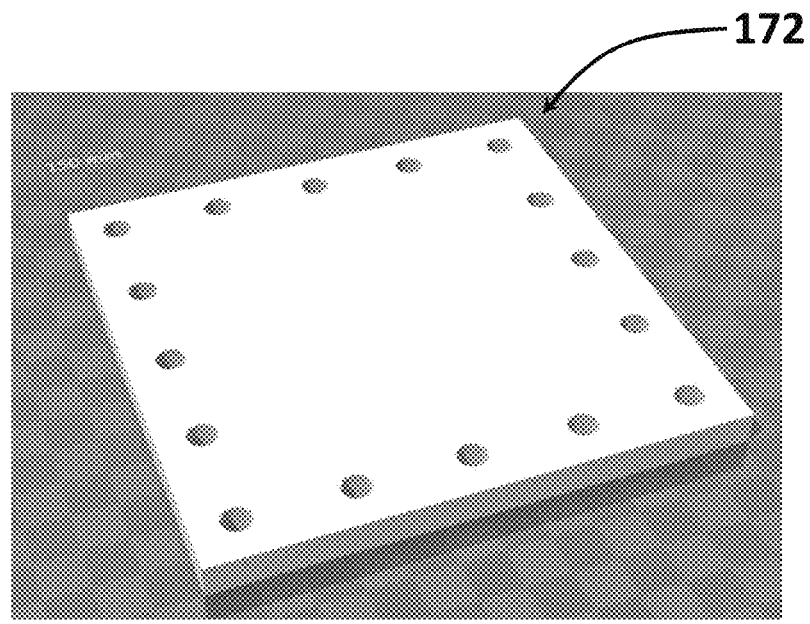
FIG. 29A is a perspective view of a base plate for the system of FIG. 27.
Figure 29B:
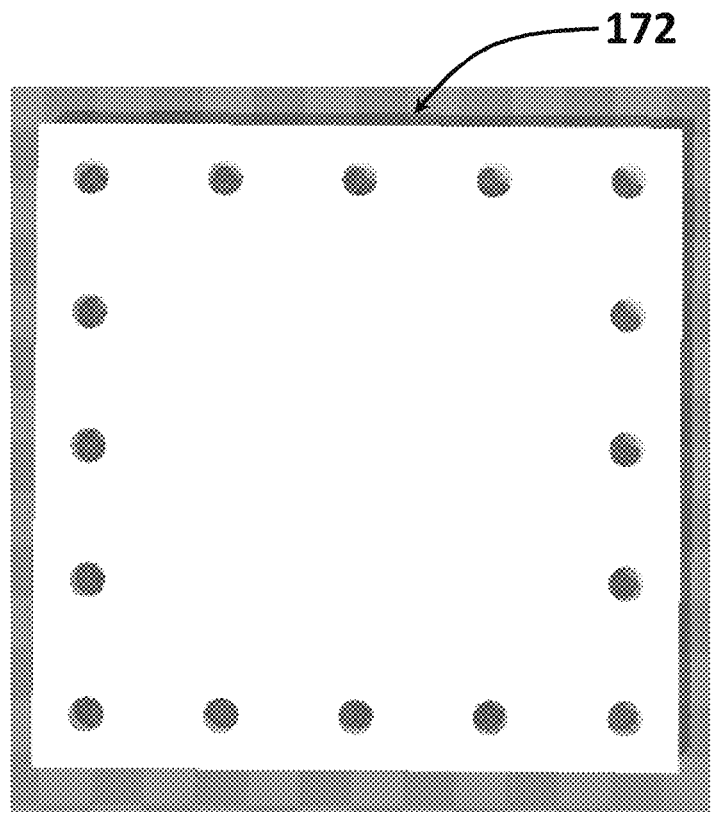
FIG. 29B is a top view of the base plate of FIG. 29A.

In system 194, the housing 130 is attached to a base plate 172, which may be 3D printed, molded or formed in any other suitable manner. In some embodiments, the housing 130 is glued or bonded to the base plate 172. In some embodiments, the housing 130 is attached to the base plate using screws or using any other suitable mechanism. In some embodiments, the housing 130 and base plate 172 may be formed together in one unitary piece. FIGS. 29A and 29B depict the base plate 172.

Figure 30A:
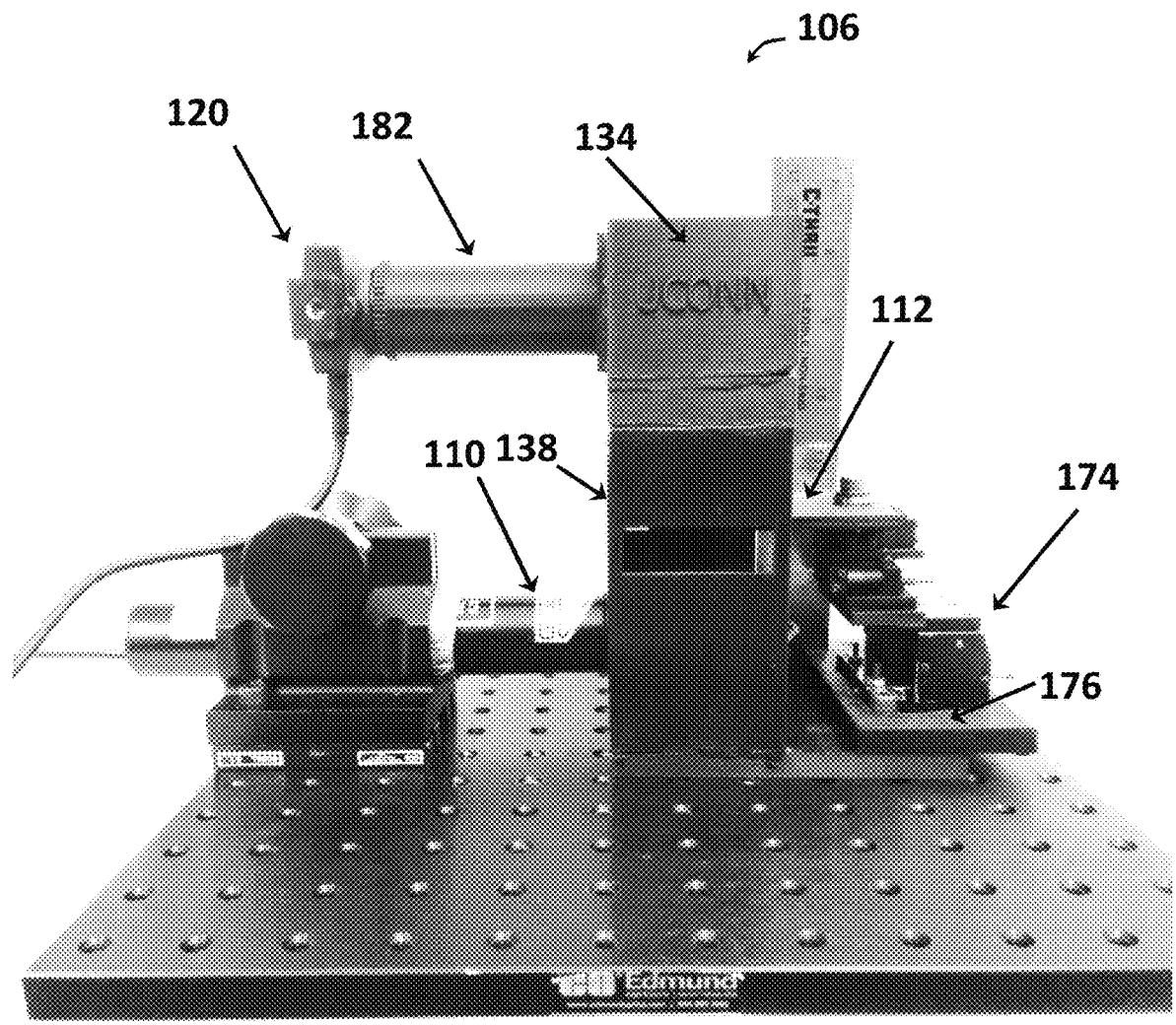
FIG. 30A is a perspective view of a portable common path shearing interferometry-based holographic microscopy system in accordance with some embodiments.
Figure 30B:
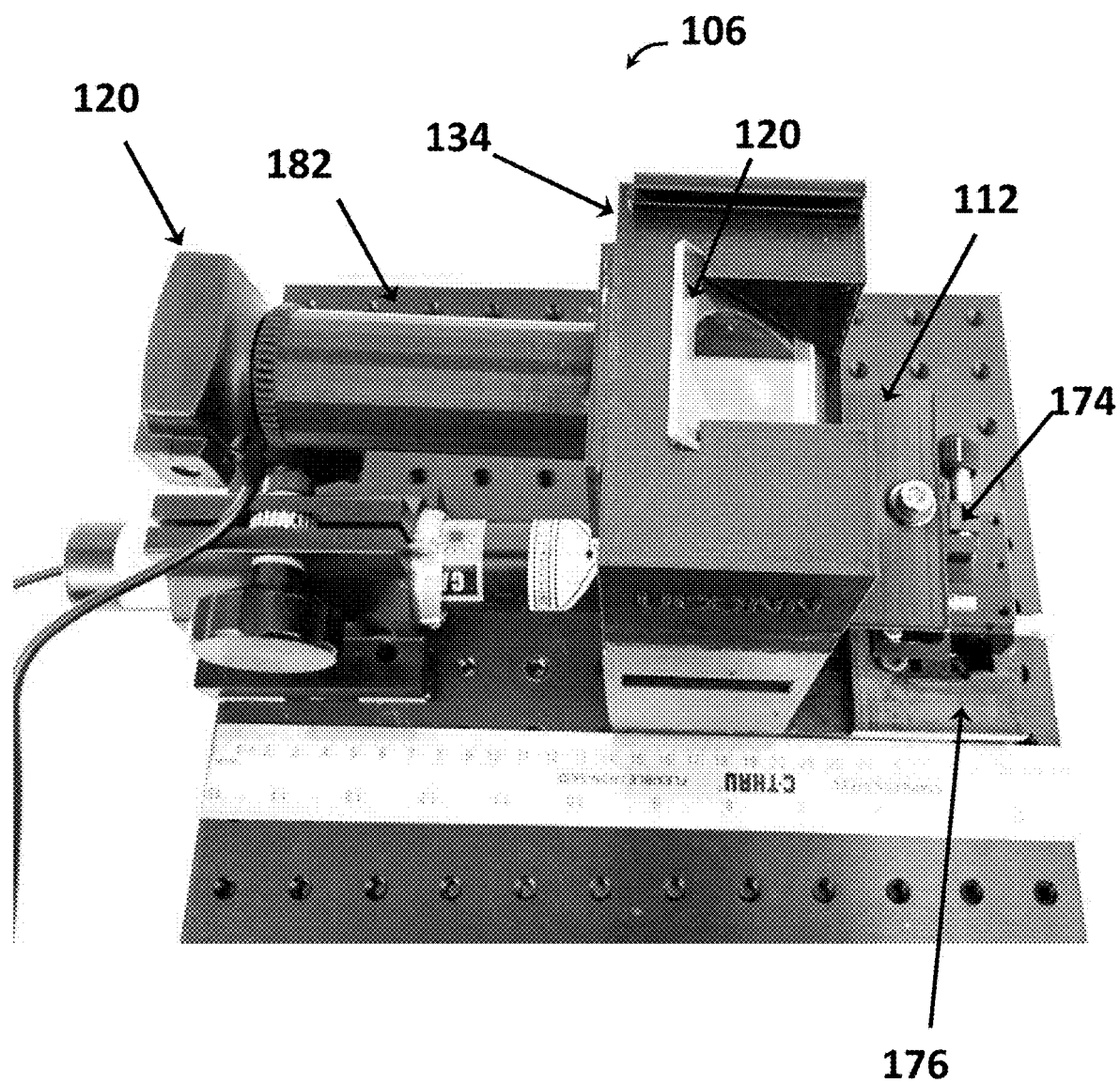
FIG. 30B is a top perspective view of the system of FIG. 30A.
Figure 32A:
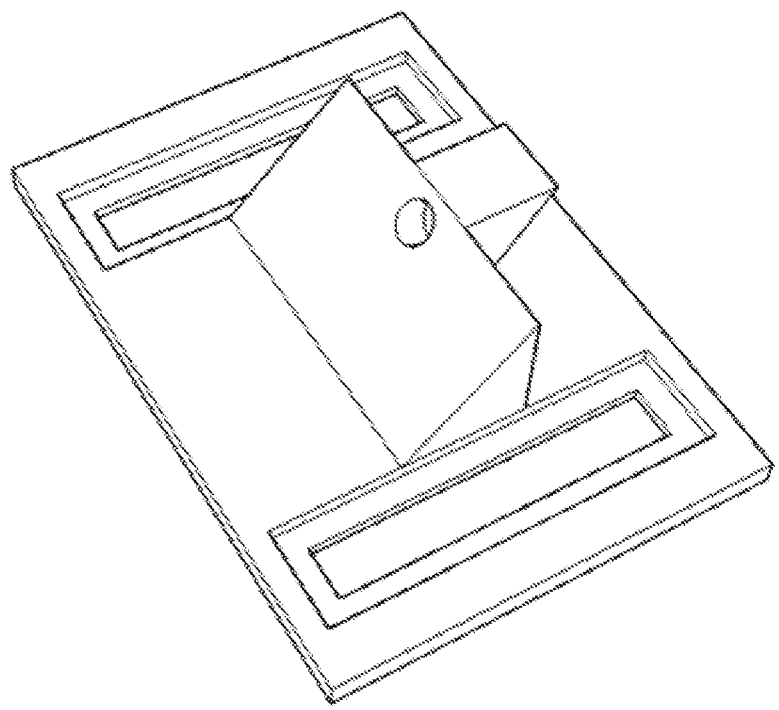
FIG. 32A is a perspective view of a 45 degree mount of the system of FIG. 30A.
Figure 32B:
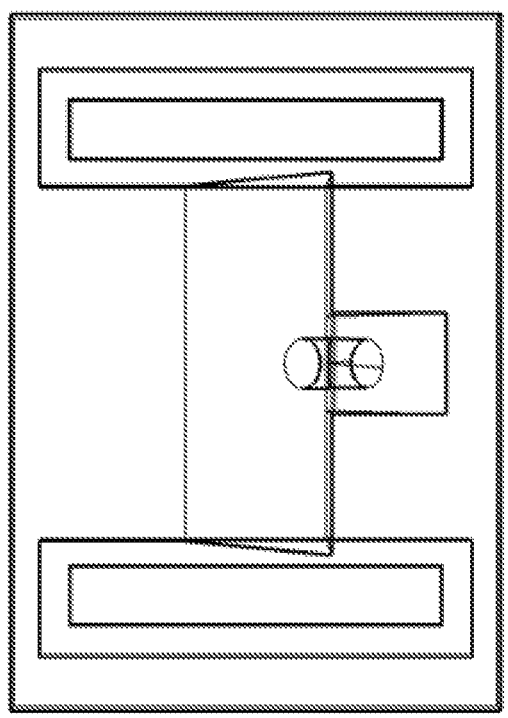
FIG. 32B is a top perspective view of the 45 degree mount of FIG. 32A.
Figure 33A:
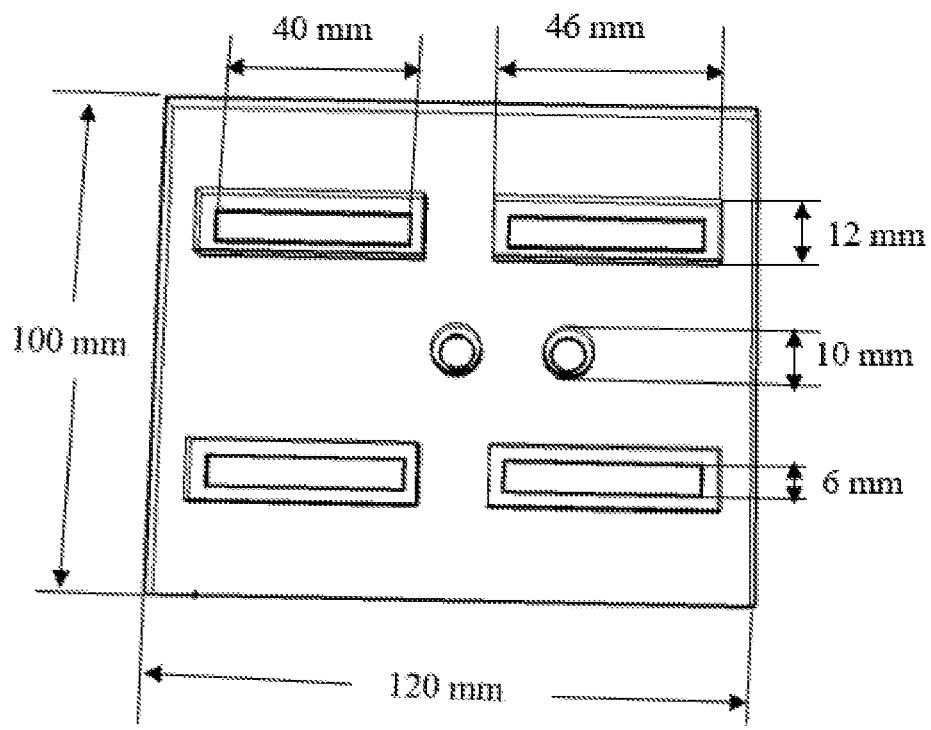
FIG. 33A is a top view of a base plate for the system of FIG. 30A.
Figure 33B:
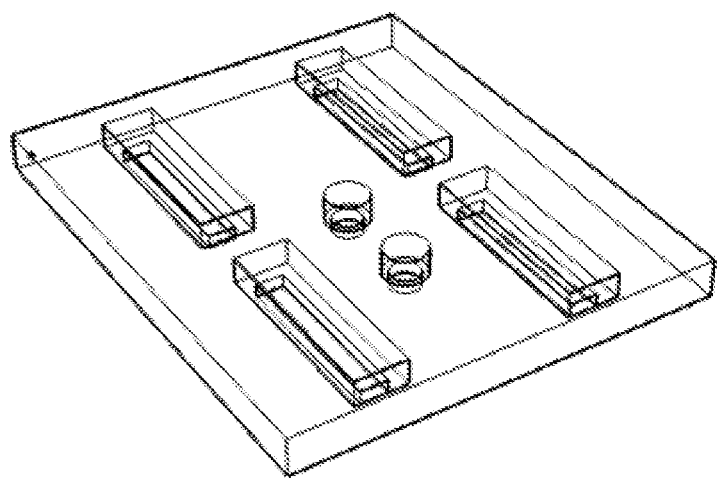
FIG. 33B is a perspective view of the base plate of FIG. 33A.
Figure 34:
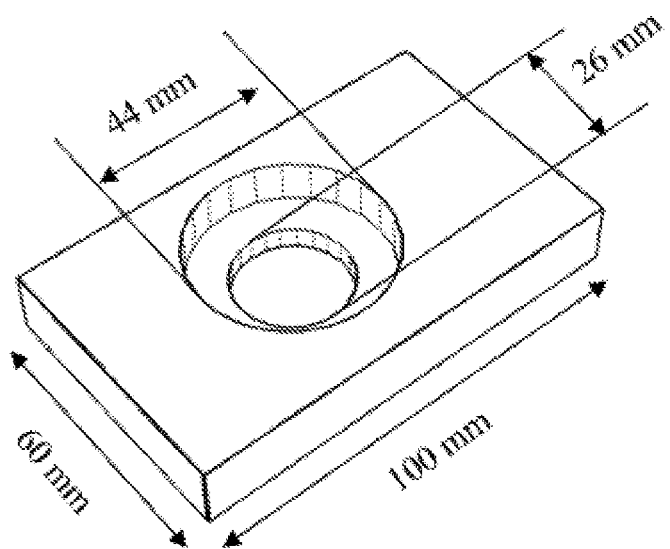
FIG. 34 is a perspective view of a top plate of the housing of the system of FIG. 30A that accommodates the microscope objective.

FIGS. 30A-30B depict another embodiment of a portable common path shearing interferometry based holographic imaging system 106. System 106, which incorporates a laser source as opposed to a laser diode source for the laser light source 120, cannot be made as compact as systems 100, 102 and 104; however, the laser source exhibits better temporal beam stability than a laser diode light source, which can improve the overall temporal stability of the system. The system 106 includes a housing 130 with a sidewall portion 138 and a shear plate holding portion 134 that are attached to each other. The housing 130 includes a top 180 of the sidewall portion that is configured to hold the microscope objective (see FIG. 34). The sample holder 112 is not mounted to the sidewall of the housing like in the systems 100, 102, 104. Instead, the sample holder 112 is mounted to a 3-axis stage 174, which is mounted to a base plate 176 (see FIGS. 32A and 32B). Below the sample holder 112, a mirror on an adjustable mirror mount that is on a 45 degree mount 178 (see FIGS. 32A and 32B) is used to direct the beam from the laser vertically upward and toward the sample.

Figure 31A:
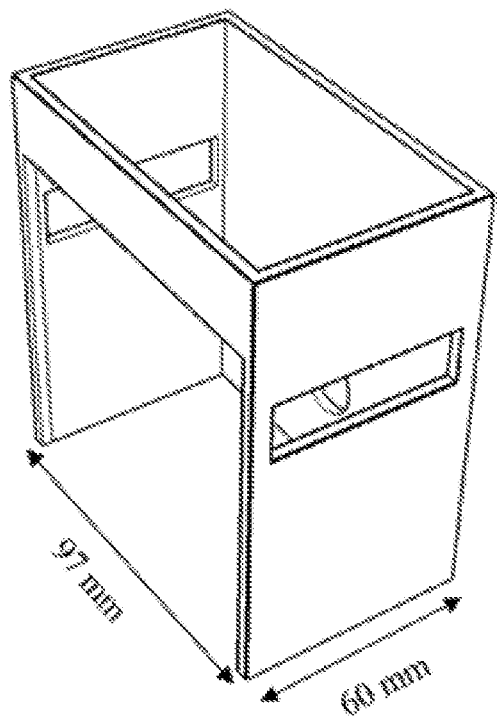
FIG. 31A is a perspective view of a sidewall portion of a housing of the system of FIG. 30A.
Figure 31B:
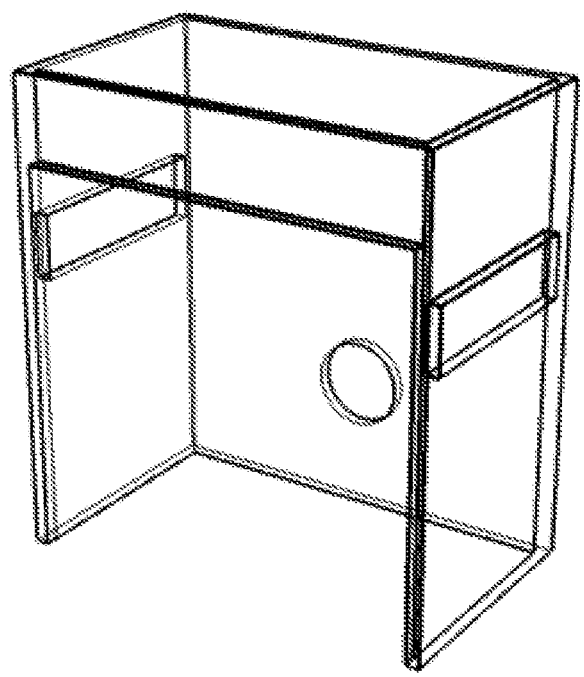
FIG. 31B is another perspective view of the sidewall portion of the housing of FIG. 30A.

FIGS. 31A and 31B depict the sidewall portion 138 of the housing 130 for system 106. The large aperture in the back side enables the laser to extend into the housing 130.

Figure 35:
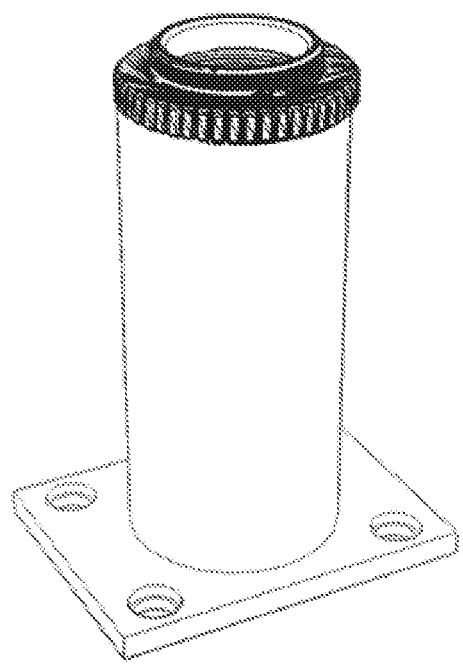
FIG. 35 is a perspective view of an adaptor of the system of FIG. 30A.

In the system 106, a relatively low magnification objective is being employed, which requires a relatively long distance between the sample and the imaging plane. In this embodiment, an adapter 182 (see FIG. 35) is employed that attaches to the housing and to which the imaging device is attached, which provides the necessary separation. In embodiments where a higher magnification objective is employed, the adapter may be shortened or omitted.

Figure 36A:
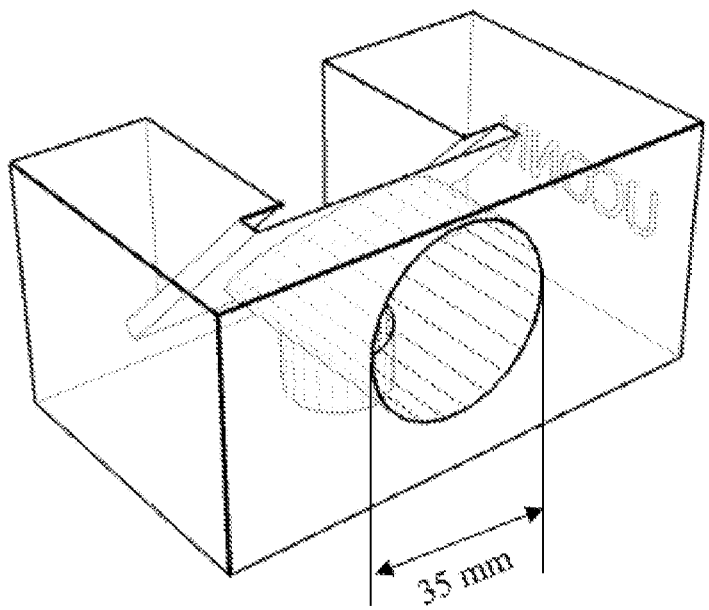
FIG. 36A is a perspective view of a shear plate holding portion of the housing of the system of FIG. 30A.
Figure 36B:
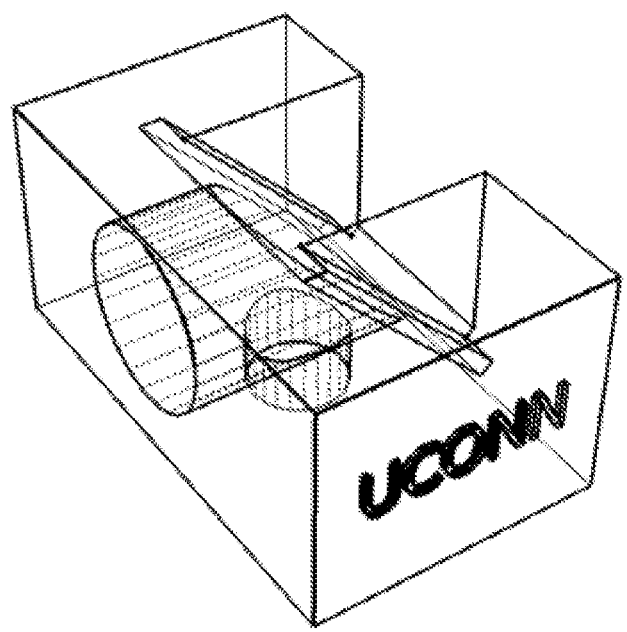
FIG. 36B is another perspective view of the shear plate holding portion of FIG. 36A.
Figure 37A:
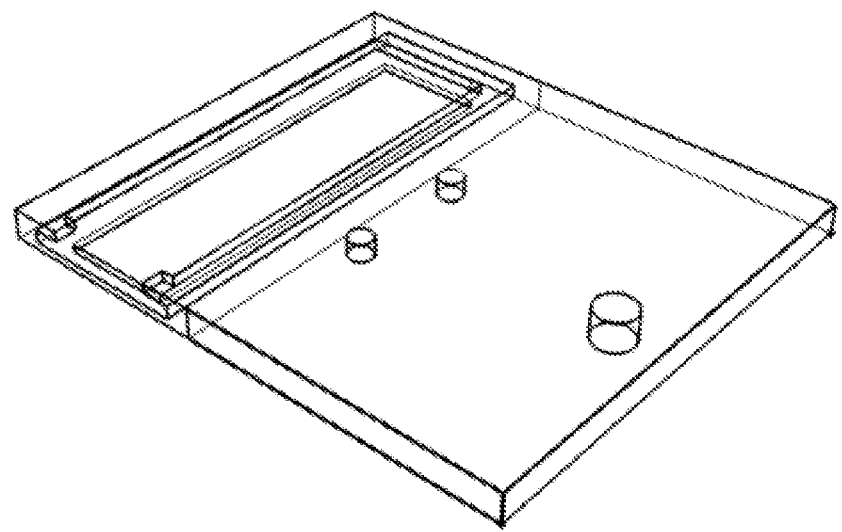
FIG. 37A is a perspective view of a sample holder for the system of FIG. 30A.
Figure 37B:
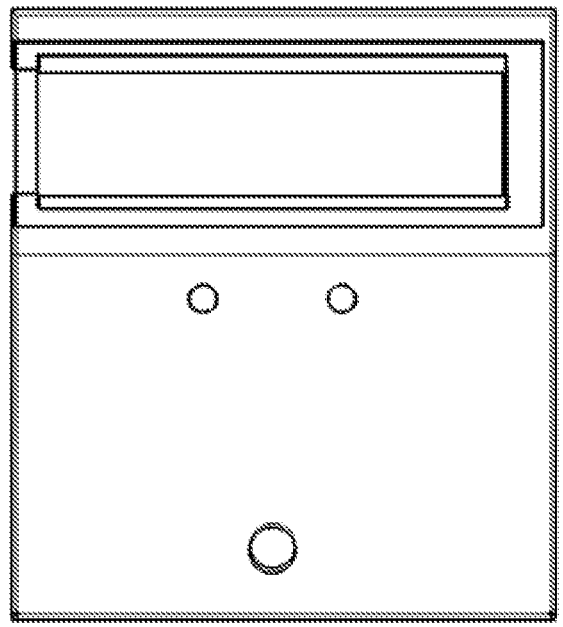
FIG. 37B is a top view of the sample holder of FIG. 37A.
Figure 38:
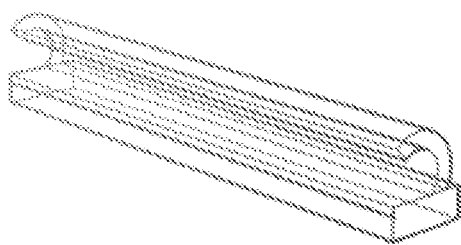
FIG. 38 is a perspective view of a wire holder for the system of FIG. 30A.

FIGS. 36A and 36B depict the shear plate holding portion of the housing 130 for system 106. FIGS. 37A and 37B depict the sample holder 112 for system 106. FIG. 38 depicts a wire holder 184 that may be attached to a portion of the housing to secure the cord and prevent it from moving.

In some embodiments, the system 100, 102, 104, 106 includes or is in communication with a computing device or a computing system. The computing device or computing system is configured for generating an image reconstruction and/or a 3D reconstruction of the sample based on the hologram data acquired by the imaging device. Example computing devices and computing systems are described below with respect to FIGS. 41-43.

In some embodiments, holograms instead of shearograms are formed at the detector. This is achieved by introducing shear much larger than the magnified object image so that the images from the front and back surface of the shear plate are spatially separated. Portions of the wavefront (reflected from the front or back surface of the shear plate) unmodulated by the object information act as the reference wavefront and interfere with portions of the wavefront (reflected from the back or front surface of the shear plate) modulated by the object, which acts as the object wavefront. If the shear amount is larger than the sensor dimension, the second image (either due to reflection from the front or back surface) falls outside the sensor area. If the sensor dimension is more than the shear amount, redundant information about the object is recorded. In some embodiments, the full numerical aperture (NA) of the magnifying lens is utilized in the formation of the holograms. As a result, in these embodiments, full spectral information can be used in the image reconstructions, and only the NA of the imaging lens limits the imaging.

In the reconstruction, the size of the filter window of the Fourier transformed holograms should be limited due to unwanted sidebands. These sidebands may appear because of the non-uniform intensity variation at the detector plane, leading to a change in the contrast of the interference fringes. Another reason may be intensity image saturation leading to a non-sinusoidal fringe pattern. In addition, the size of the filter window determines the maximum spatial frequency available in the reconstructed images. For imaging sensors with sufficient resolution (e.g., CMOS detectors), the lateral resolution in the reconstructed images is not limited by the imaging lens, but by the size of the filter window.

The lateral shear caused by the shear plate helps to achieve off-axis geometry, which enhances the reconstructions and simplifies the processing to reconstruct the digital holograms, which is typically not possible in in-line DHMIC setups such as Gabor holography. Moreover, the carrier fringe frequency of the interferogram should not exceed the Nyquist frequency of the sensor, as the carrier fringe frequency is related to the off-axis angle caused by the lateral shear generated by the glass plate. This means the fringe frequency is a function of the thickness of the shear plate. Thus, a thicker shear plate can be used to increase the off-axis angle. The fringe frequency is $f_s = S/r\lambda$, where S denotes the lateral shift induced by the shear plate, $\lambda$ is the wavelength of light source, and r is the radius of curvature of the wavefront. Moreover, the relationship between shift (S), shear plate thickness (t), incidence angle on shear plate ($\beta$), and refractive index of material of the shear plate (n) is given as follows: $S/t = \sin(2\beta)(n^2 - \sin\beta)^{-1/2}$. To have more control over the off-axis angle, a wedge plate can be used as the shear plate.

Two holograms can be recorded: one with an object and background ($H_O$), and another with background only ($H_R$). The Fourier transform of each hologram is taken, filtered (digital filtering of the real part of spectrum in Fourier domain), and then inverse Fourier transformed, generating the phase map for the respective digital hologram. The same filter window with the same dimensions is applied to filter the spectrums of both $H_O$ and $H_R$. This process results in two phase maps, one corresponding to the object and background ($\Delta\phi_O$) and the other to the background only ($\Delta\phi_R$). To obtain the phase map information due to the object only ($\Delta\phi$), the phase map of the object and background is subtracted from the phase map with background only ($\Delta\phi = \Delta\phi_R - \Delta\phi_O$); this process also removes most of the system-related aberrations.

The phase difference due to the object only ($\Delta\phi$) is then unwrapped using the Goldstein's branch cut method. After phase unwrapping ($\Delta\phi_{Un}$), the cell height/thickness, $\Delta h$, can be determined, using the following equation:

$$\Delta h = \Delta\phi_{Un} \frac{\lambda}{2\pi} \cdot \frac{1}{\Delta n}$$

where $\Delta\phi_{Un}$ is the unwrapped phase difference, $\lambda$ is the source wavelength, and $\Delta n$ is the refractive index difference between the object and the surroundings used for the reconstruction process.

In some embodiments, a computing device or computing system may be programmed to determine features of a cell, a cell-like object, or a microorganism in a reconstructed image. These features can include some or all of, but are not limited to: a mean physical cell thickness value ($\bar{h}$) for the cell/microorganism in the image; a standard deviation of optical thickness ($\sigma_O$) for the cell/microorganism; a coefficient of variation (COV) for the thickness of the cell/microorganism; a projected area ($A_P$) of the cell/microorganism; an optical volume ($V_O$) of the cell/microorganism; a thickness skewness value for the cell/microorganism, where the thickness skewness measures the lack of symmetry of the cell/microorganism thickness values from the mean thickness value; a ratio of the projected area to the optical volume ($R_{p\_a}$) for the cell/microorganism; a thickness kurtosis value that describes the sharpness of the thickness distribution for the cell/microorganism; and a dry mass (M) of the cell/microorganism.

The mean physical cell thickness is the mean value of optical thickness for a microorganism/cell and can be calculated using the following equations:

$$OPL = [n_c(x, y) - n_m(x, y)]h(x, y) = \Delta n(x, y) \cdot h(x, y) \Rightarrow$$

$$h(x, y) = h_i = \frac{\lambda \cdot \Delta\phi}{2\pi \Delta n} \Rightarrow \bar{h} = \frac{1}{N}\left(\sum_{i=1}^{N} h_i\right),$$

where $i = 1, 2, 3, \ldots N^{th}$ pixel where $n_c(y)$ is the refractive index of the cell, $n_m(x, y)$ is the refractive index of the surrounding medium and $h(x, y)$ is the thickness of the cell of a pixel location $(x, y)$, and where $n_c(x, y)$ satisfies the following equation:

$$n_c(x, y) = \frac{1}{h}\int_0^h n_c(x, y, z)dz$$

The coefficient of variation (COV) in thickness is the standard deviation of optical thickness for a microorganism/cell divided by the mean thickness. The standard deviation of optical thickness can be calculated using the following equation:

$$\sigma_0 = \sqrt{\frac{1}{N-1}\sum_{i=1}^{N}(h_i - \bar{h})^2}$$

where N is the total number of pixels containing the cell, k are the cell thickness values and $\bar{h}$ is the mean cell thickness. The COV can be calculated using the following equation:

$$COV = \frac{\sigma_0}{\bar{h}}$$

The optical volume ($V_0$) is obtained by multiplying the area of each pixel with the thickness value at each pixel location and integrating over the entire cell thickness profile (SP) using the following equation:

$$V_0 = \int_{SP} h(x, y) ds$$

The projected area ($A_P$) can be calculated as the product of the total number of pixels containing the cell and the area of a single pixel using the following equation:

$$A_p = N \times \left( \frac{\Delta_{Pix\_x} \times \Delta_{Pix\_y}}{(\text{Optical Magnification})^2} \right)$$

where N is the total number of pixels that contain the cell, and $\Delta_{Pix\_x}$ and $\Delta_{Pix\_y}$ are the pixel sizes in the x direction and the y direction, respectively, for a single pixel of the sensor. The projected area also depends upon the optical magnification of the objective lens.

The cell thickness skewness measures the lack of symmetry of the cell thickness values from the mean cell thickness value and can be calculated using the following equation:

$$\text{skewness} = \sum_{i=1}^{N} \frac{(h_i - \bar{h})^3}{\sigma_0^3}$$

The ratio of the projected area to the optical volume ($R_{p\_a}$) and can be calculated using the following equation:

$$R_{p\_a} = \frac{A_p}{V_0}$$

Cell thickness kurtosis describes the sharpness of the thickness distribution. It measures whether the cell thickness distribution is more peaked or flatter and can be calculated using the following equation:

$$\text{Kurtosis} = \sum_{i=1}^{N} \frac{(h_i - \bar{h})^4}{\sigma_0^4}$$

The cell thickness is directly proportional to the dry mass (M) of the cell, which quantifies the mass of the non-aqueous material of the cell. That is, total mass of substances other than water in the cell is known as the dry mass (M) and can be calculated using the following equation:

$$M = \frac{10\lambda}{2\pi\alpha} \int_{A_p} \Delta n(x, y) ds$$

where is the refractive increment a, which can be approximated by 0.0018-0.0021 m/Kg when considering a mixture of all the components of a typical cell, $A_p$ is the projected area of the cell, and $\lambda$ is the wavelength.

Figure 41:
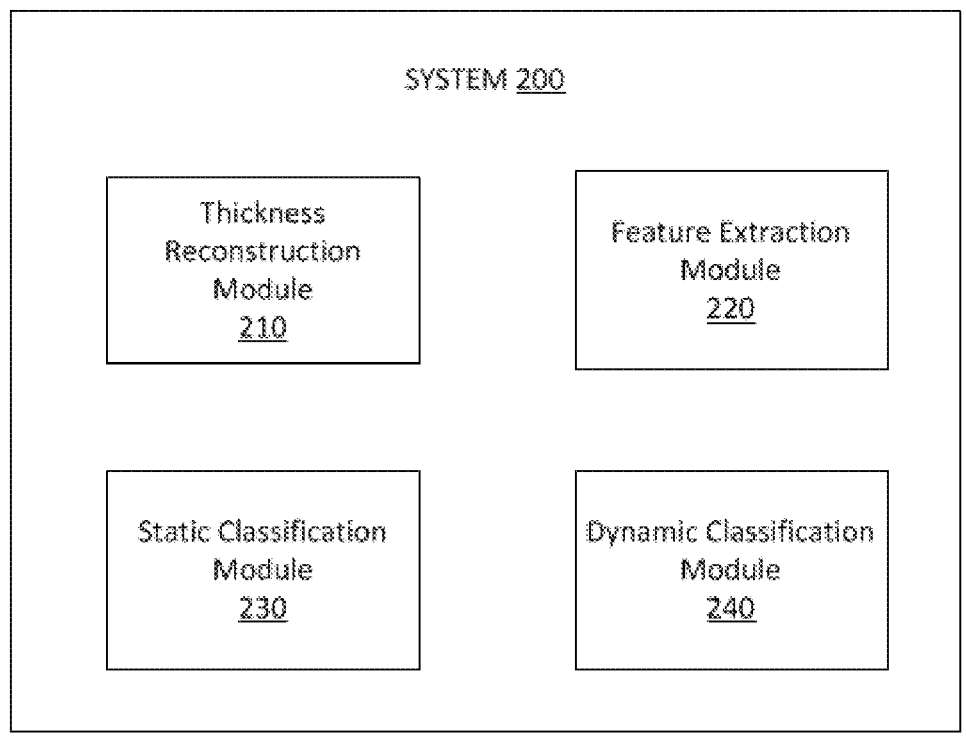
FIG. 41 is a block diagram showing an exemplary system for processing and analyzing hologram data, according to an example embodiment.

In some embodiments, these features may be calculated by a feature extraction module 220, which is described below with respect to FIG. 41. The features extraction module 220 may be executing on a computing device associated with an imaging device, or may be provided remotely via a network.

In some embodiments, a system 200 is used to analyze data from the shearing interferometry-based microscope system 100. FIG. 41 is a block diagram showing a system 200 in terms of modules for analyzing the hologram data. The modules include one or more of a thickness reconstruction module 210, a feature extraction module 220, a static classification module 230, and a dynamic classification module 240. The modules may include various circuits, circuitry and one or more software components, programs, applications, or other units of code base or instructions configured to be executed by one or more processors (e.g., processors included in a device 510 or a device 520 shown in FIG. 42). In an example embodiment, one or more of modules 210, 220, 230, and 249 are included in a device (e.g., device 510 or device 520 shown in FIG. 42). In another embodiment, one or more of the modules 210, 220, 230, 240 may be provided remotely by a server through a network. Although modules 210, 220, 230 and 240 are shown as distinct modules in FIG. 41, it should be understood that modules 210, 220, 230 and 234 may be implemented as fewer or more modules than illustrated. It should be understood that one or more of modules 210, 220, 230, and 240 may communicate with one or more components included in exemplary embodiments of the present disclosure (e.g., computing device 510, imaging device 515, computing device 520, server 530, or database(s) 540 of system 500 shown in FIG. 42).

The reconstruction module 210 may be a software implemented or hardware implemented module configured to reconstruct a thickness profile map from hologram data. The feature extraction module 220 may be a software implemented or hardware implemented module configured to extract features regarding cells or microorganisms from the sample data. The static classification module 230 may be a software implemented or hardware implemented module configured to classify cells or microorganisms in a sample in an automated fashion based on static data measurements. The dynamic classification module 240 may be a software implemented or hardware implemented module configured to classify cells or microorganisms in a sample in an automated fashion based on time evolving features of the cells or microorganisms. In some embodiments, aspects of the method are implemented on a computing device associated with the shearing digital holographic microscopy system, which is described in FIG. 43. In some embodiments, some aspects of the method are implemented on a computing device associated with the shearing digital holographic microscope system and other aspects are implemented remotely (e.g., on a server remote from the shearing digital holographic microscope system).

Figure 42:
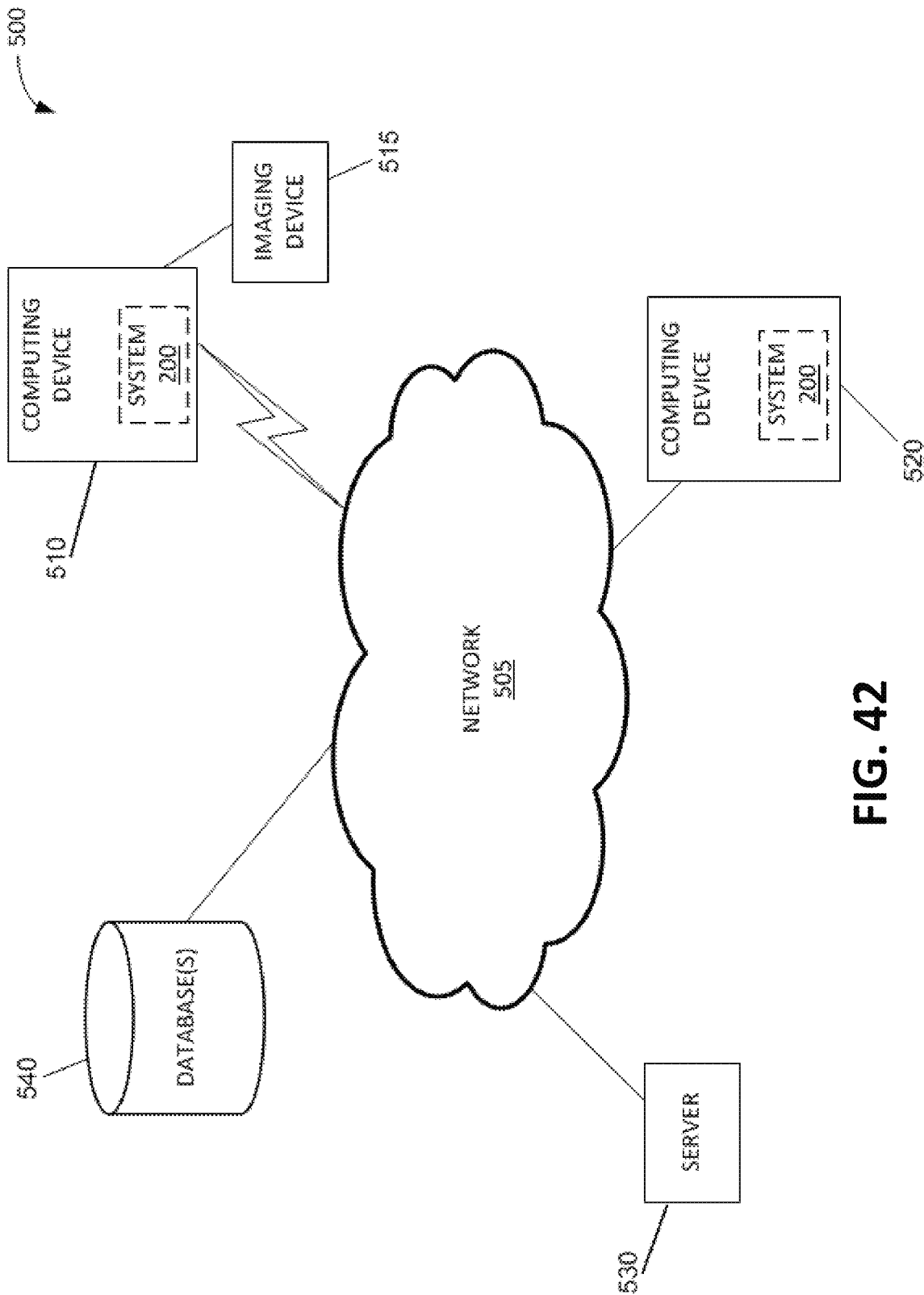
FIG. 42 is a diagram of an exemplary network environment suitable for a distributed implementation of exemplary embodiments for processing and analyzing hologram data.

FIG. 42 illustrates a network diagram depicting a system 500 for implementing some methods described herein, according to an example embodiment. The system 500 can include a network 505, multiple devices (e.g., a computing device 510, a computing device 520, an imaging device 515, and imaging device 525), a server 530, and database(s) 540. Each of the computing device 510, computing device 520, server 530, and database(s) 540 may be in communication with the network 505. In some embodiments, the computing device 510 is in wired or wireless communication with the imaging device 515. Although imaging device 515 is shown as connected to the network 505 through computing device 510, additionally or alternatively, imaging device 515 may connect to the network directly.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The computing device 510 may include, but is not limited to, work stations, computers, general purpose computers, a data center (a large group of networked computer servers), Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The computing device 510 can include one or more components described in relation to computing device 600 shown in FIG. 43.

Similarly, the computing device 520 may include, but is not limited to, work stations, computers, general purpose computers, a data center (a large group of networked computer servers), Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The computing device 520 can include one or more components described in relation to computing device 600 shown in FIG. 43.

The devices 510, 520 may connect to network 505 via a wired or wireless connection. The device 510, 520 may include one or more applications or systems such as, but not limited to, a web browser, and the like. In an example embodiment, the computing device 520 may perform some of the functionalities described herein.

Each of the database(s) 540 and server 530 is connected to the network 505 via a wired or wireless connection. The server 530 may include one or more computers or processors configured to communicate with the devices 510, 520 via network 505. In some embodiments, the server 530 hosts one or more applications accessed by the devices 510, 520 and/or facilitates access to the content of database(s) 540. Database(s) 540 may include one or more storage devices for storing data and/or instructions (or code) for use by the server 530, and/or devices 510, 520. Database(s) 540 and server 530 may be located at one or more geographically distributed locations from each other or from devices 510, 520. Alternatively, database(s) 540 may be included within server 530.

Figure 43:
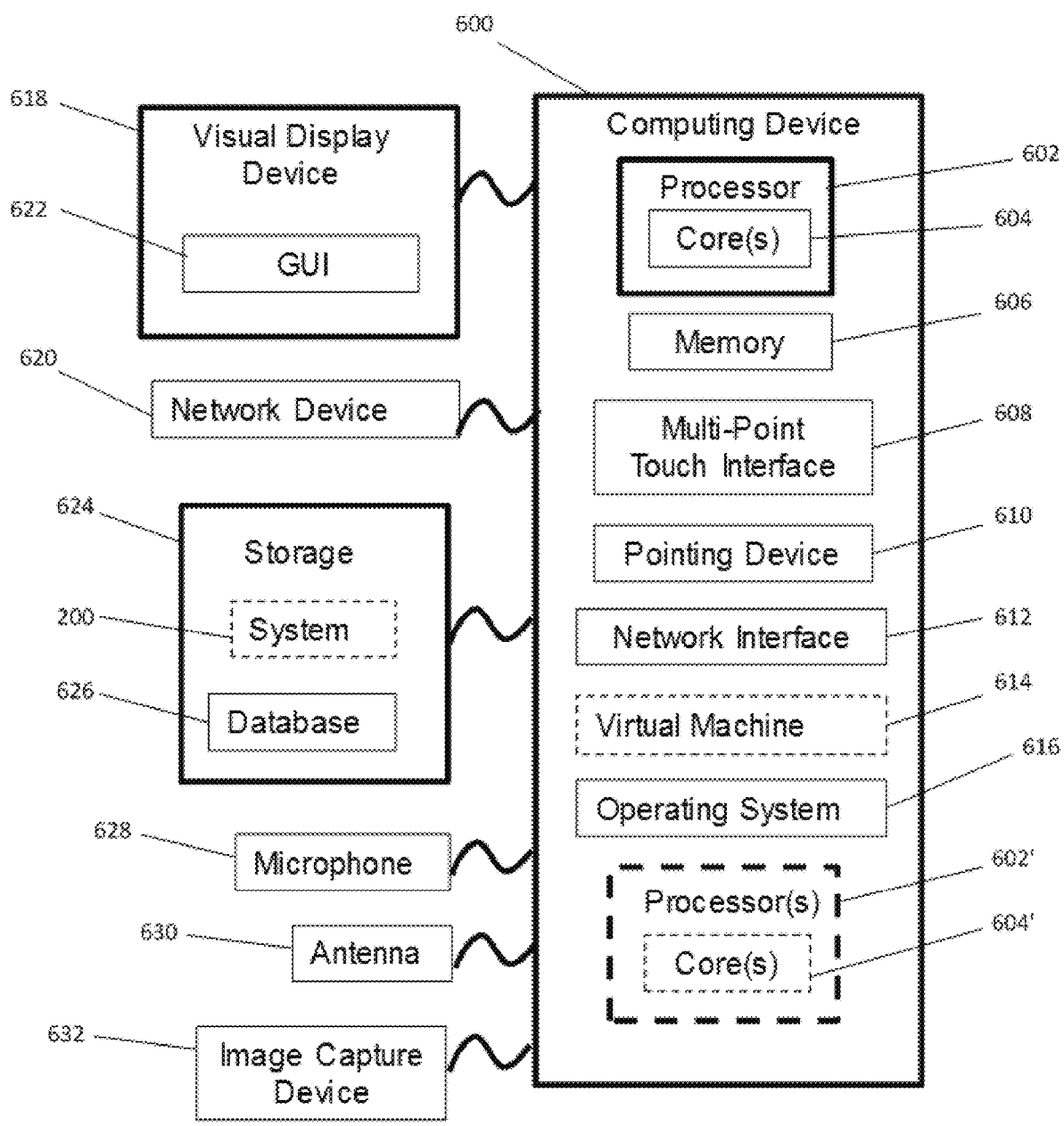
FIG. 43 is a block diagram of an exemplary computing device that may be used with exemplary optical systems to implement exemplary embodiments described herein.

FIG. 43 is a block diagram of an exemplary computing device 600 that can be used to perform the methods provided by exemplary embodiments. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof.

A user can interact with the computing device 600 through a visual display device 618, such as a touch screen display or computer monitor, which can display one or more user interfaces 619 that can be provided in accordance with exemplary embodiments. The visual display device 618 can also display other aspects, elements and/or information or data associated with exemplary embodiments. The computing device 600 can include other I/O devices for receiving input from a user, for example, a keyboard or other suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

In some embodiments, the computing device is in communication with an imaging device 515 or an image capture device 632. In other embodiments, the imaging device is incorporated into the computing device (e.g., a mobile phone with a camera).

The computing device 600 can also include one or more storage devices 624, such as a hard-drive, CD-ROM, or other computer readable media, for storing data and computer-readable instructions and/or software, such as the system 200 that implements exemplary embodiments of the authentication system described herein, or portions thereof, which can be executed to generate user interface 619 on display 618. Exemplary storage device 624 can also store one or more databases for storing suitable information required to implement exemplary embodiments. Exemplary storage device 624 can store one or more databases 626 for storing data used to implement exemplary embodiments of the systems and methods described herein.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of the above. The network interface 612 can include a built-in network adapter, network interface card, PCMCIA network card, card bus network adapter, wireless network adapter, USB network adapter, modem or another device suitable for interfacing the computing device 600 to a type of network capable of communication and performing the operations described herein. Moreover, the computing device 600 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run operating systems 616, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or another operating system capable of running on the computing device and performing the operations described herein. In exemplary embodiments, the operating system 616 can be run in native mode or emulated mode. In an exemplary embodiment, the operating system 616 can be run on one or more cloud machine instances.

Example 4

A first example system was built in accordance with system 106 depicted in FIGS. 30A-38. This example system included a HeNe laser (λ=633 nm) and was mounted on an optical breadboard. The system weighed 4.62 kg with the HeNe laser and breadboard and weighted 800 g without the HeNe laser and breadboard. The lateral dimensions of the first example system were 304 mm by 304 mm with a height of 170 mm. The first example system was used with two different imaging devices, the first was a CMOS sensor and the second was a cell phone camera.

The CMOS sensor was an 8 bit, 5.2 μm pixel pitch, model DCC1545M from Thorlabs, which has a large dynamic range and a 10-bit internal analog-to-digital conversion, but it transfers images to the PC with a bit depth of 8 bits to improve the readout time of the camera. For the cell phone sensor setup, a Google Nexus 5, which has an 8 MP primary camera, 1/3.2" sensor size, and 1.4 μm pixel size, was used. Moreover, the cell phone camera used 8 bits/channel. When comparing the camera sensor with the cell phone sensor, the dynamic range of the cell phone sensor may be lower due to the small sensor and pixel size, as the pixel wells fill quicker due to low saturation capacity. Moreover, the cell phone sensor had a Bayer filter for color detection. Finally, the cell phone camera sensor had a lower SNR than the CMOS camera. One reason is that the images generated from the cell phone camera were in the JPEG format, which is a lossy compression scheme resulting in a poorer image quality. The CMOS camera can save images as .bmp, which does not compress the images.

It is important to calculate the camera parameters. ImageJ (a public domain software: https://imagej.nih.gov/ij/) was used to establish an equivalence between the pixel covered by the object (also taking optical magnification into account) and the distance in microns for the cell phone sensor and CMOS. FIGS. 2A-2B show the equivalence between the pixels and the distance in microns.

The test object used in FIGS. 2A-2B was a 20-μm glass bead (SPI supplies). The other beads observed in FIGS. 2A-2B (solid yellow boxes around the objects) were the sheared copies of the same objects. Moreover, the field of view (FOV) of the DH microscope can depend on the objective and eyepiece lens used. A higher magnification objective gives a smaller FOV, as the sensor must image a more magnified object in comparison to a lower magnification lens; hence, a relatively smaller, magnified specimen region can be imaged on the sensor. For this example, a 40× objective lenses with a numerical aperture (NA) of 0.65 was used with the CMOS sensor. The actual magnification depends on the placement of the camera sensor from the objective. The theoretically achievable lateral resolution with this objective is 0.595 μm. To use the cell phone with the first example system 106, the CMOS was replaced with the eyepiece and the cell phone. A cell phone adapter was 3D printed to hold the camera and eyepiece in place. The eyepiece used with the cell phone setup had a magnification of 25×. Table 1 summarizes the parameter values for the CMOS and the cell phone sensor.

A second example system was built in accordance with system 100 described above with respect to FIGS. 19A-19F. The second example system was more compact and lighter than the first example system. This second example system used a laser diode light source (Thorlabs, CPS 635) with a wavelength of 635 nm and an elliptical beam profile in place of the HeNe laser. The second example system had lateral dimensions of 75 mm by 95 mm and was 200 mm tall. The second example system weighed 910 g (without the base) and 1.356 kg (with the base).

The computed lateral resolution of the first example system, taking into consideration the filter window size, was approximately 1.2 um. The computed lateral resolution of the second, more compact, example system was 0.9 um. For the example systems a 3-5 mm thick glass plate was using for the shear plate, which enabled spatial filtering of the spectrum and satisfied the Nyquist criteria for sampling.

Imaging Test Microspheres and Cells for the First Example System Using HeNe Laser:

Glass microspheres with a mean diameter of 19.9 plus/minus 1.4 μm and average refractive index $n_o$=1.56 were used test the performance of the first example system when used with the CMOS camera. The microspheres were immersed in oil (average refractive index, $n_m$=1.518) and then spread on a thin microscopic glass slide and covered with a thin coverslip. The digital holograms were recorded, and the 3D profiles were reconstructed as described above. FIGS. 6A-6E show the results of the reconstruction.

FIG. 6A is the digital hologram of a 20-μm glass bead, acquired using the CMOS sensor. FIG. 6B shows the unwrapped phase profile of the bead. FIG. 6C shows the height variations, as depicted by color maps, and FIG. 6D is the one-dimensional cross-sectional profile, along the line (see FIG. 6C). FIG. 6E shows the pseudocolor 3D rendering of the thickness profile for the same bead. The thickness/diameter was measured for 50 20-μm glass microspheres, and the mean diameter for the microspheres was measured to be 17.38 plus/minus 1.38 μm, which was close to the thickness value specified by the manufacturer.

The experiments were repeated for biological cells, including Diatom-Tabellaria ($n_m$=1.50) and *E. coli* bacteria ($n_m$=1.35). Both cell types were immersed in deionized water ($n_m$=1.33). FIG. 7A shows the digital hologram of the Diatom-Tabellaria cells. FIG. 7B shows the height variations depicted by color maps, FIG. 7C shows the 1D cross-sectional profile of the diatom along the line, and FIG. 7D is the reconstructed 3D height profile for the diatom. Likewise, FIGS. 7E-7H are the digital hologram, the height variations depicted by color maps, the 1D cross-sectional profile along the line (see FIG. 7F), and the reconstructed 3D height profile for the *E. coli* bacteria. From FIG. 7H, one can see that the length of *E. coli* is close to 12 μm, the width is between 2-4 μm, and maximum height is 0.6 μm.

Imaging Test Microspheres and Cells for the Second Example System (Compact 3D Printed Setup Using a Laser Diode):

To show the 3D reconstruction capabilities with the second example system, which was the more compact 3D printed DH microscope system 100 shown in FIGS. 19A-19F, the 3D data was reconstructed from the holograms as described above.

FIG. 8A is the digital hologram of a 20-μm glass bead ($n_o$=1.56) immersed in oil ($n_m$=1.5181) that was acquired using the CMOS sensor for the second example system. The bead diameter (obtained experimentally) is 17.427 μm plus/minus 0.903 μm. FIG. 8B shows the unwrapped phase profile of the bead. FIG. 8C shows the height variations depicted by the color maps, and FIG. 8D is the one-dimensional cross-sectional profile along the line (see FIG. 8B). FIG. 8E shows the pseudocolor 3D rendering of the thickness profile for the same bead.

Data was also obtained from yeast cells ($n_o$=1.53) immersed in deionized water ($n_m$=1.33) using the second example system. FIG. 9A is the digital hologram of yeast cells immersed in distilled water acquired using the CMOS sensor. FIG. 9B shows the unwrapped phase profile of the cells. FIG. 9C shows the height variations depicted by color maps, and FIG. 9D is the one-dimensional cross-sectional profile, along the line (see FIG. 9C). FIG. 9E shows the pseudocolor 3D rendering of the thickness profile for the same cells.

In the reconstructions, roughness around and on the objects was observed. This roughness can be attributed to optical thickness variations. Microspheres may not be smooth. Moreover, the optical thickness variation of the object and its surroundings depends on either change in the real thickness or due to spatially changing refractive index (due to density change) in the micro-sphere and its surroundings.

The size of the roughness was approximately 1-2 μm, which became visible as the window size becomes large enough to accommodate the high spatial frequencies. One can obtain smooth reconstructions if the size of the filter window is reduced. Other possible reasons for the roughness is sample deformations and the presence of impurities.

Temporal Stability of the First Example System Using HeNe Laser:

As described above, the systems herein employ common path digital holography and exhibit a very high temporal stability in contrast to the two beam configurations such as Michelson and Mach-Zehnder interferometers, where the two beams may acquire uncorrelated phase changes due to vibrations. To determine the temporal stability of the first example system, a series of fringe patterns or movies were recorded for a glass slide without any object. For example, 9000 fringe patterns were recorded for 5 min at a frame rate of 30 Hz for a sensor area of 128×128 pixels (15.8×15.8 μm) using the "windowing" functionality of the CMOS sensor.

CMOS sensors can read out a certain region of interest (ROI) from the whole sensor area, which is known as windowing. One of the advantages of windowing is the elevated frame rates, which makes CMOS a favorable choice over CCDs to study the dynamic cell membrane fluctuations. One of the main reasons for using a small sensor area (128×128 pixels) is because processing the whole sensor area images (1280×1024 pixels) may be computationally expensive and time consuming. Path length changes were computed by comparing the reconstructed phase distribution for each frame (containing the fringe patterns) to a previously recorded reference background. It should be noted that the 3D-printed DHMIC prototype was not isolated against vibrations, that is, it was not placed on an air floating optical table. Standard deviations were computed for a total of 16,384 (128×128) pixel locations.

FIG. 10 shows the histogram of standard deviation fluctuations with a mean standard deviation of 0.24 nm. With the first example system, sub-nanometer temporal stability of the order of 0.24 nm was obtained without any vibration isolation. This can be highly beneficial in the study involving cell membrane fluctuations, which are on the order of tens of nanometers.

Thus, the first example system and the second example system can be used with common mobile devices for hologram recording. There are many advantages to using mobile devices in microscopy. For example, using the field-portable prototypes presented in the present disclosure, it is possible to record and send digital holograms to a computational device located remotely, via the internet for data analysis. This becomes important when the personnel handling the system lack the skills to process the acquired data. In addition, inexpensive laser diodes and CMOS sensors, such as webcams, can be used in the setup. Mass-producing the system can further reduce the cost.

Use of the First Example System Including a HeNe Laser to Study Red Blood Cells:

Sickle cell disease (SCD) is a life threatening condition, where a person suffering from such a disease is prone to several complications such as organ malfunction, which is caused due to deformations in the shapes (e.g., from doughnut to a sickle) of red blood cells (RBC). The first example system based on system 100 was used to image deformations in membranes of red blood cells (RBC). RBC membrane fluctuations can provide some insights into the state of a cell. The present disclosure provides a spatio-temporal analysis of cell membrane fluctuations. A video hologram of a cell was recorded and reconstructions were created for every hologram frame (time steps). Analysis of the reconstructions enabled automated classification of the cells as normal or sickle cells as described above in Example 2.

Holograms were recorded of RBC samples using the first example system. Reconstructed thickness profiles were generated from the holograms. FIG. 12A depicts three 3D reconstructed images/profiles (holograms) of healthy RBCs from different patients, while FIG. 12B depicts three 3D reconstructed images/profiles (holograms) of sickle cell diseased (SCD) RBCs from different patients.

Example 5

Several additional example systems were built and tested for temporal stability. A third example system was built in accordance with system 102 described above with respect to FIGS. 26A to 26D. The system had a length of 90 mm, a width of 85 mm and a height of 200 mm. The system had a mass of 0.87 kg.

A fourth example system was built in accordance with system 104 described above with respect to FIG. 27. The system had a length of 80 mm, a width of 80 mm and a height of 130 mm. The system had a mass of 0.43 kg.

Figure 40:
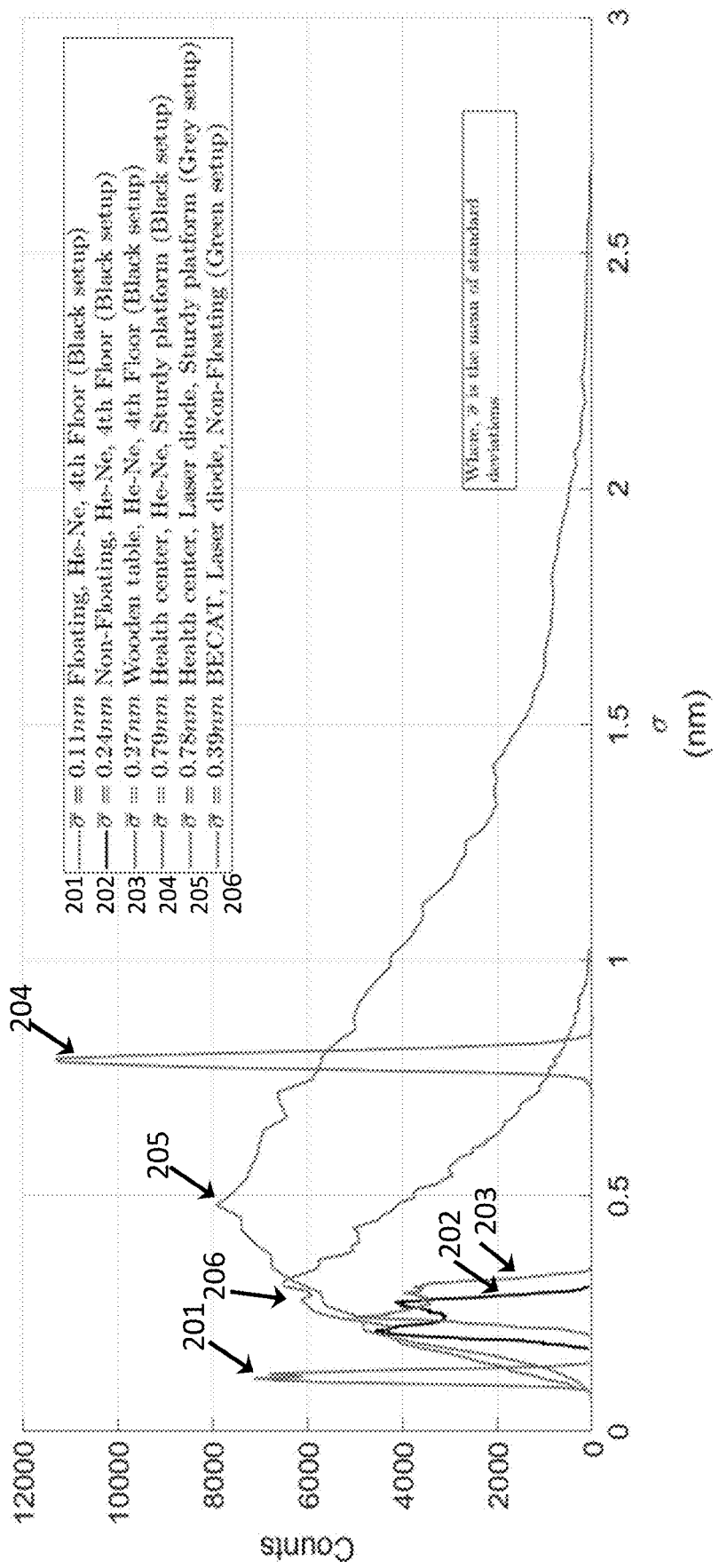
FIG. 40 is a histogram of the experimental temporal stability data for the different example systems placed in varying locations that exhibit different sources of noise.

The example systems were tested for temporal stability, where stability was calculated as the mean/average of the standard deviations calculated for every pixel for frames in a video over a period of time. FIG. 39 is a table of the various example systems under different conditions where the "black setup" refers to the first example system corresponding to system 106, "grey setup" refers to the third example system corresponding to system 102, and the "green setup" refers to the fourth example system corresponding to system 104. FIG. 40 is a histogram of the standard deviations for the various systems. As indicated in FIGS. 39 and 40 the temporal stability was better than 1 nm for all example systems under all circumstances. For some of the systems, the temporal stability was better than 0.5 nm.

Although the systems/methods of the present disclosure have been described with reference to exemplary embodiments thereof, the present disclosure is not limited to such exemplary embodiments/implementations. Rather, the systems/methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A method for automated classification of a micro-object, the method comprising:
    obtaining digital holographic data from a sample imaged in a common path shearing digital holographic microscope, the common path shearing digital holographic microscope including a laser source, a microscopic objective lens, a glass plate and an imaging device, the digital holographic data including a video hologram of at least one micro-object in the sample recorded over a pre-determined time period;
    generating a plurality of 3D reconstructed height profiles of a micro-object in the video hologram, the plurality of 3D reconstructed height profiles obtained from a corresponding plurality of hologram frames spanning the pre-determined time period;
    generating a 2D mean map of the 3D reconstructed height profiles of the micro-object, the 2D mean map generated by determining the mean height for each pixel of the plurality of 3D reconstructed height profiles over the pre-determined time period;
    generating a 2D standard deviation map of the 3D reconstructed height profiles of the micro-object, the 2D standard deviation map generated by determining the standard deviation in height for each pixel of the plurality of 3D reconstructed height profiles over the pre-determined time period;
    determining the standard deviation of the 2D mean map to generate a value for a first feature for the micro-object in the video hologram;
    determining the standard deviation of the 2D standard deviation map to generate a value for a second feature for the micro-object in the video hologram;
    determining optical flow vectors between 3D reconstructed height profiles corresponding to successive frames for each 3D reconstructed height profile after the first 3D reconstructed height profile;
    determining the mean of the magnitude of the optical flow vectors over the pre-determined time period;
    determining the standard deviation of the mean of the magnitude of the optical flow vectors of the plurality of 3D reconstructed height profiles over the pre-determined time period to generate a value for a third feature for the micro-object in the video hologram;
    determining whether the micro-object belongs to a particular type of micro-object by applying a pre-trained classifier to the value of the first feature, the value of the second feature and value of the third feature; and
    based on the determination, saving an indication of whether the micro-object belongs to a particular type of micro-object.

2. The method of claim 1, wherein the pre-trained classifier is a random forest classifier.

3. The method of claim 1, wherein the particular type of micro-object is a healthy red blood cell.

4. The method of claim 1, wherein the particular type of micro-object is a sickled red blood cell.

5. The method of claim 1, wherein the particular type of micro-object is a biological cell or a microorganism.

6. The method of claim 1, wherein the sample includes blood.

7. The method of claim 1, wherein the plurality of hologram frames of the video hologram of the at least one micro-object in the sample are recorded at a rate of between 20 and 40 frames per second.

8. The method of claim 1, wherein the plurality of hologram frames comprise between 100 and 900 frames.

9. The method of claim 8, wherein the plurality of hologram frames comprise between 400 and 700 frames.

* * * * *